US 6,708,744 B2

(12) United States Patent
Wixey et al.

(10) Patent No.: US 6,708,744 B2
(45) Date of Patent: Mar. 23, 2004

(54) PORTABLE POWER PLANER

(75) Inventors: Barry Wixey, Sanibel, FL (US); Robert P. Welsh, Hunt Valley, MD (US); David L. Wikle, Dallastown, PA (US); David J. Doss, Glen Burnie, MD (US)

(73) Assignee: Black & Decker Inc., Newark, DE (US)

(*) Notice: Subject to any disclaimer, the term of this patent is extended or adjusted under 35 U.S.C. 154(b) by 0 days.

(21) Appl. No.: 10/428,385

(22) Filed: May 2, 2003

(65) Prior Publication Data
US 2003/0196724 A1 Oct. 23, 2003

Related U.S. Application Data

(62) Division of application No. 10/124,746, filed on Apr. 17, 2002.
(60) Provisional application No. 60/284,486, filed on Apr. 18, 2001.

(51) Int. Cl.[7] .................................................. B27C 1/00
(52) U.S. Cl. .................. 144/130; 144/117.1; 403/374.5
(58) Field of Search ............................ 144/114.1, 117.1, 144/129, 130, 373; 74/491, 496, 497, 498, 499, 500, 500.5, 503; 403/374.3, 374.5, 374.1

(56) References Cited

U.S. PATENT DOCUMENTS

| 1,423,511 | A | | 7/1922 | Baker |
|---|---|---|---|---|
| 3,167,260 | A | | 1/1965 | Gibbons et al. |
| 4,367,665 | A | | 1/1983 | Terpstra et al. |
| 4,606,685 | A | | 8/1986 | Maier et al. |
| 4,742,855 | A | | 5/1988 | Hartley |
| 4,932,449 | A | | 6/1990 | Omoto |
| 5,383,275 | A | | 1/1995 | Hild et al. |
| 5,392,568 | A | | 2/1995 | Howard et al. |
| 5,632,579 | A | | 5/1997 | Susnjara |
| 5,713,785 | A | | 2/1998 | Nishio |
| 5,725,035 | A | * | 3/1998 | Shadeck .................. 144/117.1 |
| 5,829,499 | A | * | 11/1998 | Liao ........................... 144/130 |
| 5,988,239 | A | * | 11/1999 | Chen .......................... 144/129 |
| 6,058,987 | A | * | 5/2000 | Liao ........................... 144/130 |
| 6,085,812 | A | * | 7/2000 | Chiang .................... 144/117.1 |
| 6,146,066 | A | | 11/2000 | Yelton |
| 6,269,853 | B1 | * | 8/2001 | Chang ..................... 144/117.1 |
| 6,293,321 | B1 | | 9/2001 | Chiang |

FOREIGN PATENT DOCUMENTS

| JP | 2311239 | 12/1990 |
|---|---|---|
| JP | 6143086 | 5/1994 |

* cited by examiner

Primary Examiner—Allen Ostrager
Assistant Examiner—Shelley Self
(74) Attorney, Agent, or Firm—Harness, Dickey & Pierce, P.L.C.

(57) ABSTRACT

A portable power planer for planing the top surface of a workpiece. The portable power planer includes a carriage assembly and a carriage elevation mechanism for translating the carriage assembly. The carriage elevation mechanism includes a plurality of threaded guide posts and an elevation mechanism that employs a plurality of threaded structures that are threadably engaged to the guide posts. A locking mechanism is also provided to inhibit movement of the carriage assembly along the guide posts.

26 Claims, 30 Drawing Sheets

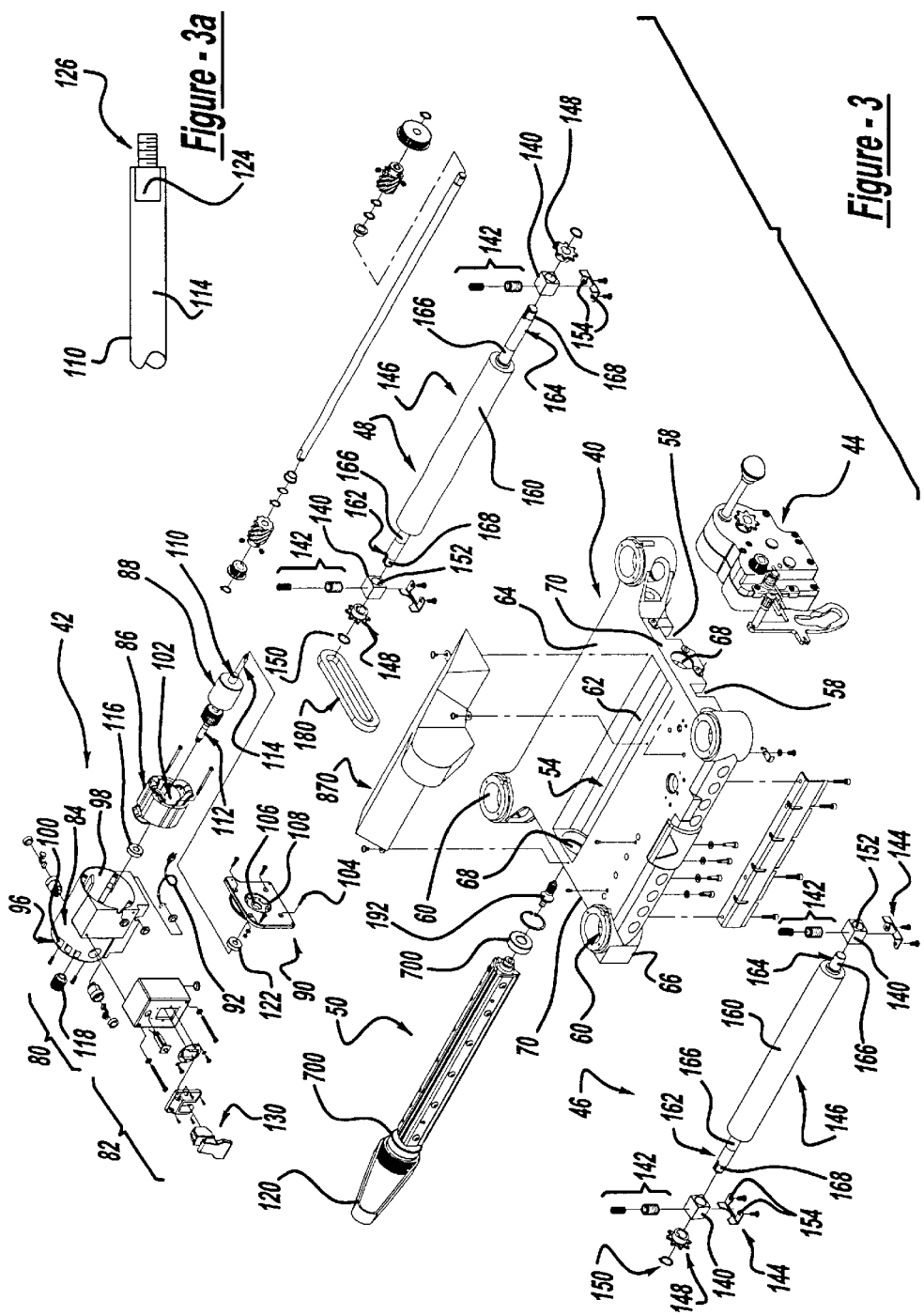

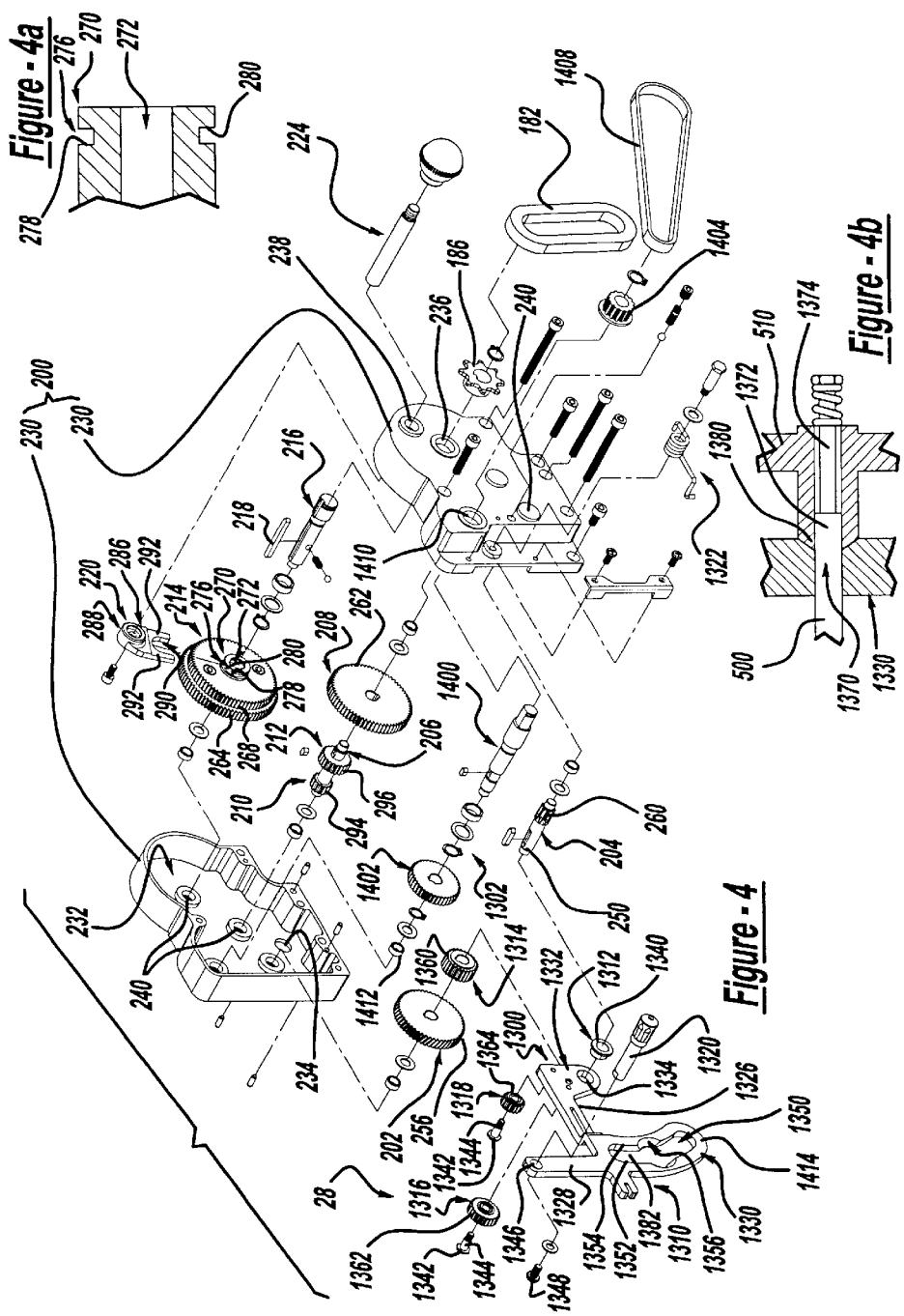

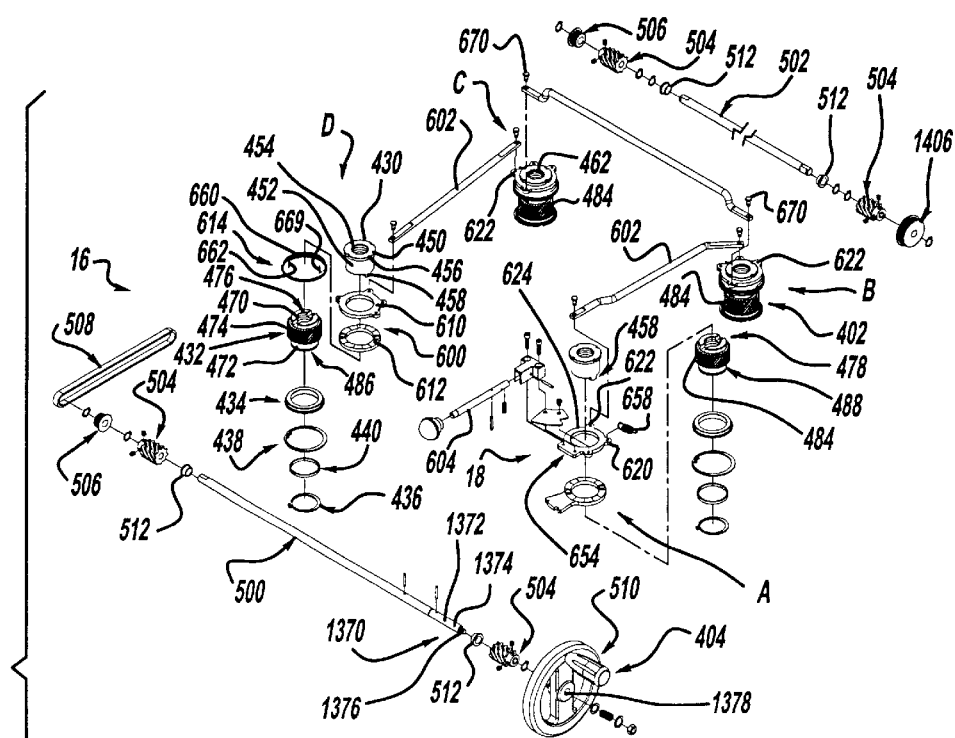
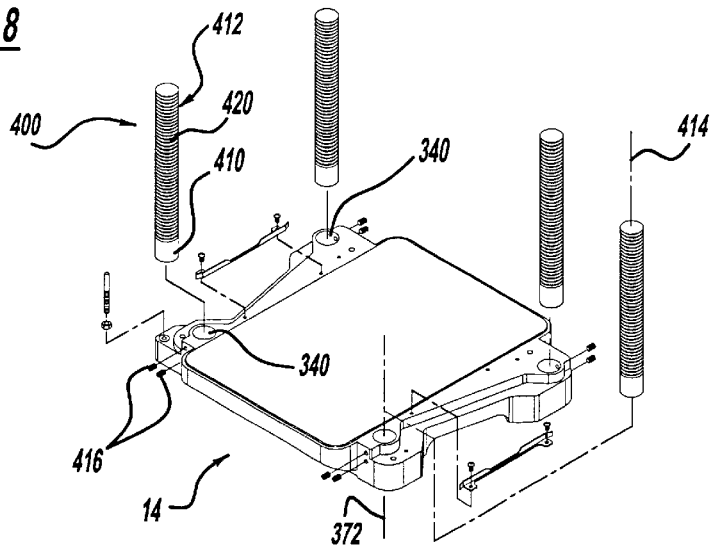
Figure - 8

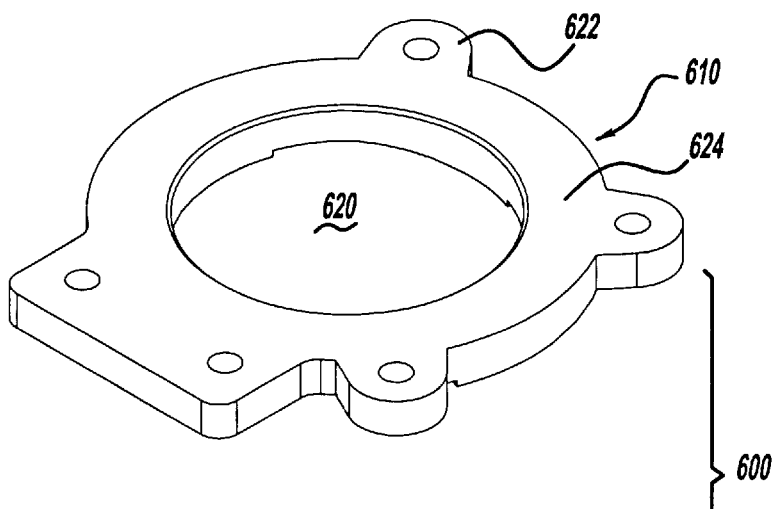
*Figure - 11*
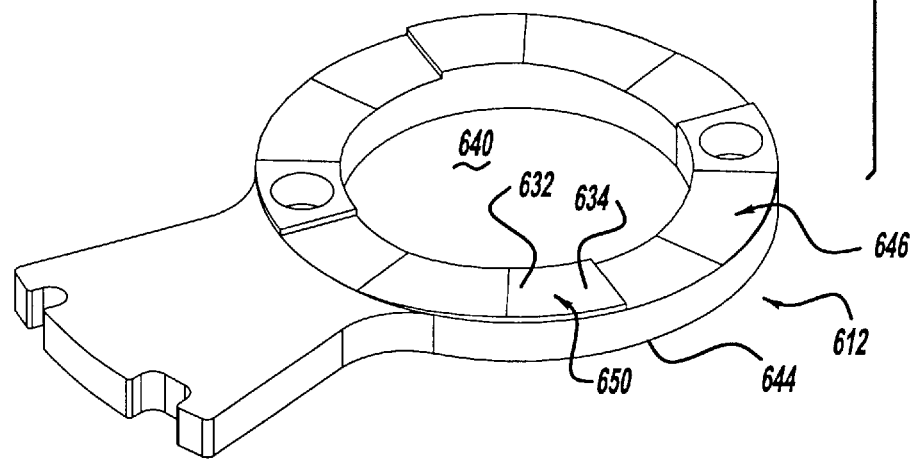
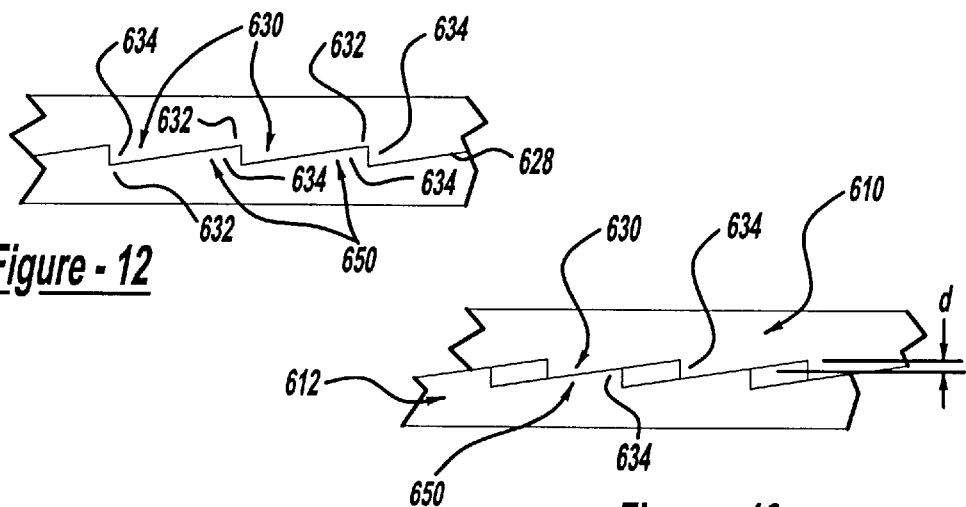
*Figure - 12*
*Figure - 13*

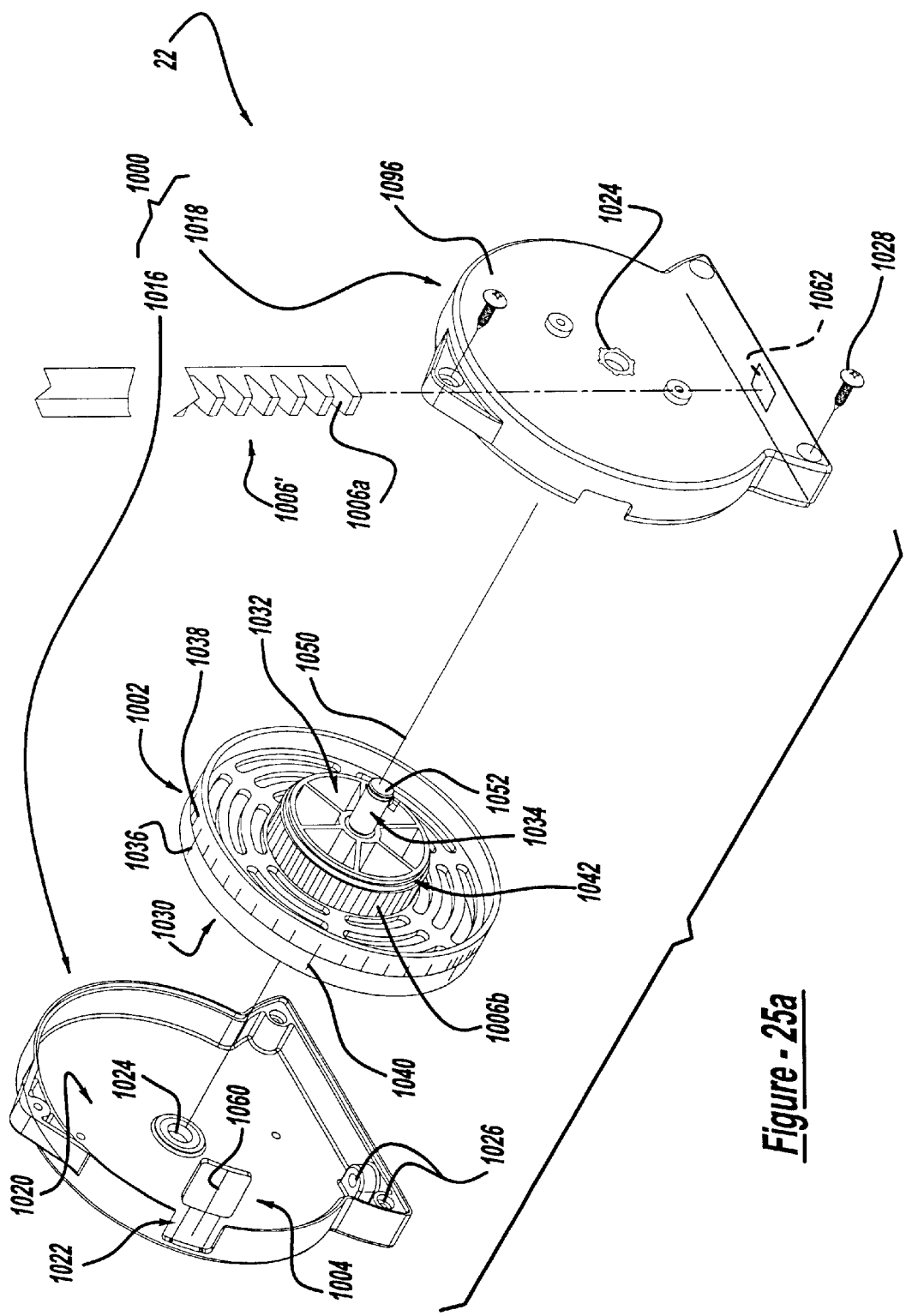

PORTABLE POWER PLANER

CROSS-REFERENCE TO RELATED APPLICATIONS

This application is a divisional application of U.S. application Ser. No. 10/124,746 filed Apr. 17, 2002, which claims the benefit of U.S. Provisional Application Serial No. 60/284,486 filed on Apr. 18, 2001, entitled "Portable Power Planer".

FIELD OF THE INVENTION

The present invention generally relates improvements in portable power tools, and more specifically to improvements that are particularly well suited for use with wood working power tools such as portable power planers.

BACKGROUND OF THE INVENTION

Various power tools are used in woodworking in an effort to efficiently and accurately form workpieces to desired dimensions and with a desired surface finish. As is widely known, planing machines are often used for surface planing of wooden boards. A conventional planing machine typically includes one or more rotatably mounted cutting blades attached to a vertically movable carriage assembly. Also known are jointer machines which are typically used for the edge planing of wood. In certain applications, the functions of conventional planing machines and jointers are combined within a single unit commonly referred to as a jointer/planer machine.

In a typical wood planing machine, such as a surface planer, a selectively adjustable workpiece opening is defined between a carriage assembly and the planing surface of the base of the machine. The rotationally mounted blades are carried on the underside of the carriage assembly adjacent to the workpiece opening. The blades are adapted to remove a predetermined amount of material from the workpiece depending on the thickness of the workpiece and the height of the workpiece opening. The carriage assembly also usually includes one or more feed rollers which urge the workpiece through the workpiece opening during the operation of the wood planing machine.

In most applications, the carriage assembly of a wood planing machine is movably mounted to a plurality of support columns for movement with respect to the planing surface. Such movement of the carriage assembly adjusts the vertical dimension of the workpiece opening so as to selectively determine the amount of material to be removed from the workpiece. Alternatively, the carriage assembly may be fixed and the planing surface adjusted vertically with respect to the carriage assembly so as to adjust the vertical dimension of the workpiece opening.

In use, a workpiece is passed through the workpiece opening and a predetermined amount of material is removed from the surface of the workpiece adjacent the carriage assembly. Multiple passes of the workpiece through the workpiece opening are often necessary to obtain the desired thickness and surface finish. As with other woodworking operations, it is desirable that a planing machine accomplishes preparation with precision, repeatability and a high quality surface finish. In order to accomplish these goals, many of the planing machines of the prior art have relied on designs that utilize rather large and heavy components.

While such designs have proven to be acceptable for relatively large planing machines which are repositioned on a relatively infrequent basis, they have largely been inadequate for portable planing machines, due to their weight. Accordingly, there is a need in the art for a portable planing machine having a highly robust design that permits a workpiece to be prepared with precision, repeatability and a high quality surface finish.

SUMMARY OF THE INVENTION

In one preferred form, the present invention provides a power planer having a base with a reference surface; a carriage assembly; and a carriage elevation mechanism. The carriage elevation mechanism includes a plurality of guide posts that include a threaded adjustment portion and which are fixedly coupled to one of the base and the carriage assembly. The carriage elevation mechanism also includes an elevation mechanism with a plurality of threaded structures, each of the threaded structures being threadably engaged to the threaded adjustment portion of an associated guide post. Each threaded structure is coupled to the other one of the base and the carriage assembly such that rotation of the threaded structures relative to the guide posts affects an elevation of the carriage assembly relative to the reference surface.

In another preferred form, the present invention provides a power planer having a base, a carriage assembly, a carriage elevation mechanism and a locking mechanism. The carriage elevation mechanism includes a plurality of guide posts, each of which being fixed to the base and having a threaded adjustment portion, and a plurality of nut assemblies. Each of the nut assemblies is coupled to the carriage assembly and threadably engaged to the threaded adjustment portion of an associated one of the guide posts. Each nut assembly includes a first threaded structure and a second threaded structure, which are coupled to one another for common rotation but movable in an axial direction relative to one another. The locking mechanism may be selectively positioned in a disengaged condition, which does not inhibit in-unison rotation of the first and second threaded structures, and an engaged condition, wherein the first threaded structure is moved axially relative to the second threaded structure to lock the threaded structure against the threaded adjustment portion of the associated guide post and thereby inhibit in unison rotation of the first and second threaded structures.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

Additional advantages and features of the present invention will become apparent from the subsequent description and the appended claims, taken in conjunction with the accompanying drawings, wherein:

FIG. 3 is an exploded perspective view of a portion of the portable power planer of FIG. 1 illustrating the planer carriage assembly in greater detail;

FIG. 3a is a side view of a portion of the portable power planer of FIG. 1 illustrating a portion of the motor shaft in greater detail;

FIG. 4 is an exploded perspective view of a portion of the portable planer mechanism of FIG. 1, illustrating the gearbox and the power take-off mechanism in greater detail;

FIG. 4a is a sectional view illustrating a portion of the final reduction gear;

FIG. 4b is a sectional view illustrating the connection between the handle, the first axle and the support plate;

FIG. 8 is an exploded perspective view of a portion of the portable planer mechanism of FIG. 1, illustrating the planer carriage elevation mechanism in greater detail;

FIG. 11 is a perspective view illustrating the bottom surface of the upper cam in greater detail;

FIG. 12 is a side view illustrating the upper and lower cams in the neutral position;

FIG. 13 is a side view illustrating the upper and lower cams in the locked position;

FIG. 25a is a view similar to FIG. 22 but illustrating an alternately constructed height scale mechanism;

DETAILED DESCRIPTION OF THE PREFERRED EMBODIMENTS

Figure 1:
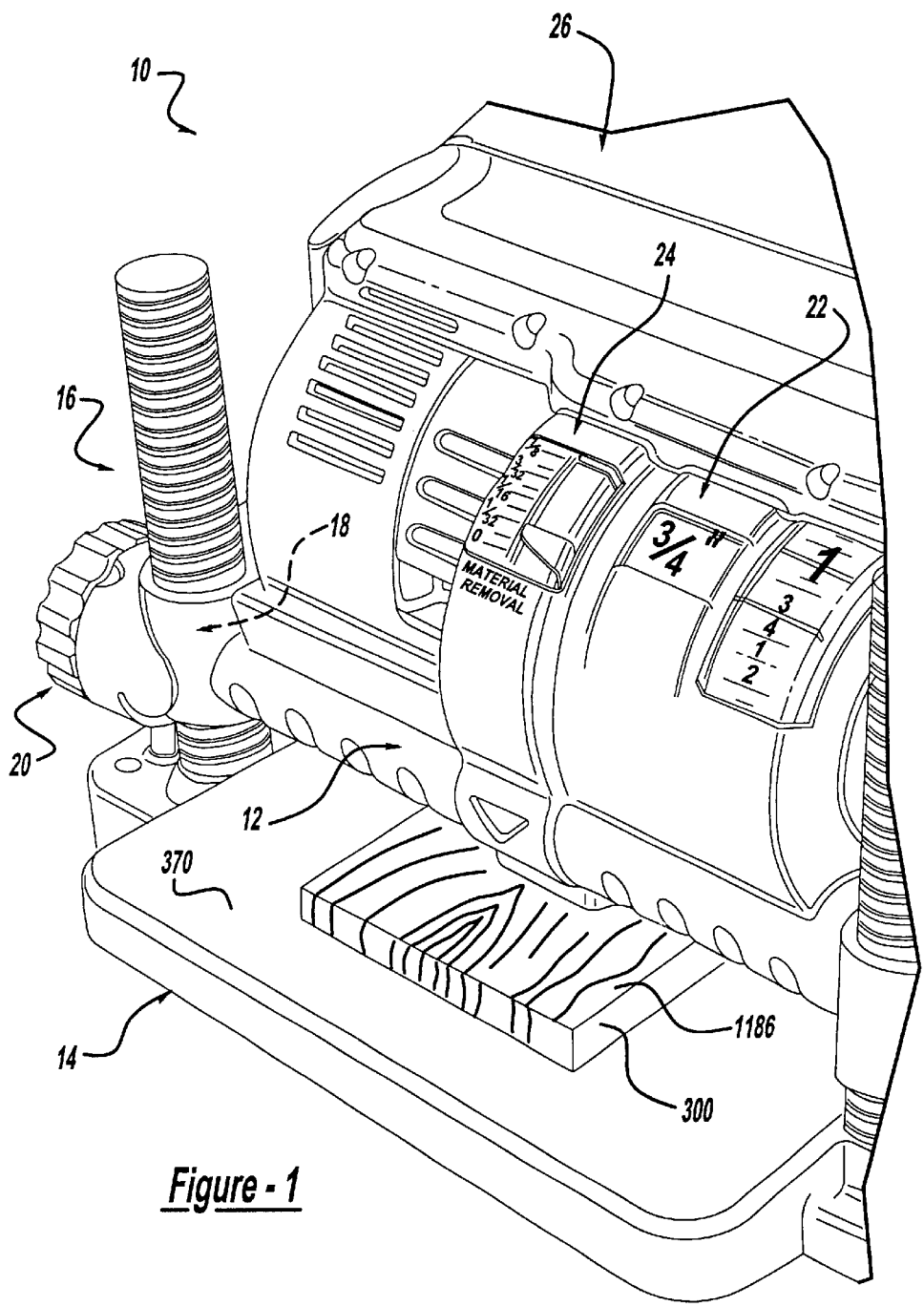
FIG. 1 is a perspective view of a portable power planer constructed in accordance with the teachings of the present invention.

With reference to FIG. 1 of the drawings, a planer mechanism constructed in accordance with the teachings of the present invention is generally indicated by reference numeral 10. With additional reference to FIG. 2, the planer mechanism 10 is shown to include a planer carriage assembly 12, a base assembly 14, a planer carriage elevation mechanism 16, a planer carriage locking mechanism 18, a carriage height setting mechanism 20, a height scale mechanism 22, a material removal gauge 24, a dust collection system 26 and a power take-off mechanism 28.

Planer Carriage Assembly

In FIG. 3, the planer carriage assembly 12 is illustrated to include a carriage 40, a motor assembly 42, a gearbox 44, a first roller assembly 46, a second roller assembly 48 and a cutterhead assembly 50, which will be discussed in more detail below. The carriage 40 is a unitarily formed structure having a cutter pocket 54, two pair of square apertures 58 and a plurality of nut apertures 60, which will be discussed more detail, below. The cutter pocket 54 is shown to include a horizontally-extending slot 62 that is formed through the top and bottom surfaces 64 and 66, respectively, of the carriage 40, and a pair of bearing apertures 68 that extend through the opposite sides 70 of the carriage 40 and intersect the slot 62. The cutter pocket 54 is sized to support the cutterhead assembly 50 for rotation therein.

Figure 2:
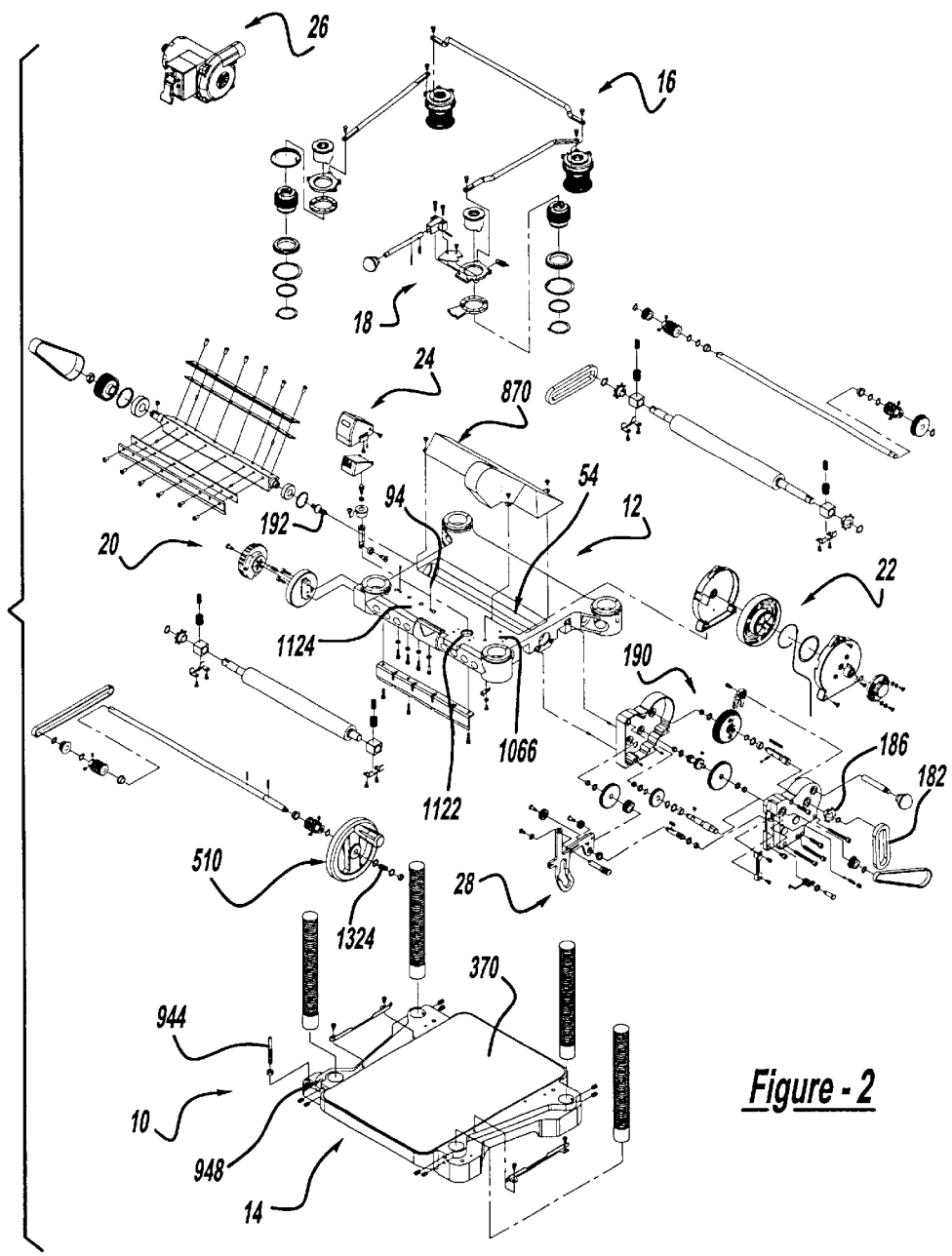
FIG. 2 is an exploded perspective view of the portable power planer of FIG. 1.
Figure 3B:
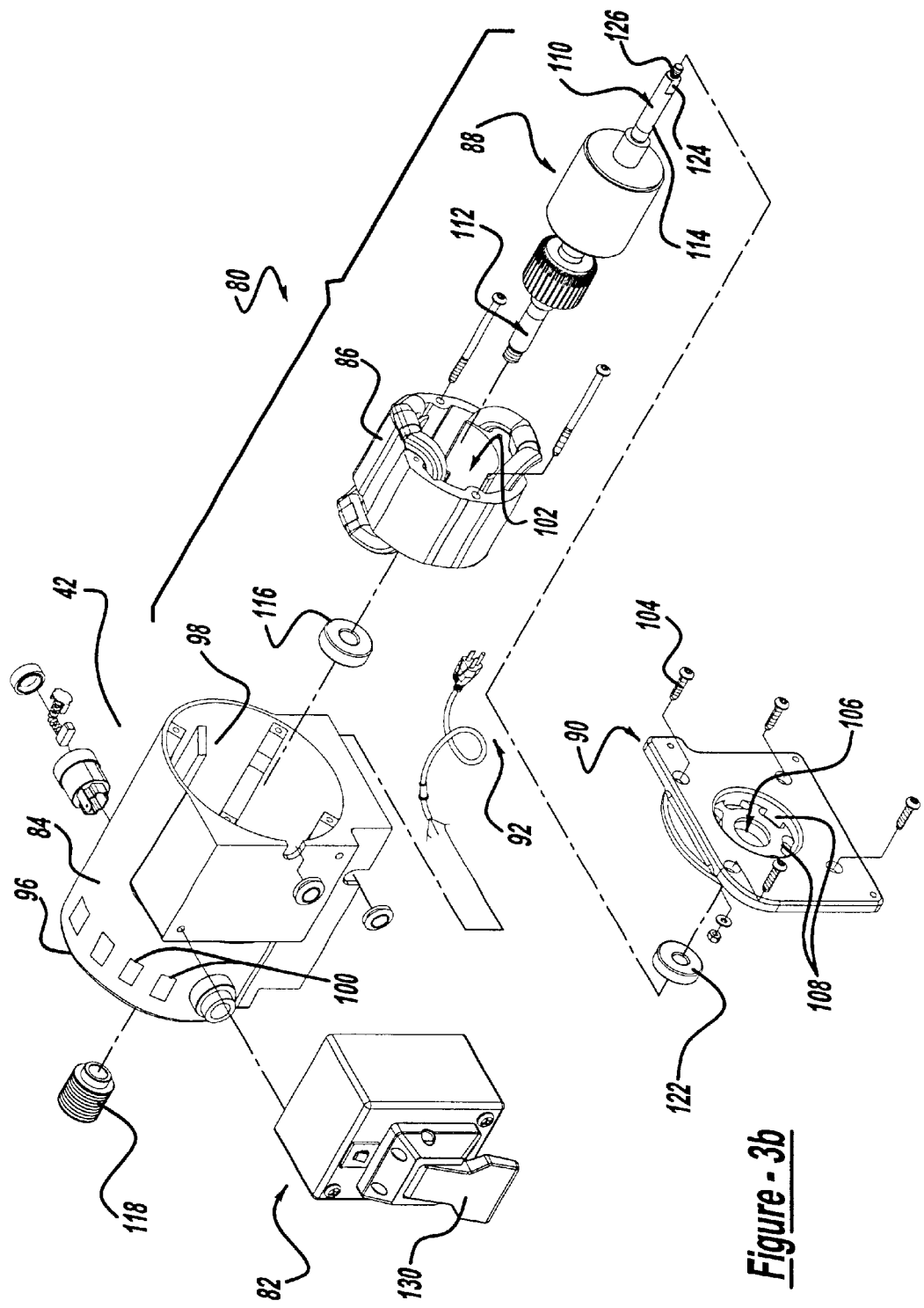
FIG. 3b is an enlarged portion of FIG. 3 illustrating the motor assembly in greater detail.

With additional reference to FIGS. 3a and 3b, the motor assembly 42 is illustrated to include a motor 80 and a switch assembly 82. The motor 80 is fixedly but removably coupled to the carriage 40 forwardly of the cutter pocket 54 and includes a housing shell 84, a conventional stator 86, a rotor 88, a housing end cap 90 and a pair of electric terminals 92 that electrically couple the motor 80 to the switch assembly 82. The housing shell 84 is fixedly coupled to the carriage 40 via a plurality of threaded fasteners 94 (FIG. 2). The housing shell 84 is container-like in shape, having a first end 96, which is substantially closed, a second end 98, which is open, and a plurality of air inlet apertures 100 that are located proximate the first end 96. The stator 86 is fixed to the housing shell 84 and defines an aperture 102 in which the rotor 88 rotates. The housing end cap 90 is removably coupled to the housing shell 84 via a plurality of screws 104 and substantially covers the second end 98. The housing end cap 90 includes a shaft aperture 106 and a plurality of cooling vents 108, which will be discussed in greater detail, below.

The rotor 88 includes a shaft 110 having first and second end portions 112 and 114, respectively. The first end portion 112 of the shaft 110 is rotatably supported by a first bearing 116 that is coupled to the first end 96 of the housing shell 84. The first end portion 112 of the shaft 110 extends outwardly past the housing shell 84 and is fixedly coupled to a drive pulley 118 which coupled to a belt 120 that is employed to transmit rotary power to the cutterhead assembly 50. The second end portion 114 of the shaft 110 is rotatably supported by a second bearing 122 that is coupled to the housing end cap 90. The second end portion 114 of the shaft 110 extends outwardly through the shaft aperture 106 in the housing end cap 90 and includes a pair of parallel flats 124 and a threaded end portion 126. The second end portion 114 of the shaft 110 will be discussed in more detail, below.

The switch assembly 82 includes a switch 130 that is conventionally employed to selectively couple the motor 80 to a source of electric power. The switch assembly 82 is coupled to a forward facing portion of the housing shell 84 in a position where the switch is easily accessed by the operator of the planer mechanism 10.

Each of the first and second roller assemblies 46 and 48 is shown to include a pair of bushings 140, a pair of compression springs 142, a pair of brackets 144, a roller 146, at least one sprocket 148 and a retaining ring 150. Each of the bushings 140 is illustrated to have a cylindrical shaft aperture 152 and to be generally square in shape, conforming to the size of the square apertures 58 formed in the carriage 40. Each bracket 144 is coupled to the bottom surface 66 of the carriage 40 and limits the downward movement of the bushing 140 in the square aperture 58. The ears 154 on the brackets 144 likewise limit the lateral movement of the bushing 140 in the square aperture 58, thus ensuring that the bushing 140 does not slide outwardly past the side 70 of the carriage 40. Each compression spring 142 is disposed between the top of the bushing 140 and the top of the square aperture 58 and exerts a biasing force onto the bushing 140 which urges the bushing 140 downwardly toward the bracket 144.

The roller 146 includes a cylindrical body portion 160 and first and second roller ends 162 and 164, respectively. Each of the first and second roller ends 162 and 164 is shown to have a cylindrical shaft portion 166 for engaging the shaft aperture 152 in an associated one of the bushings 140. Each of the first roller ends 162 and the second roller end 164 of the roller 146 associated with the second roller assembly 48 also includes a sprocket portion 168 to which one of the sprockets 148 is coupled. Various securing means may be employed for securing the sprocket 148 to the sprocket portion 168, including threaded connections to the roller 146 and press-fitting the sprocket 148 to the roller 146. In the particular example provided, a non-circular geometric feature (not specifically shown) is formed onto the sprocket portion 168 and a mating non-circular geometric feature (not specifically shown) is formed into the sprocket 148 to rotatably fix the sprocket portion 168 and sprocket 148. In the embodiment shown, the non-circular geometric feature is oblong, having rounded ends and a pair of parallel side walls. The sprocket 148 abuts the shoulder that is formed at the intersection of the non-circular geometric feature and the remaining portion of the roller 146. A conventional external retaining ring 150 is employed to retain the sprocket 148 on the sprocket portion 168.

A first drive chain 180 couples the sprockets 148 that are located on the first roller end 162 of the rollers 146 of the first and second roller assemblies 46 and 48 to one another, thereby ensuring that the rotational speed of the rollers 146 is equal. A second drive chain 182 couples the sprocket 148 that is located on the second roller end 164 of the roller 146 of the second roller assembly 48 to a sprocket 186 that is coupled to the gearbox 44.

The gearbox 44 is coupled to a side of the carriage 40 and includes a geartrain 190 which receives a rotational input from the cutterhead assembly 50 via an output gear 192. The gearbox 44 is employed to reduce the speed of the rotational input and produce a rotational output that is employed to drive the sprocket 186. The rotational speed of the sprocket 186 therefore dictates the rotational speed of the rollers 146.

With additional reference to FIGS. 4 through 4b, the gearbox 44 includes a gearbox housing 200, an input gear 202, a first reducing gear 204, an intermediate shaft 206, a second reducing gear 208, a first intermediate reducing gear 210, a second intermediate reducing gear 212, a final reduction gear 214, an output shaft 216, a key member 218, a shift fork 220 and a speed selector lever 224. The gearbox housing 200 is formed from a pair of housing halves 230 which collectively define a geartrain cavity 232 having an input aperture 234, an output aperture 236, a selector lever aperture 238 and a plurality of recessed shaft support bosses 240.

The output gear 192 that is coupled to the cutterhead assembly 50 extends into the input aperture 234 in the gearbox housing 200 to provide the geartrain 190 with a rotational input. The input gear 202 is fixed to a shaft portion 250 of the first reducing gear 204. A first pair of the shaft support bosses 240 journally supports the first reducing gear 204 for rotation within the geartrain cavity 232 about an axis that is parallel to the rotational axis of the output gear 192. The input gear 202 includes a plurality of gear teeth 256 which are meshingly engaged to the output gear 192.

A second pair of the shaft support bosses 240 journally supports the intermediate shaft 206 for rotation within the geartrain cavity 232 about an axis that is parallel to the rotational axis of the output gear 192. The second reducing gear 208, the first intermediate reducing gear 210 and the second intermediate reducing gear 212 are fixed for rotation with and spaced apart along the length of the intermediate shaft 206. The teeth 260 of the first reducing gear 204 are meshingly engaged with the teeth 262 of the second reducing gear 208.

The final reduction gear 214 is illustrated to have a set of first gear teeth 264, a set of second gear teeth 268 having a pitch diameter that is relatively smaller than the pitch diameter of the of the set of first gear teeth 264, a collar portion 270 and a shaft aperture 272 that is configured to engage the output shaft 216 in a slip-fit manner. The collar portion 270 extends outwardly from the portion of the final reduction gear 214 on which the set of second gear teeth 268 are formed and includes an annular recess 276 that extends around its circumference and which defines a pair of opposite sidewalls 278 and 280.

The output shaft 216 is journally supported by the output aperture 236 and an associated shaft support boss 240 that is formed into the gearbox housing 200. The key member 218 is coupled to the output shaft 216 and operatively rotatably coupled the output shaft 216 and the final reduction gear 214. The distal end of the output shaft 216 extends out of the gearbox housing 200 and is coupled to the sprocket 186.

The speed selector lever 224 is supported by the speed selector lever aperture 238 for linear movement along an axis coincident with the longitudinal axis of the speed selector lever 224. The shift fork 220 includes U-shaped fork portion 286 and a coupling portion 288. The fork portion 286 includes a U-shaped aperture 290 and a pair of furcations 292 that are configured to fit into the annular recess 276. The coupling portion 288 is fixedly coupled to an end of the speed selector lever 224. The speed selector lever 224 is employed to slide the final reduction gear 214 on the output shaft 216 to selectively engage the final reduction gear 214 with one of the first and second intermediate reducing gears 210 and 212. More specifically, the speed selector lever 224 is employed to push or pull the shift fork 220 along an axis that is parallel to the rotational axis of the output shaft 216 so that the furcations 292 of the shift fork 220 bear against the sidewalls 278 or 280 to move the final reduction gear 214 along the output shaft 216 to permit the set of first gear teeth 264 to be engaged with the teeth 294 of the first intermediate reducing gear 210 or to permit the set of second gear teeth 268 to be engaged with the teeth 296 of the second intermediate reducing gear 212. As the pitch diameter of the first intermediate reducing gear 210 is smaller than the pitch diameter of the second intermediate reducing gear 212, engagement of the final reduction gear 214 to the first intermediate reducing gear 210 will result in a rotational speed of the sprocket 186 that is relative slower as compared to the rotational speed of the sprocket 186 when the final reduction gear 214 is engaged to the second intermediate reducing gear 212.

During the operation of the planer mechanism 10, the compression springs 142 urge the bushings 140 downward to force the rollers 146 into contact with the workpiece 300 (FIG. 1). The rotational speed of the rollers 146 is equal and controlled by the gearbox 44 such that the workpiece 300 is drawn through the planer mechanism 10 at a controlled rate. Accordingly, the speed selector lever 224 may be employed to selectively rotate the rollers 146 at one of two predetermined rotational speeds.

Composite Planer Base Assembly

Figure 5:
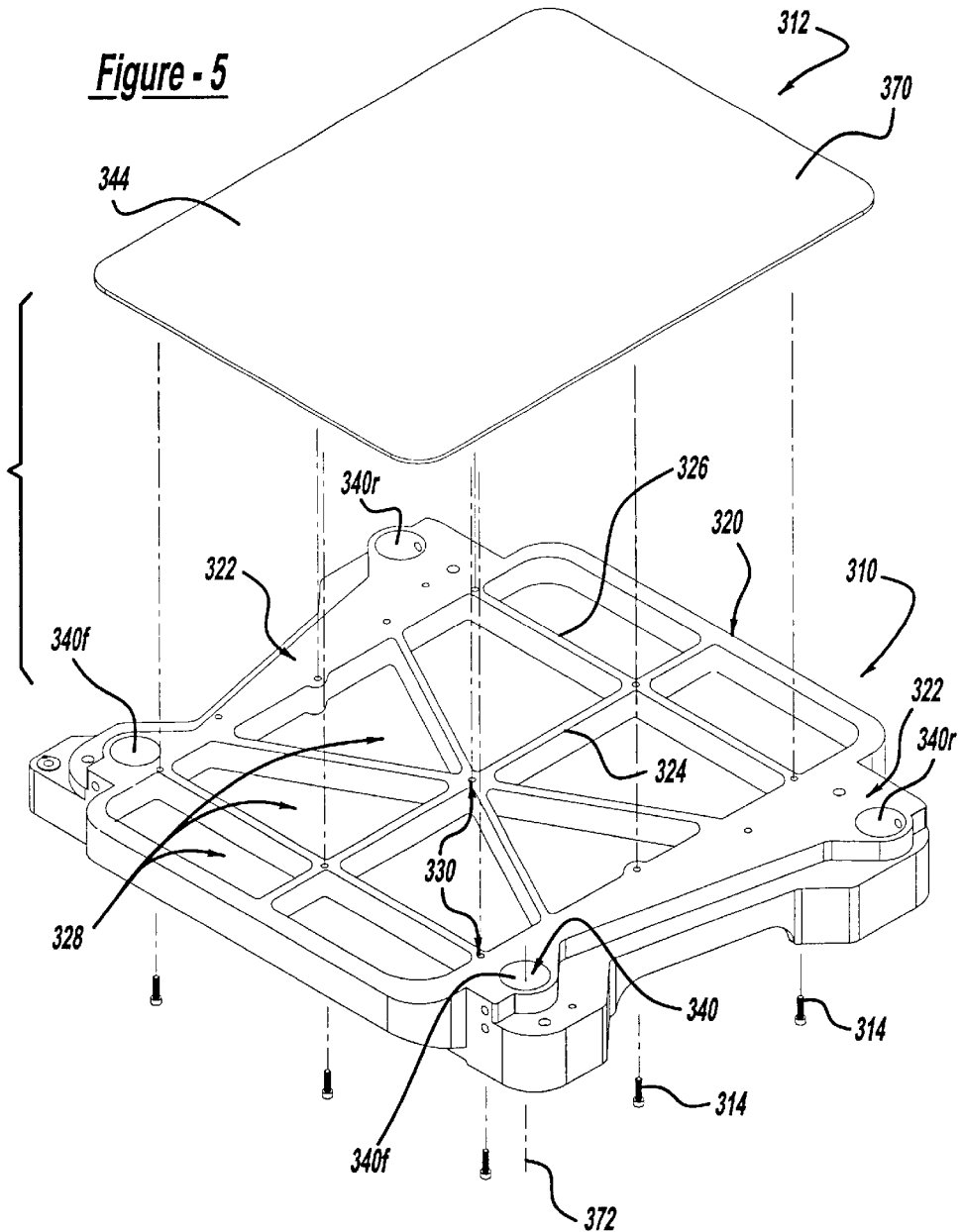
FIG. 5 is an exploded perspective view of a portion of the portable planer mechanism of FIG. 1, illustrating the base assembly in greater detail.

In FIG. 5, the base assembly 14 is illustrated to include a base structure 310, a plate structure 312 and a plurality of fasteners 314 for fixedly coupling the base and plate structures 310 and 312 to one another. The base structure 310 is preferably unitarily formed from a lightweight material, such as aluminum or reinforced plastic, and includes a base body portion 320 and a plurality of base flanges 322. Examples of suitable forming processes for forming the base structure 310 include casting (including die casting) and molding processes.

Figure 6:
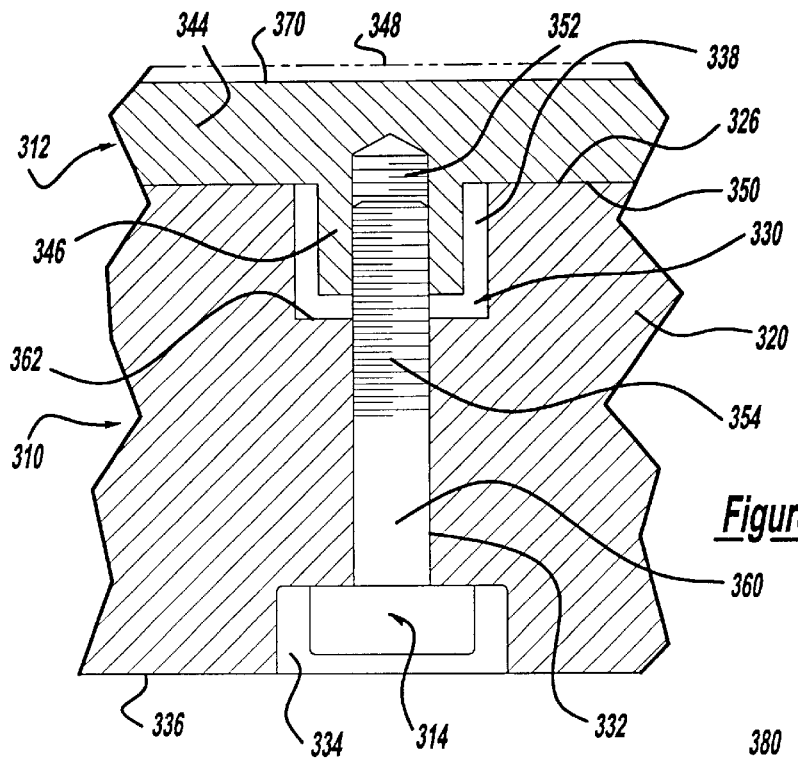
FIG. 6 is a sectional view taken along the line 6—6 of FIG. 5.

The base body portion 320 includes a plurality of interlinked structural webs 324 that define a support surface or upper surface 326. The upper surface 326 is discontinuous, having a plurality of generally open void spaces 328. Mounting apertures 330, which are employed for locating and securing the plate structure 312 to the base structure 310, are formed into the webs 324 at predetermined locations. With additional reference to FIG. 6, each of the mounting apertures 330 is shown to include a cylindrically-shaped body 332, a first counterbored portion 334, which extends downwardly from the body 332 and intersects the bottom surface 336 of the base structure 310, and a second counterbored portion 338, which extends upwardly from the body 332 and intersects the upper surface 326 of the base structure 310.

Each of the base flanges 322 includes a pair of guide post mounting apertures 340 that are undersized from their finished dimension by a predetermined amount. The guide post mounting apertures 340 are preferably positioned such that the forwardly positioned guide post mounting apertures 340f are somewhat inboard of the rearwardly positioned guide post mounting apertures 340r for purposes that will be discussed in greater detail, below.

The one-piece plate structure 312 is preferably formed from cast iron and includes a plate member 344 and a plurality of fastening bosses 346. The plate member 344 is generally rectangular in shape, having upper and lower surfaces 348 and 350, respectively, that are cast to be flat and parallel within standard casting tolerances. The fastening bosses 346 are cylindrically shaped and extend outwardly away from the lower surface 350 of the plate member 344. A threaded aperture 352 is formed into the distal end of each fastening boss 346 and is configured to threadably engage a threaded portion 354 of an associated one of the fasteners 314. The outer diameter of each fastening boss 346 is configured to fit within the second counterbored portion 338 of the mounting aperture 330.

Prior to the assembly of the base structure 310 and the plate structure 312, one or both of the upper and lower surfaces 326 and 336 of the base structure 310 may optionally be machined so as to render these surfaces flatter and more parallel to one another as compared to their "as cast" condition. However, it is presently preferred that the base structure 310 not be machined prior to the assembly of the base and plate structures 310 and 312. The base and plate structures 310 and 312 are aligned relative to one another such that each of the fastening bosses 346 is disposed in the second counterbored portion 338 of an associated mounting aperture 330. The fasteners 314, which are illustrated to be socket-head cap screws 360, are introduced to the opposite end of the mounting apertures 330 and threadably engaged to the threaded aperture 352 formed in the associated fastening boss 346. As the fastening bosses 346 do not contact the end 362 of the second counterbored portion 338, the clamping force that is generated by the fasteners 314 operatively maintains the lower surface 350 of the plate member 344 in abutment with the upper surface 326 of the base structure 310, permitting the plate structure 312 to cover the void spaces 328 in the base structure 310.

Once assembled, the base assembly 14 is machined to provide a reference surface or planing surface 370 that is flat and perpendicular to the axes 372 of the guide post mounting apertures 340, as well as to position the axes 372 of the guide post mounting apertures 340 in a predetermined location relative to one another. For example, the base assembly 14 may be fixtured in a grinding machine, such as a Blanchard grinder (not shown), to permit the planing surface 370 of the plate structure 312 to be machined flat. Thereafter, the base assembly 14 may be fixtured into a boring machine having a multi-spindle boring head (not shown) using the planing surface 370 of the plate structure 312 as a datum to permit the guide post mounting apertures 340 to be bored to their proper size and with their axes located in a desired manner relative to one another and perpendicular to the planing surface 370. As another example, the base assembly 14 may be fixtured in an automated machining device such that the bottom surface 336 of the base structure 310 is clamped against a fixture to permit the planing surface 370 of the plate structure 312 and the guide post mounting apertures 340 to be machined without unclamping the base assembly 14 from its fixture or otherwise changing the orientation of the base assembly 14 relative to the fixture. Suitable automated machining devices include CNC machining centers having a tool changer with a plurality of selectable tool bits, dial indexing machines having a plurality of machining stations, and transfer machines having a plurality of machining stations.

Figure 7:
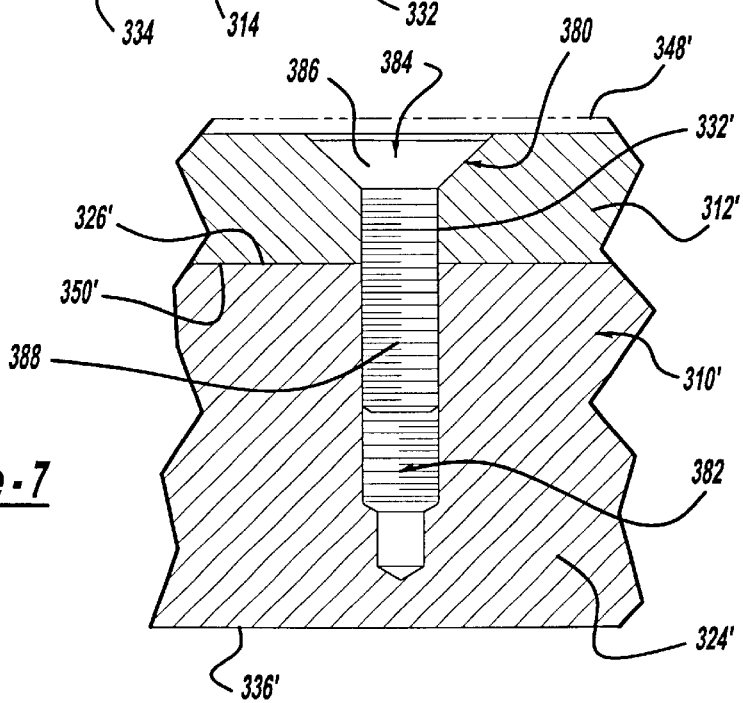
FIG. 7 is a sectional view similar to that of FIG. 6 but illustrating a base assembly constructed in accordance with an alternate embodiment of the present invention.

Configuration of the base assembly 14 in this manner is highly advantageous in that the base assembly 14 is accurately constructed, yet extremely lightweight relative to conventionally configured planer bases, robust in design, and relatively inexpensive. Those skilled in the art will appreciate, however, that the base assembly of the present invention may be constructed somewhat differently while still permitting the attainment of these benefits. For example, the fastening bosses 346 may be omitted from the plate structure 312', as illustrated in FIG. 7. In this example, mounting apertures 330' having a countersunk portion 380 are formed through the plate structure 312' and threaded apertures 382 are formed into the webs 324' of the base structure 310'. Flat head cap screws 384, having a conical head 386, which is configured to mate with the countersunk portion 380 of the mounting apertures 330, and a threaded portion 388, which is sized to threadably engage the threaded apertures 382, are employed to both locate the plate structure 312' relative to the base structure 310' and couple the base and plate structures 310' and 312' to one another. As with base structure 310, the upper and lower surfaces 326' and 336' of the base structure 310' and the upper and lower surfaces 348' and 350' of the plate structure 312' are preferably not machined prior to their assembly so as to minimize the cost of the base assembly 14'.

Planer Carriage Elevation Mechanism

In FIGS. 2 and 8, the planer carriage elevation mechanism 16 is shown to include a plurality of threaded guide posts 400, a plurality of nut assemblies 402 and an adjustment mechanism 404. In the embodiment illustrated, the threaded guide posts 400 include a cylindrically-shaped pin portion 410 and a threaded adjustment portion 412. The pin portion 410 is precisely sized to engage an associated one of the guide post mounting apertures 340 with an interference fit, such as in a shrink-fit, or more preferably, a press-fit manner. Construction in this manner is advantageous in that the interference fit between the guide post 400 and the base structure 310 reliably locates the axis 414 of the guide post 400 in an orientation that is coincident the axis 372 of the guide post mounting aperture 340, as well as ensures that they will remain fixedly interconnected during the normal operation of the planer mechanism 10. After the pin portion 410 has been inserted into an associated guide post mounting aperture 340, conventional set screws 416 and/or pins, such as roll pins or dowel pins, may be employed to further assure that the guide posts 400 will not rotate relative to the base structure 310 during the operation of the planer mechanism 10. Although the guide posts 400 are illustrated as being press-fit to the base structure 310, those skilled in the art will understand, however, that any appropriate coupling means may be employed to fix the guide posts 400 to the base structure 310. Such coupling means are generally well known in the art and therefore, need not be discussed in detail.

The adjustment portion 412 of the guide post 400 preferably includes a single helical threadform 420 having an axis that is coincident with the axis 414 of the guide post 400. Examples of suitable threadforms include Acme screw threads, centralizing Acme screw threads, square threads, modified square threads, and conventional screw threads such as Unified National screw threads and metric M and MJ profile threads. It is presently preferred that the threadform 420 be formed in a material removing machining process, such as turning or grinding, so as to ensure that the axis of the threadform 420 is coincident with the axis 414 of the guide post 400. Alternatively, the threadform 420 may be formed in a machining process that does not remove material, such as roll forming, provided that the axis of the threadform 420 is properly oriented. Also preferably, the guide posts 400 are heat treated to increase the strength and durability of the adjustment portion 412.

Each nut assembly 402 includes an upper lock nut 430, a lower lock nut 432, an annular holder 434, first and second retaining rings 436 and 438, respectively, and a bushing 440. The upper lock nut 430 is shown to include a flange portion 450, a body portion 452 and an aperture 454 formed through the flange and body portions 450 and 452. The flange portion 450 is cylindrically shaped and extends radially outwardly from the body portion 452. A plurality of semi-circular spring foot apertures 456 are spaced apart at regular intervals around the outer circumference of the flange portion 450. The spring foot apertures 456 are discussed in more detail, below. The body portion 452 is also cylindrically shaped, being sized to fit within a nut aperture 60 formed in the carriage 40. The body portion 452 extends downwardly from the flange portion 450 and terminates at a coupling tab 458. In the example provided, the coupling tab 458 is formed with a pair of parallel end walls 460, each of which being oriented such that they lie in a plane spaced apart from and parallel to the longitudinal axis of the upper lock nut 430. The aperture 454 includes a threaded portion 462 that is configured to threadably engaged the threadform 420 of the guide post 400.

The lower lock nut 432 includes cylindrically shaped upper and lower body portions 470 and 472, respectfully, a mid-flange 474 that is positioned between the upper and lower body portions 470 and 472 and an aperture 476 that extends completely through the lower lock nut 432. The upper body portion 470 has an outer diameter that is substantially equal to that of the body portion 452 of the upper lock nut 430 and includes a slotted aperture 478 that is sized to receive the coupling tab 458 that is formed onto the upper lock nut 430. Preferably, little clearance exists between the coupling tab 458 and the slotted aperture 478 so as to minimize the amount by which the upper and lower lock nuts 430 and 432 are permitted to rotate relative to one another when the coupling tab 458 is engaged in the slotted aperture 478. The mid-flange 474 extends radially outwardly of the upper and lower body portions 470 and 472 and includes upper and lower flange surfaces 480 and 482, respectively, and a plurality of conventionally formed worm gear teeth 484, which are formed into the outer circumference of the mid-flange 474. The lower body portion 472 extends downwardly from the mid-flange 474 and has an outer diameter that is sized to engage the inner diameter of the bushing 440. The aperture 476 includes a threaded portion 486 that is configured to threadably engaged the threadform 420 of the guide post 400.

Figure 9:
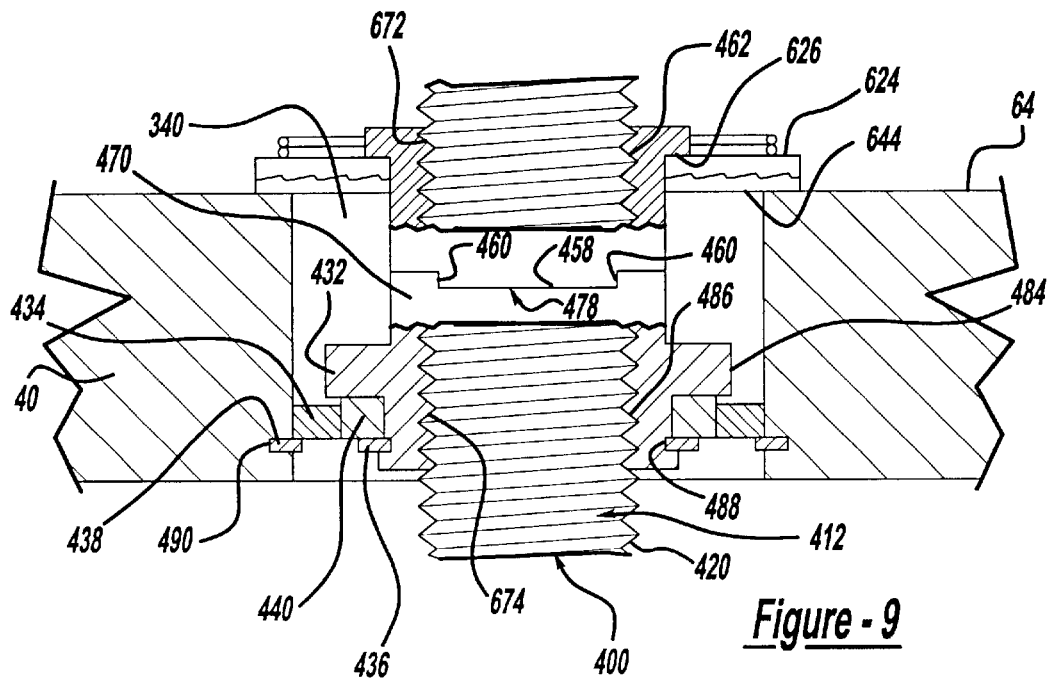
FIG. 9 is a sectional view taken along the line 9—9 of FIG. 1.

The lower lock nut 432 and the body portion 452 of the upper lock nut 430 are illustrated to be disposed in the nut aperture 60 in the carriage 40 such that the coupling tab 458 is engaged to the slotted aperture 478. With additional reference to FIG. 9, the fit between the coupling tab 458 and the slotted aperture 478 is almost line-to-line, thereby substantially limiting the amount by which the upper and lower lock nuts 430 and 432 are able to rotate relative to one another after the coupling tab 458 and the slotted aperture 478 have been engaged to each other. A retaining ring groove 488, which is formed into the lower body portion 472, receives the first retaining ring 436 to retain the bushing 440 to the lower body portion 472. The outer diameter of the bushing 440 is configured to engage the inner diameter of the annular holder 434 in a press fit manner. The outer diameter of the annular holder 434 is sized to engage the nut aperture 60 in the carriage 40 in a press-fit manner. The second retaining ring 438 is a conventional internal retaining ring that is configured to engage a retaining ring groove 490 formed into the nut aperture 60 in the carriage 40 to thereby prevent the annular holder 434 from moving downwardly in the nut aperture 60 beyond a predetermined distance.

In FIGS. 2 and 8, the adjustment mechanism 404 is shown to include a front axle 500, a rear axle 502, a plurality of geared worms 504, a pair of pulleys 506, a belt 508 and a hand wheel 510. Bushings 512 or bearings are preferably employed to support the front and rear axles 500 and 502 for rotation within front and rear axle apertures 514 and 516, respectively, formed in the carriage 40. The hand wheel 510 and one of the pulleys 506 are coupled to the opposite ends of the front axle 500. Two of the geared worms 504 are coupled for rotation with the front axle 500 and are positioned along the length of the front axle 500 so as to meshingly engage the worm gear teeth 484 that are formed into the circumference of the mid-flange 474 of the forward pair of lower lock nuts 432. Similarly, a pair of the geared worms 504 are coupled for rotation with the rear axle 502 and positioned along the length of the rear axle 502 so as to meshingly engage the worm gear teeth 484 that are formed into the circumference of the mid-flange 474 of the rearward pair of lower lock nuts 432. The remaining pulley 506 is also coupled for rotation with the rear axle 502 and is positioned such that it is located in a plane that is both perpendicular to the front and rear axles 500 and 502 and in which the other pulley 506 is located. In the particular example provided, the belt 508 has a conventional V-shaped cross-section and is engaged to the pulleys 506 in a conventional manner.

A rotational input to the hand wheel 510 operates to rotate the front axle 500. The pulley 506 that is coupled to the front axle 500 the belt 508 and the pulley 506 that is coupled to the rear axle 502 cooperate to transmit the rotational input to the rear axle 502, causing the rear axle 502 to rotate in a manner that is identical to that of the front axle 500. As the geared worms 504 are coupled for rotation with the front and rear axles 500 and 502 and meshingly engaged to the worm gear teeth 484 that are formed into the circumference of the mid-flange 474 of the lower lock nuts 432, the rotational input is also transmitted through the geared worms 504 and into the worm gear teeth 484 of their associated lower lock nut 432, causing the lower lock nuts 432 to rotate. As the coupling tab 458 of the upper lock nut 430 is engaged in the slotted aperture 478 of the lower lock nut 432, rotation of the lower lock nuts 432 causes the upper lock nuts 430 to rotate in an identical manner. The common rotation of the upper and lower lock nuts 430 and 432 causes the nut assemblies 402 to traverse along the adjustment portion 412 of the guide posts 400 to thereby lift or lower the carriage 40 in a highly controlled and accurate manner.

Figure 10:
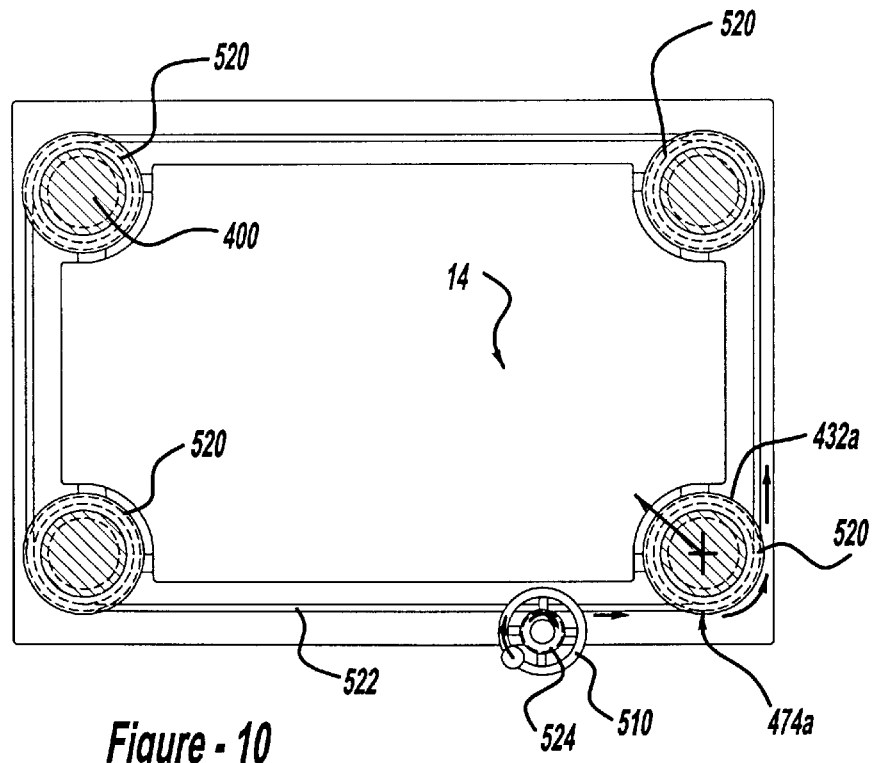
FIG. 10 is a partially broken-away perspective view illustrating a planer carriage elevation mechanism constructed in accordance with an alternate embodiment of the present invention.

Those skilled in the art will appreciate, however, that the planer carriage elevation mechanism 16 may be constructed somewhat differently while still permitting the carriage to be positioned in a highly controlled and accurate manner. For example, the planer carriage elevation mechanism 16 may be constructed as shown in FIG. 10. In this embodiment, sprockets 520 are formed onto the mid-flange 474a of each of the lower lock nuts 432a. A drive chain 522 which is formed as a loop that encircles the guide posts 400, engages the sprockets 520 as well as an input sprocket 524 that is coupled for rotation with the hand wheel 510. Rotation of the hand wheel 510 rotates the input sprocket 524, causing the drive chain 522 to rotate around the guide posts 400 and rotate the lower lock nuts 432.

Those skilled in the art will also understand that various mechanical equivalents can be readily substituted for several of the components that are shown in the above embodiments. For example, sprockets and a drive chain can be readily substituted for the pulleys 506 and belt 508 that are illustrated in FIG. 8. As another example, pulleys and a belt can be substituted for the sprockets 520 and drive chain 522 that are illustrated in FIG. 10.

Planer Carriage Locking Mechanism

With renewed reference to FIGS. 2, 8, 9 and 11, the planer carriage locking mechanism 18 is illustrated to include a plurality of cam assemblies 600, a plurality of link arms 602 and an input lever 604. Each of the cam assemblies 600 is shown to include an upper cam 610, a lower cam 612 and a biasing spring 614. The upper cam 610 is an annular ring having a central aperture 620, which is sized to receive the body portion 452 of the upper lock nut 430 in a slip-fit manner, and a plurality of mounting lugs 622 that are formed onto its outer circumference. The top surface 624 of the upper cam 610 is illustrated to be flat and configured to contact the bottom surface 626 of the flange portion 450 of an associated upper lock nut 430. With additional reference to FIG. 12, the lower surface 628 of the upper cam 610 is shown to include a plurality of tapered ramp members 630, each of which having a relatively thin nose portion 632 and tapering outwardly and downwardly to and ending abruptly at a relatively thick end portion 634. The ramp members 630 extend around the circumference of the upper cam 610, being linked to one another such that the nose portion 632 of each ramp member 630 abuts the end portion 634 of an adjacent ramp member 630.

The lower cam 612 is also an annular ring, having a central aperture 640, which is sized to receive the upper body portion 470 of the lower lock nut 432 in a slip fit manner, a substantially flat lower surface 644, which is configured to abut the top surface 64 of the carriage 40, and an upper surface 646 having a plurality of ramp members 650 that are configured to mate with the ramp members 630 formed onto the lower surface 626 of the upper cam 610. The lower cam 612 is preferably fixedly coupled to the carriage 40 with, for example, low-profile fasteners such as flat head cap screws (not shown).

The cam assembly 600 at the location indicated by reference letter A is generally similar to the cam assemblies 600 discussed above, but also includes a mounting flange 654 for coupling the upper cam 610 to an input lever 604. The input lever 604 extends forwardly past the carriage 40, providing the operator of the planer mechanism 10 with a comfortable and easily manipulated means for controlling the planer carriage locking mechanism 18.

The biasing spring 614 operates to bias the rotational position of the upper cam 610 relative to the lower cam 612 from a neutral position, illustrated in FIG. 12, wherein the ramp members 630 of the upper cam 610 completely confront the ramp members 650 of the lower cam 612, to a locked position, illustrated in FIG. 13. The biasing spring 614 is illustrated to be a conventional tension spring 658 at the location designated by reference letter A and a conventional torsion spring 660 at the locations designated by reference letters B, C and D. The tension spring 658 is coupled to one of the mounting lugs 622 at a first end and to the carriage 40 at a second end. Each torsion spring 660 is disposed over an associated upper cam 610 and around the flange portion 450 of an associated upper lock nut 430. The torsion spring 660 includes a first foot 662, which extends downwardly and engages one of the mounting lugs 622, and a second foot 664, which extends upwardly and engages one of the spring foot apertures 456 that is formed in the flange portion 450 of the upper lock nut 430.

The link arms 602 are coupled to the mounting lugs 622 in the upper cams 610 via shoulder screws 670. The link arms 602 are configured such that a rotational input to the upper cam 610 at location A via the input lever 604 is transmitted through the link arms 602 causing each of the other upper cams 610 to rotate in an equal amount and in the same direction.

When it is necessary to adjust the vertical position of the carriage 40, the input lever 604 is positioned such that each of the upper cams 610 are positioned in their neutral position. In this condition, the planer carriage locking mechanism 18 does not interfere with the planer carriage elevation mechanism 16 and as such, the carriage 40 can be raised or lowered as desired. Once the carriage 40 has been located to a desired position, the input lever 604 is released, permitting the biasing springs 614 to provide a rotational input to each of the upper cams 610. This rotational input causes the upper cams 610 to rotate relative to their associated lower cam 612 into a locked position, which again is illustrated in FIG. 13. In this condition, the lower and upper surfaces 626 and 646 of the upper and lower cams 610 and 612, respectively, are still in contact with one another. However, as the upper and lower cams 610 and 612 have rotated relative to one another, the end portions 634 of the ramp members 630 on the upper cam 610 have slid closer toward the end portions 634 of the ramp members 650 on the lower cams 612, thereby increasing the overall distance between the upper surface 624 of the upper cam 610 and the lower surface 644 of the lower cam 612, the distance being designated by reference letter "d".

Accordingly, the positioning of the upper cam 610 into the locked position generates an axial force that tends to push the upper cam 610 (and upper lock nut 430) away from the carriage 40. Therefore, as each of the lower lock nuts 432 are rotatable within their associated nut aperture 60 but restrained vertically within the nut aperture 60 by the first and second retaining rings 436 and 438, the axial force is transmitted through the carriage 40 to the lower lock nut 432. As those skilled in the art will readily appreciate, the opposite vertical movement of the upper and lower lock nuts 430 and 432 forces the threaded portion 462 of the upper lock nut 430 into contact with a first side 672 of the threadform 420 and the threaded portion 486 of the lower lock nut 432 into contact with an opposite side 674 of the threadform 420 to inhibit relative rotation between each of the nut assemblies 402 and their associated guide post 400 to thereby lock the vertical position of the nut assemblies 402 relative to their guide post 400.

While the cam assemblies 600 have been illustrated with upper and lower cams 610 and 612 with a multiplicity of ramp members 630 and 650, respectively, those skilled in the art will understand that any appropriate number of ramp members 630 and 650 may be used. In this regard, the number of ramp members 630 may not be equal to the number of ramp members 650. In a presently preferred embodiment, the quantity of the ramp members 630 is equal to three and the number of ramp members 650 is equal to the number of ramp members 630.

Cutter Head Assembly with Quick Change Cutting Blade

Figure 14:
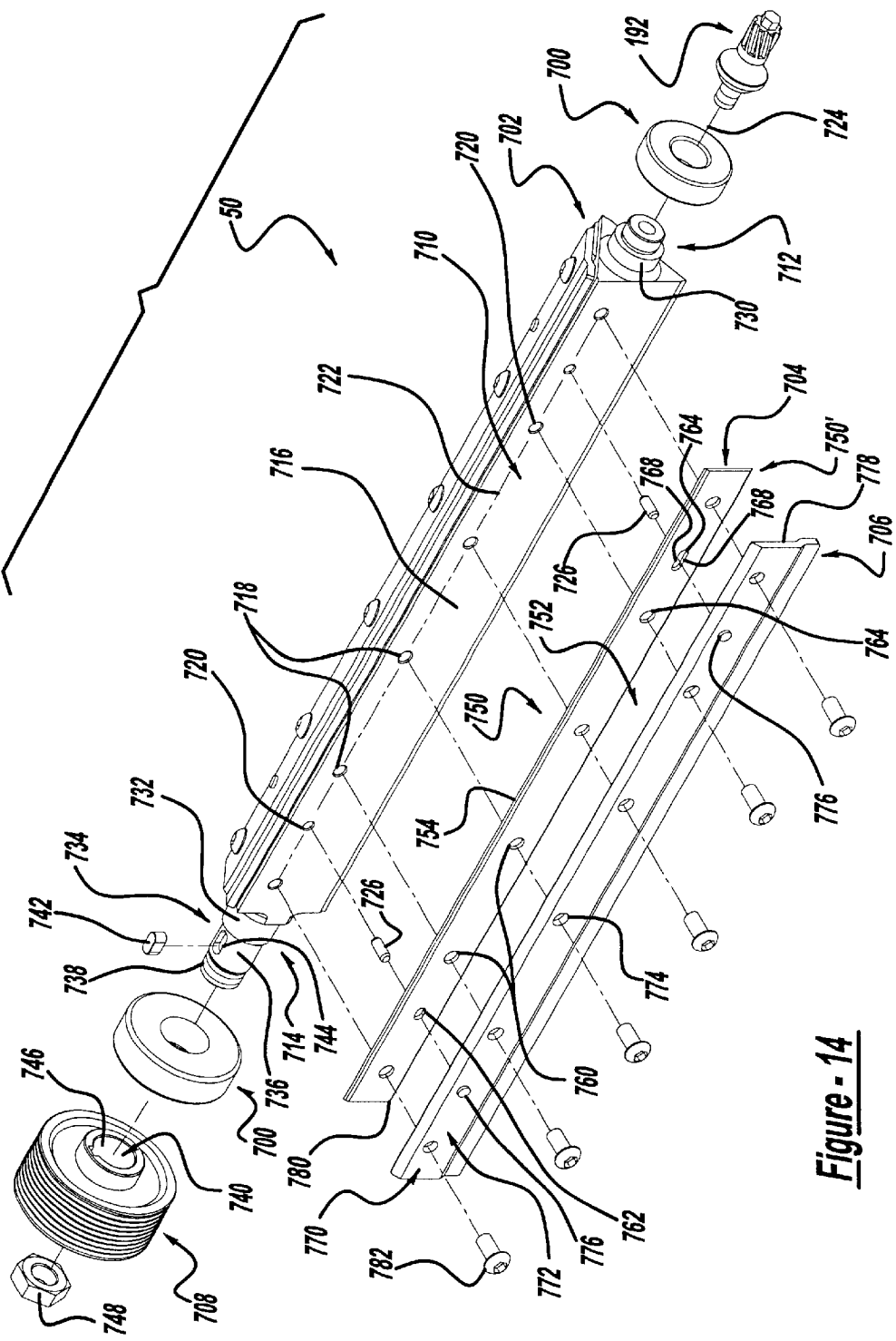
FIG. 14 is an exploded perspective view of a portion of the portable planer mechanism of FIG. 1, illustrating the cutter head assembly in greater detail.
Figure 15:
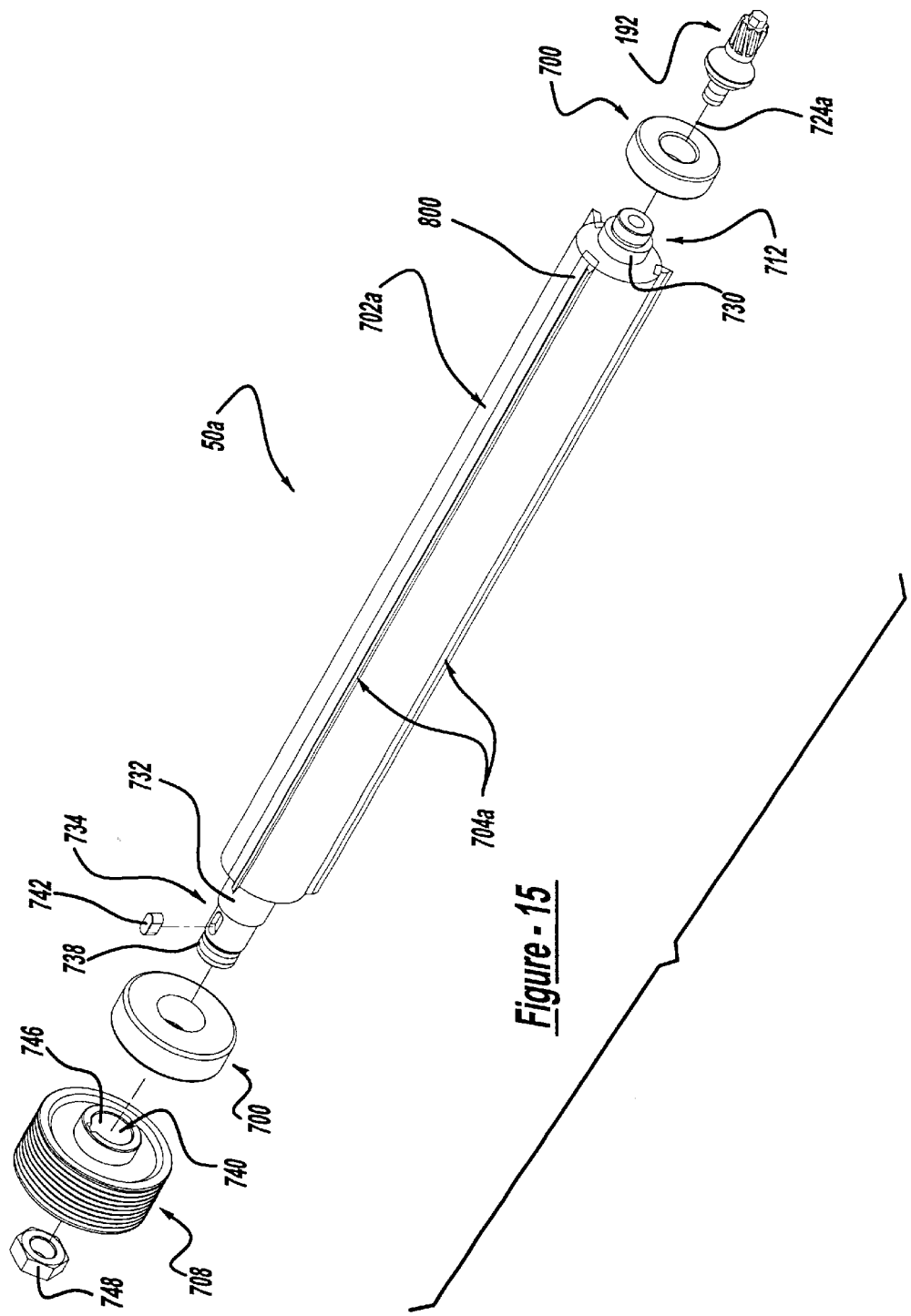
FIG. 15 is an exploded perspective view of a cutter head assembly constructed in accordance with an alternate embodiment of the present invention.
Figure 16:
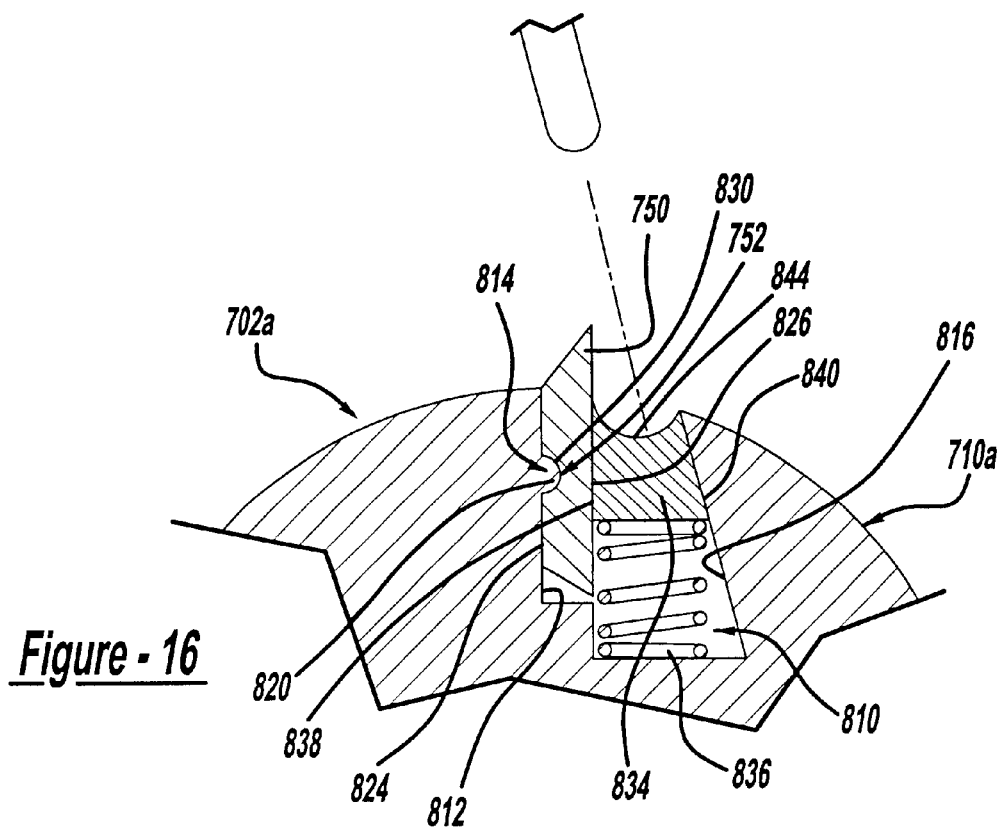
FIG. 16 is a section view taken along the line 16—16 of FIG. 15.

With reference to FIGS. 3 and 14, the cutterhead assembly 50 is shown to be supported for rotation in the cutter pocket 54 formed in the carriage 40 by a pair of bearings 700. In the particular example illustrate, the cutterhead assembly 50 includes a cutter head 702, a plurality of cutter blades 704, a plurality of blade binders 706 and a pulley 708. The cutter head 702 is illustrated to have a body 710 and first and second shaft ends 712 and 714 that are coupled to the opposite ends of the body 710. The body 710 has a cross-section that generally conforms to that of an equilateral triangle. Each side 716 of the body 710 is flat and includes a plurality of threaded attachment apertures 718 and a pair of locator apertures 720. In the example provided, the locator apertures 720 are cylindrical holes, which are aligned along an axis 722 that is parallel the longitudinal axis 724 of the cutter head 702 and sized to engage a pair of locator pins 726 in a press-fit manner.

The first shaft end 712 includes a relatively short shoulder 730 that extends out from the body 710 a sufficient distance to permit it to be press-fit to the inner bearing race of an associated one of the bearings 700. The second shaft end 714 includes a similar shoulder 732 for mounting the other bearing 700, as well as a neck portion 734 having cylindrical body 736 and a threaded end 738. The cylindrical body 736 is sized to engage a shaft aperture 740 that is formed in the pulley 708. A key member 742 engages slots 744 and 746 formed in the cylindrical body 736 and the pulley 708, respectively, to inhibit relative rotation between the cutter head 702 and the pulley 708. A nut 748 is threadably engaged to the threaded end 738 and exerts a clamping force that fixes the pulley 708 onto the cylindrical body 736 and in abutment with the shoulder 732.

In the example illustrated, each of the cutter blades 704 is formed from a flat piece of an appropriate cutting blade material, such as high speed steel. Each cutter blade 704 includes a tip portion 750 and a mounting portion 752. The tip portion 750 is fixedly coupled to the mounting portion 752 and includes a knife edge 754 which cuts the workpiece during the planing operating. Alternatively, the tip portion 750 of the cutter blades 704 may be formed either partly or in total by another material, such as carbide, in a manner that is well known in the art, to provide the cutter blades 704 with a desired characteristic, such as wear resistance or lower overall cost. Also alternatively, a second tip portion 750' may be fixedly coupled to the opposite side of the mounting portion 752, thereby permitting the cutter blade 704 to be flipped relative to the cutter head 702 when the tip portion 750 is dulled or damaged.

The mounting portion 752 includes a plurality of clearance holes 760, a first locating aperture 762 and a second locating aperture 764. The clearance holes 760 are preferably through-holes having a diameter that is somewhat larger than the major diameter of the threaded attachment apertures 718 that are formed in the cutter head 702. The first locating aperture 762 is illustrated to be a circular hole which is sized about equal to or just larger than the diameter of the associated locator pin 726 in the cutter head 702 to provide a fit that is almost line-to-line around the circumference of the locator pin 726. The second locating aperture 764 is illustrated to be an oval slot, having a pair of parallel sidewalls 768 that are spaced apart by a dimension that is about equal to or just larger than the diameter of the associated locator pin 726 in the cutter head 702. The locator pins 726 cooperate with the first and second locating apertures 762 and 764 to locate the knife edge 754 in a location that is parallel to the longitudinal axis 724 of the cutter head 702 and spaced apart therefrom by a predetermined distance.

The blade binders 706 are illustrated to have a first clamping section 770 and a second clamping section 772. The first clamping section 770 is generally flat, being configured to abut the mounting portion 752 of the cutter blade 704 when it is attached to the cutter head 702. The first clamping section 770 includes a plurality of clearance holes 774, which have a diameter that is somewhat larger than the major diameter of the threaded attachment apertures 718 that are formed in the cutter head 702, and a pair of locator clearance holes 776, which are sized to receive the locating pins 726. The locator clearance holes 776 may extend completely through the first clamping section 770 as shown, or may be formed only partly through the first clamping section 770, being of a sufficient depth so as to prevent the abutting face 778 of the first clamping section 770 from contacting the locating pins 726. The second clamping section 772 is fixedly coupled to the first clamping section 770 and is configured to wrap around the trailing edge 780 of the cutter blade 704 and into contact with the side 716 of the cutter head 702.

Conventional threaded fasteners, such as button head cap screws 782 are placed through the clearance holes 774 and 760 in the blade binder 706 and the cutter blade 704, respectively, and threadably engaged to the threaded attachment apertures 718 in the cutter head 702 to produce a clamping force that fixedly but removably couples the blade binder 706 and cutter blade 704 to the cutter head 702. Those skilled in the art will readily appreciate that the locating pins 726 and first and second locating apertures 762 and 764 cooperate to permit the knife edge 754 of the tip portion 750 of the cutter blade 704 to be accurately and repeatably positioned relative to the longitudinal axis 724 of the cutter head 702, thereby rendering the replacement of the cutter blades 704 a relatively uncomplicated and quick task. Those skilled in the art will also understand that the design of the cutterhead assembly 50 may be simplified somewhat, for example, by replacing the locating pins 726 and a corresponding number of screws 782, with conventional and commercially available shoulder screws. Modifications that would facilitate the shoulder screws, such as the counter-boring of the cutter head 702 to accept the shoulder of the shoulder screws, are well within the capabilities of one skilled in the art and as such, will not be discussed in detail herein.

Cutter Head Assembly with Tool-Less Blade Mounting System

With reference to FIGS. 15 through 18, an alternative cutterhead assembly 50a, which is somewhat similar to the cutterhead assembly 50 is illustrated in detail to include a cutter head 702a, a plurality of cutter blades 704a, a cutter blade keeper mechanism 800 and a cutter blade releasing mechanism 802. In contrast to the cutter head 702, the cutter head 702a has body 710a that is generally cylindrically shaped and which includes a plurality of longitudinally extending blade apertures 810. Each blade aperture 810 is shown to include a generally flat reaction wall 812, a locating member 814 fixedly coupled to the reaction wall 812 and a forward wall 816 that tapers rearwardly toward the reaction wall 812 and outwardly toward the outer circumference of the body 710a. The locating member 814 is illustrated to be a semi-cylindrical ridge 820 that is formed into the body 710a, being parallel to and spaced apart from the longitudinal axis 724a of the cutter head 702a by a predetermined distance.

The cutter blades 704a are illustrated to include a tip portion 750 and a mounting portion 752a. The tip portion 750 is identical to the tip portion 750 of the cutter blades 704 and as such, need not be described in detail. The mounting portion 752a is generally flat, having first and second abutting surfaces 824 and 826, respectively. A recess 830 that is configured to engage the locating member 814 is formed into the first abutting surface 824 and permits the first abutting surface 824 to be abutted directly against the reaction wall 812.

The cutter blade keeper mechanism 800 includes a keeper element 834 and a spring member 836. The keeper element 834 includes first and second inwardly tapering sidewalls 838 and 840, respectively. The spring member 836 biases the keeper element 834 in a direction out of the blade aperture 810, driving the sidewalls 838 and 840 into abutment with the second abutting surface 826 of the cutter blade 704a and the forward wall 816 of the blade aperture 810, respectively, to thereby fix the cutter blade 704a relative to the cutter head 702a. The force exerted onto the cutter blade 704a that is attributed to the spring member 836 is relatively small and normally would not be sufficient to ensure that the cutter blade 704a is properly retained in the blade aperture 810 when the cutter blade 704a was subjected to a relatively high cutting force. However, during the operation of the planer mechanism 10, a centrifugal force is generated in response to the rotation of the cutter head 702a. The centrifugal force that is exerted onto the keeper element 834 tends to force the keeper element 834 in a direction outwardly from the cutter head 702a, thereby wedging the keeper element 834 between the second abutting surface 826 and the forward wall 816 and ensuring that the cutter blade 704a is properly retained in the blade aperture 810, even when the cutter blade 704a is subjected to relatively high cutting forces. As those skilled in the art will readily appreciate, the sizing and tolerances of the blade aperture 810, the cutter blade 704a and the keeper element 834 are preferably determined in a manner that does not permit the outer surface 844 of the keeper element 834 to extend radially outwardly beyond a predetermined design point, such as the outer circumference of the cutter head 702a.

Figure 18:
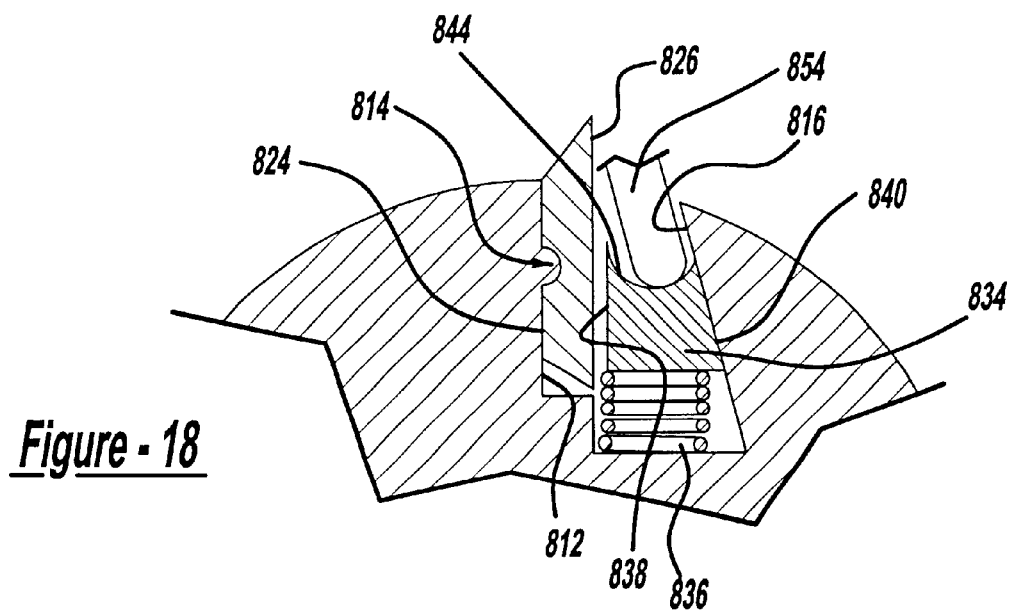
FIG. 18 is a sectional view similar to that of FIG. 16 but illustrating the release levers in the engaged position.
Figure 17:
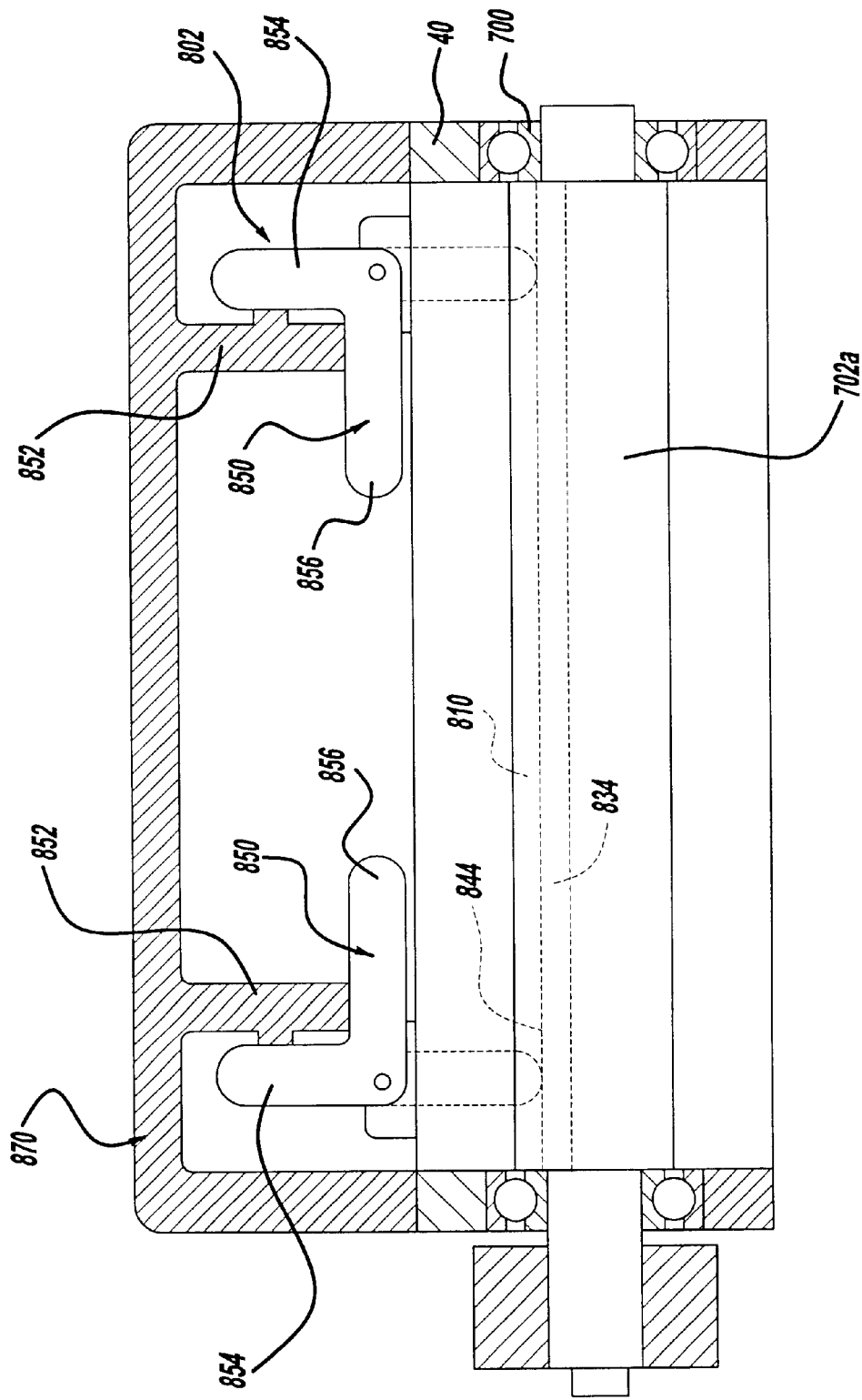
FIG. 17 is a sectional view of the portable planer mechanism of FIG. 15 illustrating the release levers and the lever locks.
Figure 19:
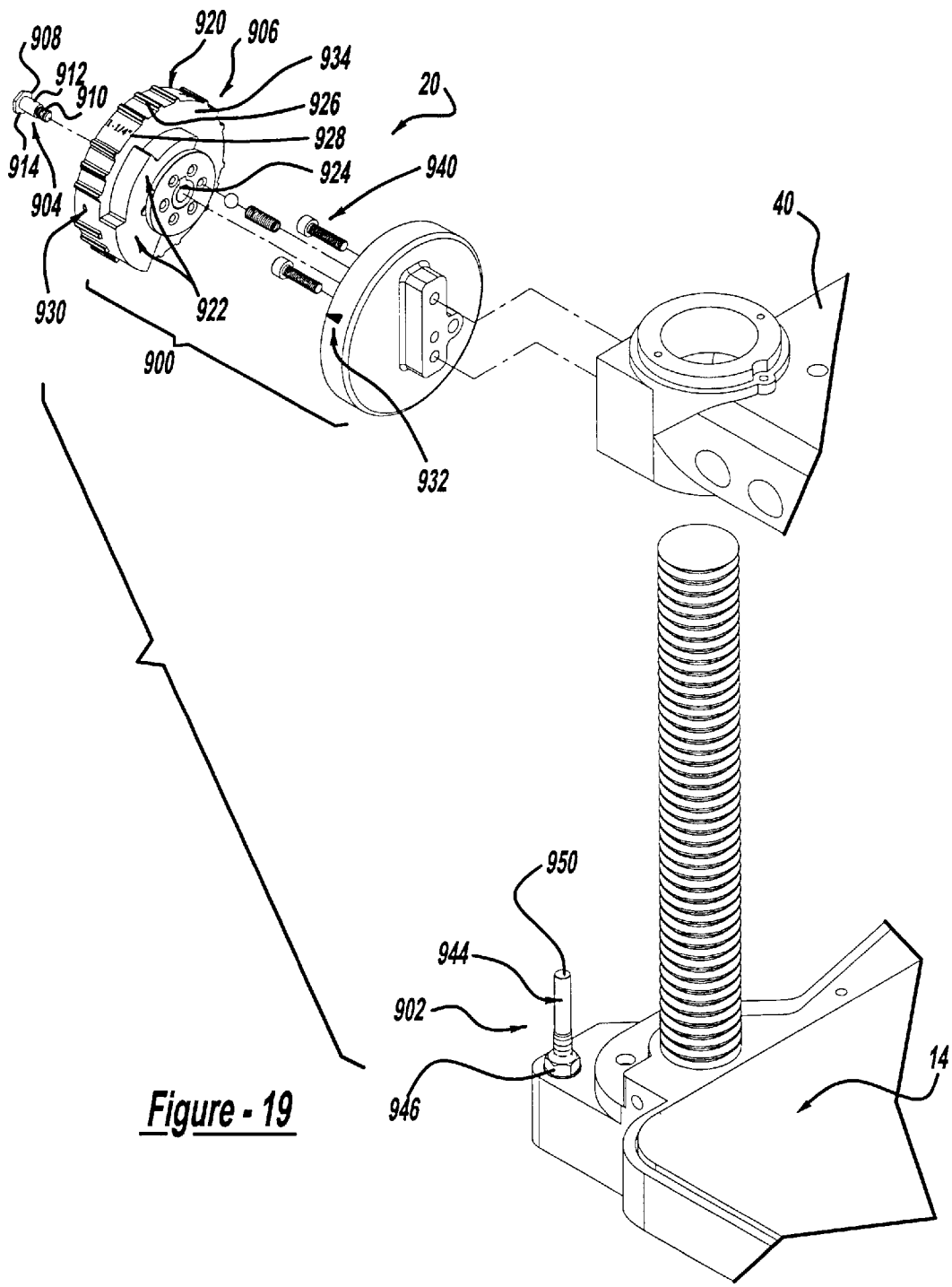
FIG. 19 is an exploded perspective view of a portion of the portable planer mechanism of FIG. 1, illustrating the carriage height setting mechanism in greater detail.
Figure 20:
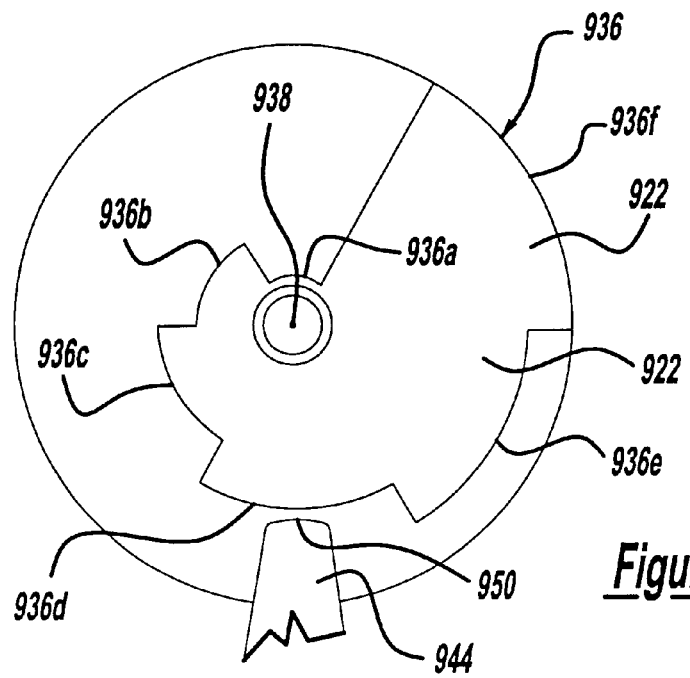
FIG. 20 is a side view of the rotary selector knob.

In FIGS. 17 and 18, the cutter blade releasing mechanism 802 is shown to include a pair of release levers 850 and a pair of lever locks 852. The release levers 850 are generally L-shaped having a keeper engaging portion 854 that is disposed generally perpendicularly to a handle portion 856. The release levers 850 are pivotally coupled to the carriage 40 at the intersection between the keeper engaging portion 854 and the handle portion 856, permitting the keeper engaging portion 854 to be pivoted between a retracted position, shown in solid line in FIG. 17, and an engaged position, shown in phantom in FIG. 17, wherein the keeper engaging portion 854 is rotated downwardly into the cutter pocket 54 in the carriage 40 and against the outer surface 844 of the keeper element 834 to push the keeper element 834 downwardly and away from the cutter blade 704a as illustrated in FIG. 18. In the embodiment illustrated, the tip 862 of the keeper engaging portion 854 is defined by a radius which permits the tip 862 to matingly engage the outer surface 844 of the keeper element 834. Those skilled in the art will understand, however, that the configurations of the tip 862 and the outer surface 844 are merely exemplary and as such, are not intended to limit the scope of the present invention in any manner.

The lever locks 852 are fixedly coupled to the dust hood 870 that covers the cutter pocket 54, extending downwardly from the dust hood 870 and against the handle portion 856 of the release levers 850. The lever locks 852 are configured to inhibit the rotation of the release levers 850 relative to the carriage 40 when the dust hood 870 is coupled to the carriage 40 to thereby prevent the lever locks 852 from rotating out of the retracted position and into contact with the cutter head 702a and cutter blades 704a. Accordingly, when maintenance or removal of the cutter blades 704a is required, the dust hood 870 is removed to both permit access to the cutterhead assembly 50a as well as to permit the release levers 850 to be positioned into the engaged position.

Carriage Height Setting Mechanism

With reference to FIGS. 2 and 19 through 21, the carriage height setting mechanism 20 is shown to include a stop adjustment assembly 900 and a stop member 902. In the particular embodiment illustrated, the stop adjustment assembly 900 includes a shaft member 904 and a rotary selector knob 906. The shaft member 904, which is illustrated to be a conventional shoulder bolt 908, includes a threaded portion 910, which is fixedly coupled to a side of the carriage 40, a shoulder portion 912, which rotatably supports the rotary selector knob 906, and a head portion 914, which ensures that the rotary selector knob 906 is retained on the shoulder portion 912.

The rotary selector knob 906 includes a gripping portion 920, a plurality of cam sectors 922 and a mounting aperture 924 through which the shoulder portion 912 of the shoulder bolt 908 is disposed. The gripping portion 920 includes a plurality of cylindrical grooves 926 which are configured to receive the fingers and thumbs of the operator of the planer mechanism 10 so that the rotary selector knob 906 may be easily rotated about the shoulder bolt 908. The gripping portion 920 also includes a scale 928 having a plurality of height markings 930, which when employed in conjunction with a reference datum 932 fixedly coupled to the carriage 40, permits the operator to readily identify the rotational position of the rotary selector knob 906 and more specifically, the particular cam sector 922 that has been selected for use in conjunction with the stop member 902.

The cam sectors 922 are fixedly coupled to the inward side 934 of the gripping portion 920. In the particular embodiment illustrated, the rotary selector knob 906 is configured with six (6) equally sized cam sectors 922, with each of the cam sectors 922 being defined by an included angle of approximately 60°. Each cam sector 922 has a cam surface 936 that is disposed radially outwardly from the axis 938 of the mounting aperture 924 by a predetermined distance. As shown, a first one of the cam surfaces 936a is spaced a first distance away from the axis 938 and each subsequent cam surface 936b, 936c, 936d, 936e and 936f is located a predetermined distance further away from the axis 938 than the cam surface 936 of the immediately preceding cam sector 922.

Those skilled in the art will understand that the number of cam sectors 922 may be increased or decreased from that which is illustrated to provide a desired number of cam surfaces. Those skilled in the art will also understand that although the cam sectors 922 are defined by an equally sized included angle and the cam surfaces 936 are spaced radially outward from a minimum (cam surface 936a) to a maximum (cam surface 936f) in equal increments, the sizing of the cam sectors 922 and the spacing apart of the cam surfaces 936 need not be equal.

Preferably, the stop adjustment assembly 900 also includes a means for inhibiting the rotation of the rotary selector knob 906 relative to the carriage 40. Rotation inhibiting means, which are known in the art and need not be discussed in detail herein, include, for example, a detent mechanism 940 and friction washers (not shown), which exert a force onto a face of the rotary selector knob 906 that prevents the rotary selector knob 906 from spinning freely on the shaft member 904.

In the example illustrated, the stop member 902 is illustrated to include a threaded stud 944 and a lock nut 946. The threaded stud 944 is threadably engaged to a stud mounting aperture 948 formed into the base structure 310. The distal end of the threaded stud 944 terminates at a contact tip 950 that is configured to contact the cam surfaces 936 of the cam sectors 922. Preferably, the contact tip 950 is defined by a spherical radius that ensures contact with the cam surfaces 936 in a reliable and repeatable manner. The lock nut 946 is threadably engaged to the threaded stud 944 and rotated into contact with the base structure 310 to generate a clamping force that fixes the threaded stud 944 relative to the base structure 310.

In operation, the planer carriage assembly 12 is initially indexed to a higher position than is ultimately desired. The operator next rotates the gripping portion 920 of the rotary selector knob 906 to align a desired height marking 930 on the scale 928 with the reference datum 932 formed onto the carriage 40. The operator then rotates the hand wheel 510 to lower the planer carriage assembly 12 in the manner discussed above. As the planer carriage assembly 12 is being lowered, the cam surface 936 of the cam sector 922 which corresponds to the desired height marking 930 is simultaneously lowered onto the stop member 902. Contact between the contact tip 950 and the cam surface 936 inhibits further lowering of the planer carriage assembly 12 as well as accurately and repeatably positions the planer carriage assembly 12 such that the knife edge 754 of the cutter blades 704 are positioned above the planing surface 370 by a distance that is related to the height marking 930. Thereafter, the planer carriage locking mechanism 18 is employed to lock the planer carriage assembly 12 in place.

As those skilled in the art will readily understand, the height of the contact tip 950 relative to the base structure 310 must be calibrated prior to the use of the carriage height setting mechanism 20. The calibration process ensures that the amount by which the knife edge 754 of the cutter blades 704 are positioned above the planing surface 370 is equal to the particular height marking 930 to which the rotary selector knob 906 is adjusted. In its most basic form, the height of the contact tip 950 can be calibrated through an iterative process wherein the carriage height setting mechanism 20 is employed to set the height of the planer carriage assembly 12, a workpiece is planed, the thickness of the workpiece is compared with the selected height marking 930 and the difference between the height marking 930 and the thickness of the workpiece is employed as necessary to adjust the location of the contact tip 950. The calibration process is complete when the stop member 902 is fully secured to the base structure 310 and the carriage height setting mechanism 20 can be employed to produce a planed workpiece having a thickness that is equal to the height marking 930 that has been selected.

Figure 21:
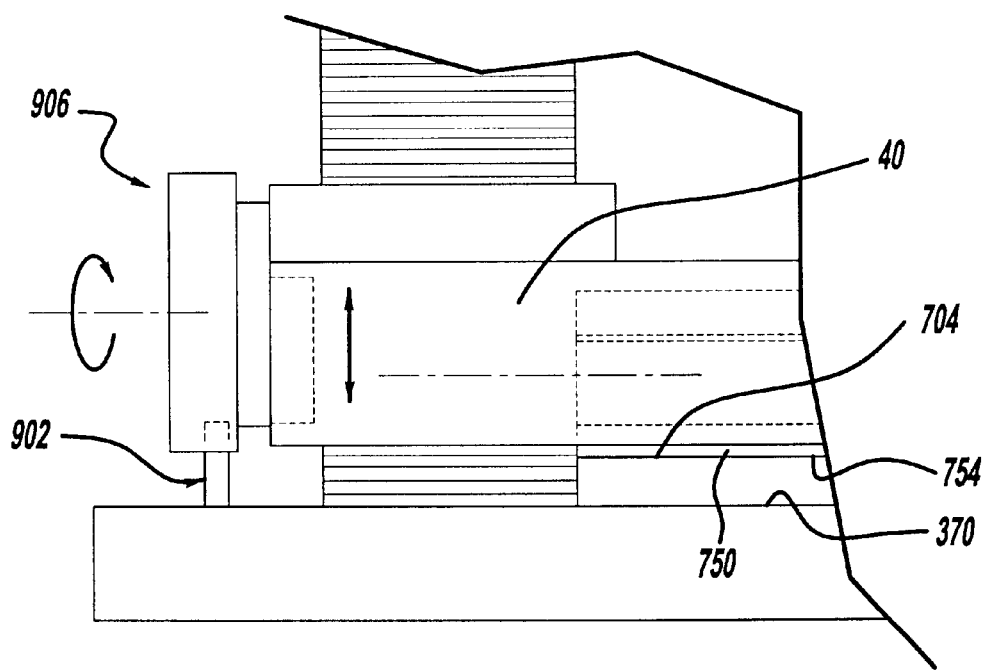
FIG. 21 is a partial sectional view of the portable planer mechanism taken through the longitudinal axis of the stop member.
Figure 21A:
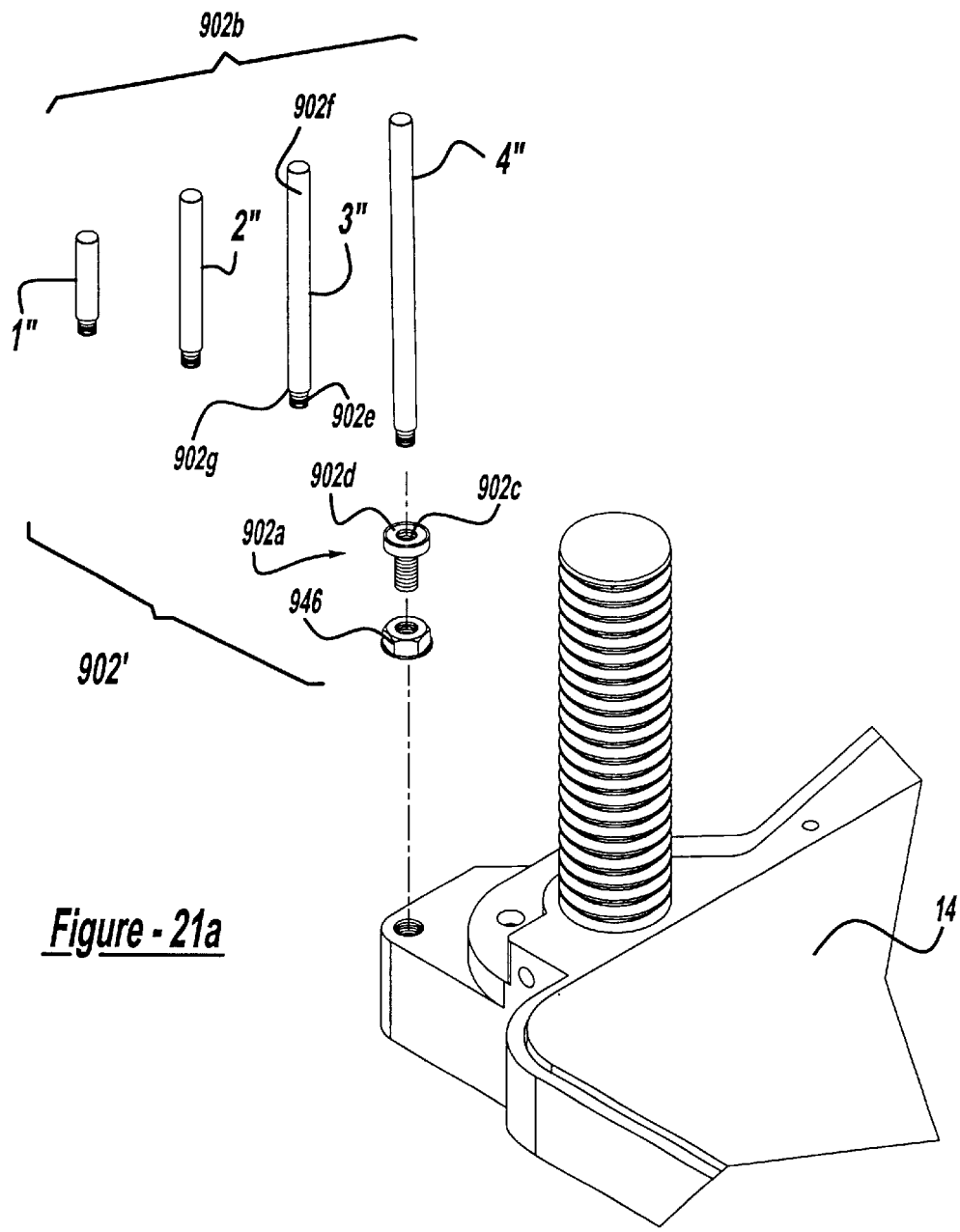
FIG. 21a is a view similar to that of FIG. 19 but showing an alternately constructed carriage height setting mechanism.
Figure 22:
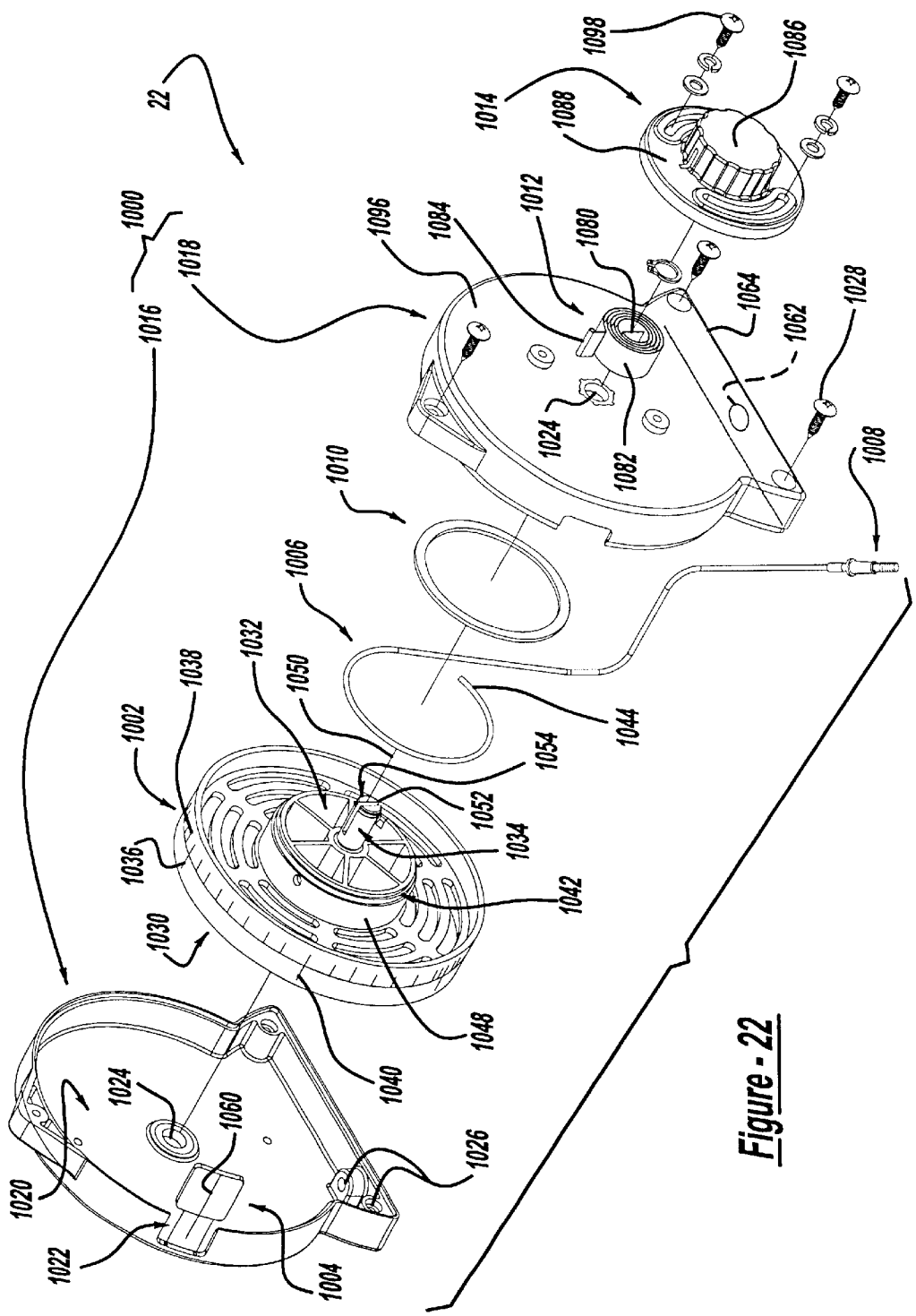
FIG. 22 is an exploded perspective view of a portion of the portable planer mechanism of FIG. 1, illustrating the height scale mechanism in greater detail.
Figure 23:
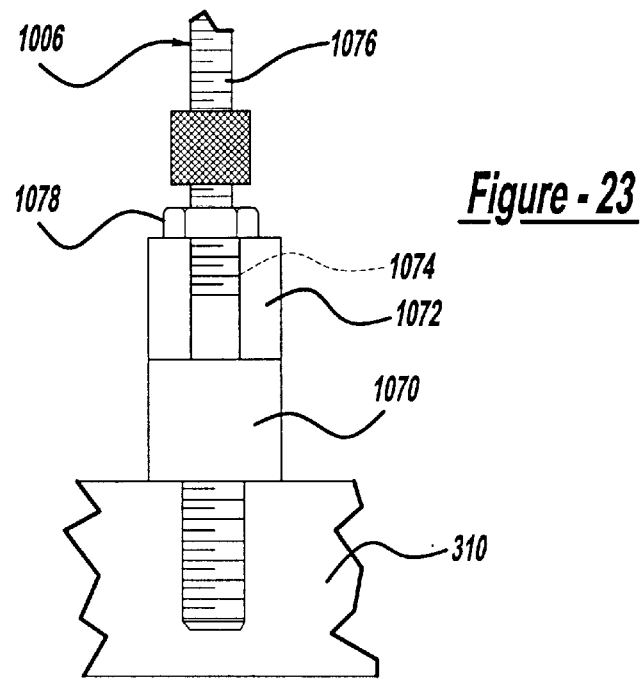
FIG. 23 is an enlarged perspective view of a portion of the height scale mechanism illustrating the coupling of the wire member to the base assembly.
Figure 24:
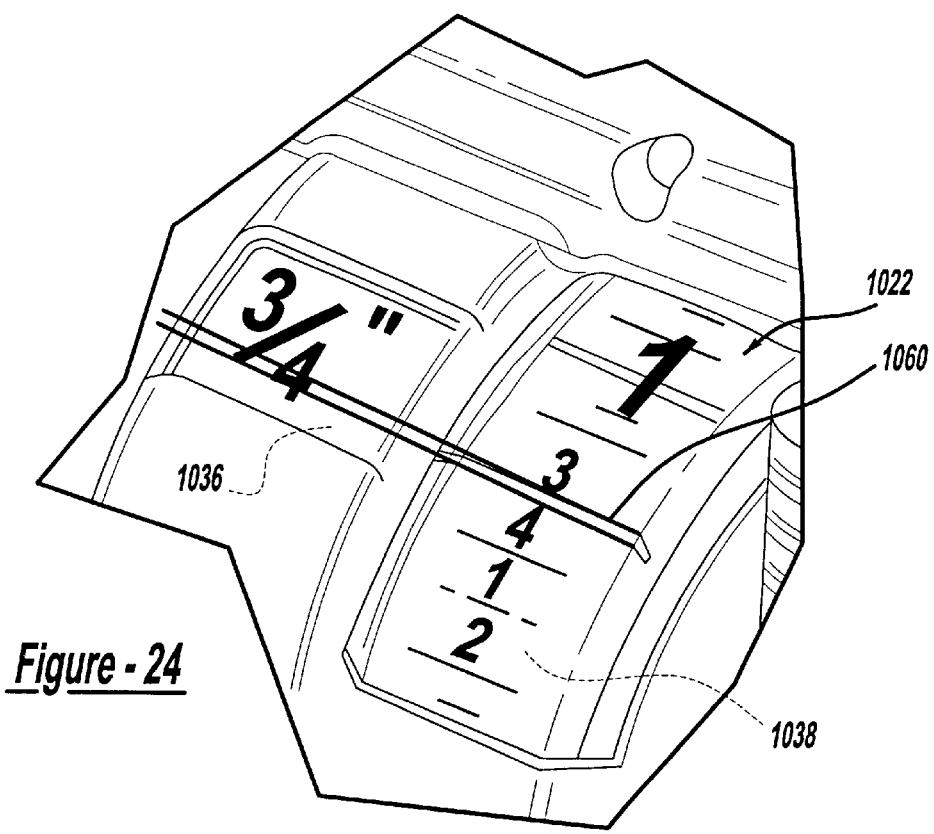
FIG. 24 is an enlarged perspective view of a portion of the height scale mechanism illustrating the operation of the rotary scale.

An alternately constructed carriage height setting mechanism 20' is illustrated in FIG. 21*a*. The carriage height setting mechanism 20' is similar to the carriage height setting mechanism 20, except that the stop member 902 is replaced by a stop mechanism 902'. The stop mechanism 902' includes a bushing 902*a* and a set of pins 902*b*. The bushing 902*a* is coupled to the base 14 in a manner similar to that of the stop member 902 (i.e., threadably engaged to the base 14, with its height being adjusted through a jam nut 946). The bushing 902*a* includes an internally threaded hole 902*c* and defines a lower datum 902*d*. Each of the pins in the set of pins 902*b* includes a threaded post 902*e* that is sized to threadably engage the internally threaded hole 902*c*, and a body 902*f* that extends upwardly of a upper datum 902*g*. Each of the pins that comprise the set of pins 902*b* are differently sized, varying in the example provided by one inch.

In operation, the user of the planer 10 selects pin that would cooperate with the stop adjustment assembly 900 (FIG. 19) to provide a range of carriage heights that include a height dimension to which the carriage 12 is to be lowered. The pin would then be threadably coupled to the bushing 902*a* such that the upper datum 902*g* was in contact with the lower datum 902*d*. If it is subsequently necessary to change the height of the carriage 12 to a height that is not within the range that is provided by the pin and the stop adjustment assembly 900, another pin may be substituted for the pin that is engaged to the bushing 902*a*, or alternatively, the pin may be removed altogether from the bushing 902*a*. In this regard, the stop adjustment assembly 900 may be brought directly into contact with the lower datum 902*d*.

Height Scale Mechanism

With reference to FIGS. 2 and 22 through 24, the height scale mechanism 22 is illustrated to include a housing 1000, a rotary scale 1002, a pointer 1004, an engagement member 1006, a coupler 1008, an annular plate 1010, a torsion spring 1012 and a tension wheel 1014. The housing 1000 is illustrated to be formed by a pair of housing halves 1016 and 1018 which are injected molded from a thermoplastic resin and which collectively define a scale cavity 1020 and a pointer aperture 1022. Each housing half 1016 and 1018 includes a scale shaft aperture 1024 and a plurality of mounting bosses 1026 which permit the housing halves 1016 and 1018 to be secured to one another and to the carriage 40 via conventional threaded fasteners 1028.

The rotary scale 1002 includes first and second drum portions 1030 and 1032, respectively, and a scale shaft 1034. The first drum portion 1030 is cylindrically shaped, having first and second scales 1036 and 1038, respectively, each of which including a plurality of premarked height indications 1040. In the example provided, the first scale 1036 provides height indications 1040 that are spaced apart by a first predetermined interval, ¼ inch for example, and the second scale provides height indications 1040 that are spaced apart by a second predetermined interval that is relatively smaller than the first predetermined interval, ¹⁄₃₂ inch for example. Those skilled in the art will understand, however, that the first and second scales 1036 and 1038 may alternatively be have height indications 1040 corresponding to two different measuring systems, such as inches and millimeters.

The second drum portion 1032 is also cylindrically shaped and is fixedly coupled to the first drum portion 1030 such that their rotational axes are coincident. The second drum portion 1032 includes an attachment feature, such as a slot 1042, that permits a first end 1044 of the engagement member 1006, which is illustrated to be a wire in the example provided, to be fixedly coupled to the outer perimeter of the second drum portion 1032 in a predetermined radial position. The annular plate 1010 is fixedly coupled to the end of the second drum portion 1032 opposite the first drum portion 1030, creating a U-shaped annular channel 1048. The engagement member 1006 is wrapped around the outer circumference of the second drum portion 1032 and lies in the U-shaped annular channel 1048.

The scale shaft 1034 is cylindrically shaped and extends through the first and second drum portions 1030 and 1032. The axis 1050 of the scale shaft 1034 is located coincident with the rotational axes of the first and second drum portions 1030 and 1032. The portion of the scale shaft 1034 that extends outwardly from the second drum portion 1032 includes a slotted spring tab aperture 1052 and a knurled end portion 1054, both of which will be discussed in greater detail, below.

The rotary scale 1002 is positioned in the housing 1000 such that the scale shaft 1034 extends into the scale shaft apertures 1024 in housing halves 1016 and 1018 and the first and second drum portions 1030 and 1032 are supported for rotation in the scale cavity 1020. The pointer 1004, which is illustrated to be a formed from a clear plastic material, is sized to engage the housing halves 1016 and 1018 and cover the pointer aperture 1022 to thereby permit the operator of the planer mechanism 10 to read the first and second scales 1036 and 1038 on the first drum portion 1030. The pointer 1004 includes a reference mark 1060, which is illustrated to be a relatively thin red line that crosses the length of the pointer 1004, to permit the operator to accurately read the first and second scales 1036 and 1038 and identify the particular height indication 1040 which corresponds to the height of the planer carriage assembly 12 relative to the planing surface 370. The engagement member 1006 extends out a hole 1062 in the bottom surface 1064 of the housing 1000 and thereafter, the housing halves 1016 and 1018 are coupled together.

The engagement member 1006 is fed through a corresponding hole 1066 in the carriage 40. Thereafter, the housing 1000 is coupled to the carriage 40 and the second end of the engagement member 1006 is pulled through the carriage 40 and coupled to the coupler 1008 that is fixedly coupled to the base structure 310. In the particular example provided, the coupler 1008 includes a first portion 1070, which is fixedly attached to the base structure 310, and a second portion 1072 which is coupled to the first portion 1070 but rotatable relative to the base structure 310. The distal end of the second portion 1072 is illustrated to include a threaded aperture 1074 which is sized to threadably engage a threaded coupling 1076 that is fixed to the second end of the engagement member 1006. Adjustment of the position of the engagement member 1006 is accomplished by controlling the amount by which the threaded coupling 1076 is engaged into the threaded aperture 1074. A jam nut 1078 is employed to fix the location of the second end of the engagement member 1006 relative to the base structure 310.

The torsion spring 1012 is illustrated to be a conventional a coiled, flat band spring of the type that are commonly employed with spring-retracting measuring tapes (tape measurers) and includes a first retaining tab 1080, which is formed into a first end of the flat band 1082, and a second retaining tab 1084, which is formed into the opposite end of the flat band 1082. The first retaining tab 1080 extends radially through an axis about which the flat band 1082 is coiled. The second retaining tab 1084 extends radially outwardly from the coiled band 1082. The torsion spring 1012 is mounted to the portion of the scale shaft 1034 that extends outwardly beyond the housing half 1018 such that the first retaining tab 1080 is disposed within the slotted spring tab aperture 1052.

Figure 25:
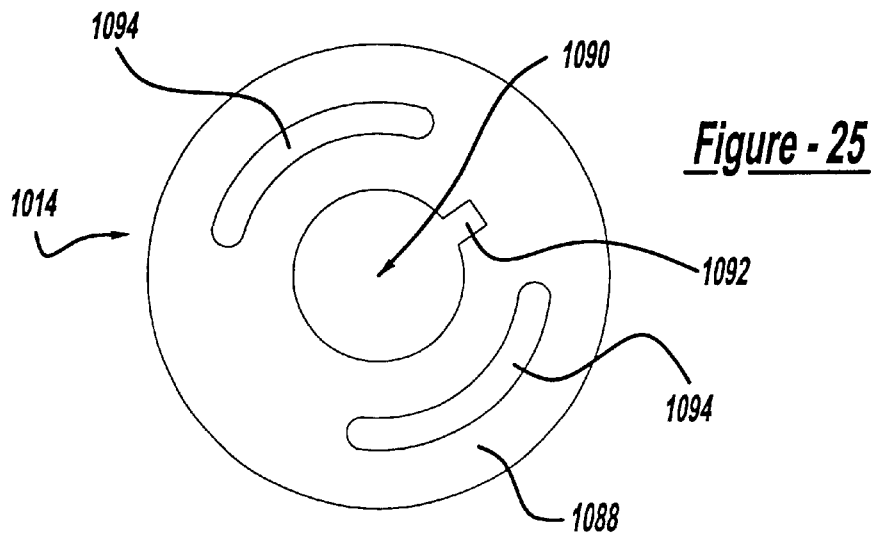
FIG. 25 is a rear view of the tension wheel.

The tension wheel 1014 is illustrated to include a hollow cylindrical adjustment knob 1086 and a mounting flange 1088. With additional reference to FIG. 25, the adjustment knob 1086 defines a hollow cavity 1090, which is sized to receive the torsion spring 1012 and a radially outwardly extending slot 1092, which is sized to receive the second retaining tab 1084. The mounting flange 1088 extends radially outwardly of the adjustment knob 1086 and includes a plurality of mounting slots 1094 which permit the tension wheel 1014 to be coupled to the outer surface 1096 of the housing half 1018 via a pair of conventional screws 1098.

The mounting slots 1094 permit the tension wheel 1014 to be rotated relative to the housing 1000 when the screws 1098 are loosened somewhat to permit the rotational position of the slot 1092 to be adjusted relative to the housing 1000 to thereby ensure that the torsion spring 1012 applies an appropriate level of torsion to the scale shaft 1034. Torsion applied to the scale shaft 1034 biases the rotary scale 1002 in a direction that tends to winds the engagement member 1006 onto the second drum portion 1032 of the rotary scale 1002. The rotatable nature of the tension wheel 1014 relative to the housing 1000 may also be used to change the relative position of the rotary scale 1002 relative to the housing 1000.

As the engagement member 1006 is coupled to both the rotary scale 1002 and the base structure 310, and as the torsion spring 1012 exerts a biasing force to the rotary scale 1002 which maintains tension in the engagement member 1006, movement of the planer carriage assembly 12 in the vertical direction will cause corresponding rotation of the rotary scale 1002. Controlled rotation of the rotary scale 1002 in relation to the vertical travel of the planer carriage assembly 12 is achieved through the dimensioning of the second drum portion 1032. More specifically, the circumference of the second drum portion 1032 is sized to correspond to the maximum vertical distance that the planer carriage assembly 12 can move relative to the planing surface 370. For example, if the maximum vertical distance that the planer carriage assembly 12 can move relative to the planing surface 370 is 6 inches, the circumference (C) of the second drum portion 1032 is set equal to 6 inches and the equation $C = \pi \times d$ is employed to solve for the diameter (d) of the second drum portion 1032. In this example, the diameter (d) of the second drum portion 1032 is about 1.9099 inches.

In contrast to the diameter of the second drum portion 1032, the diameter of the first drum portion 1030 is selected on the basis of several different factors, including a desired degree of magnification and the capability of the rotary scale 1002 to be packaged into the planer mechanism 10. As those skilled in the art will understand, magnification is accomplished by sizing the diameter of the first drum portion 1030 larger than the diameter of the second drum portion 1032.

The placement of the first and second scales 1036 and 1038 on the first drum portion 1030 is also achieved with reference to the maximum vertical distance that the planer carriage assembly 12 can move relative to the planing surface 370. In the example provided, the first scale 1036 includes height indications 1040 at every ¼ inch, the second scale 1038 includes height indications 1040 at every ⅟₃₂ inch and the maximum vertical distance that the planer carriage assembly 12 can move relative to the planing surface 370 is 6 inches. Accordingly, the first scale includes 24 evenly spaced height indications 1040 (i.e., 15° apart) and the second scale 1038 includes 192 evenly spaced height indications 1040 (1.875° apart) around the circumference of the first drum portion 1030.

As those skilled in the art will understand, the height scale mechanism 22 must be calibrated prior to its use to ensure that the height dimension that is indicated by the first and second scales 1036 and 1038 corresponds to the actual height at which the knife edge 754 of the cutter blades 704 are positioned above the planing surface 370. Those skilled in the art will readily understand that the calibration process is substantially similar to that described for the calibration of the carriage height setting mechanism 20 described above. Briefly, a workpiece is initially planed and its thickness is then measured. The thickness of the workpiece is next compared to the height dimension that is indicated by the first and second scales 1036 and 1038 and the amount by which the threaded coupling 1076 is engaged into the threaded aperture 1074 is adjusted as necessary to align the reference mark 1060 on the pointer 1004 to the appropriate height indications 1040 on the first and second scales 1036 and 1038.

Although the height scale mechanism 22 of the present invention has been illustrated as having an engagement member 1006 that has been formed from a wire, those skilled in the art will understand that the height scale mechanism may be constructed somewhat differently. For example, the engagement member may be a rigid rack 1006', as illustrated in FIG. 25a, having a plurality of gear teeth 1006a that meshingly engage a plurality of gear teeth 1006b that are formed into the outer circumference of the second drum portion 1032. This modification would eliminate the need for the annular plate 1010, the torsion spring 1012 and the tension wheel 1014 and would also require modifications to the coupler 1008 that would permit the engagement member 1006 to maintain engaged with the gear teeth on the second drum portion 1032 while the coupler 1008 is being adjusted.

Material Removal Gauge

Figure 27:
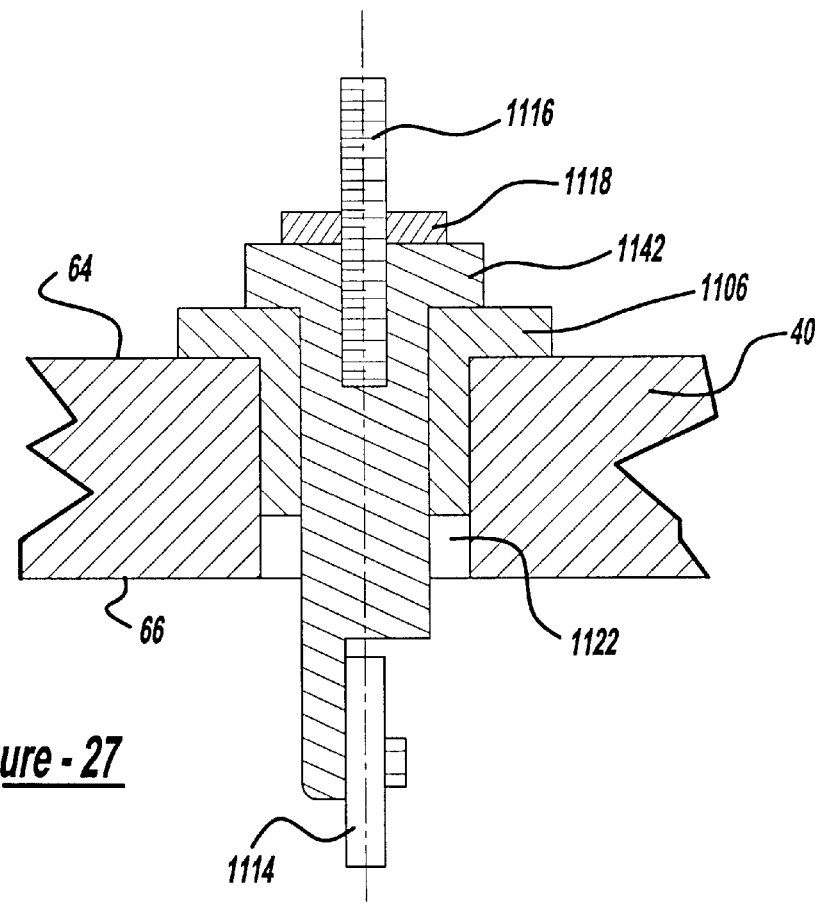
FIG. 27 is a cross-sectional view taken along the line 27—27 of FIG. 1.
Figure 26:
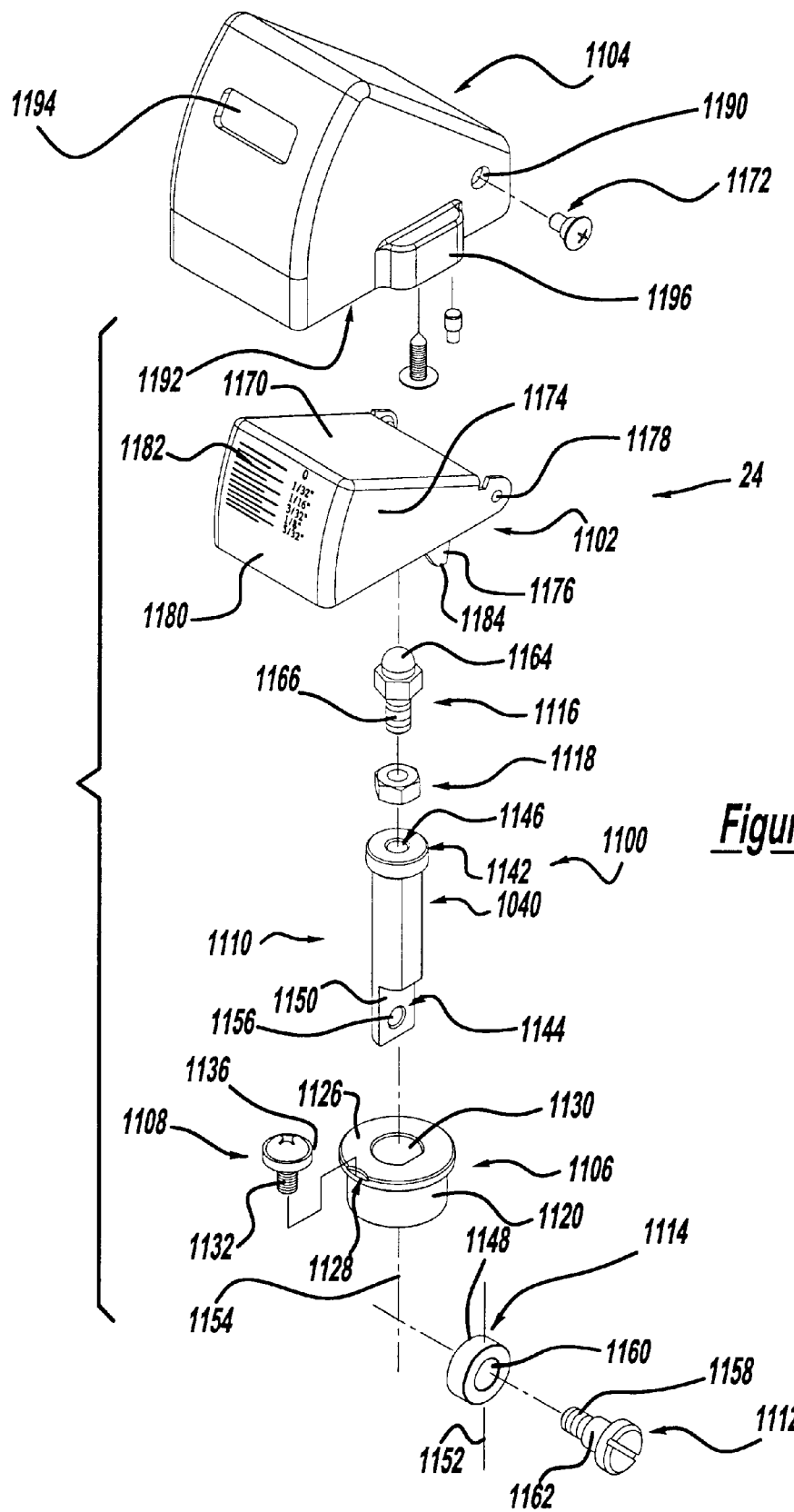
FIG. 26 is an exploded perspective view of a portion of the portable planer mechanism of FIG. 1, illustrating the material removal gauge.

With reference to FIGS. 2, 26 and 27, the material removal gauge 24 is illustrated to include a follower assembly 1100, a pointer assembly 1102 and a pointer housing 1104. The follower assembly 1100 is illustrated to include a bushing 1106, a lock screw 1108, a post 1110, a shoulder screw 1112, a roller 1114, an adjustment rod 1116, and a nut 1118. In the example provided, the bushing 1106 is illustrated to be a conventional headed, slip-fit, replaceable bushing, such as those that are commercially available from the Carr-Lane Manufacturing Company. The bushing 1106 has a body 1120 with an outer diameter that is sized to slip fit into a bushing aperture 1122 that is formed in the carriage 40 forwardly of the cutter pocket 54 and proximate the forward edge 1124 of the carriage 40. The axis of the bushing aperture 1122 is aligned generally parallel the axes of the nut apertures 60 that are formed in the carriage 40. The bushing 1106 also includes a head 1126, which is sized relatively larger than the bushing aperture 1122 and into which a conventional lock screw recess 1128 is formed, as well as a D-shaped bushing bore 1130 that extends completely through the bushing 1106.

A commercially available lock screw 1108 having a threaded portion 1132, a cylindrical body portion 1134 and a head portion 1136 is employed to retain the bushing 1106 to the carriage 40 in a conventional manner that need not be discussed in detail. Briefly, the body 1120 of the bushing 1106 is placed in the bushing aperture 1122, the head 1126 of the bushing 1106 is abutted against the top surface 64 of the carriage 40 and the bushing 1106 is rotated to align the lock screw recess 1128 with a threaded lock screw mounting aperture (not specifically shown) formed into the carriage 40. The threaded portion 1132 of the lock screw 1108 is threadably engaged to the lock screw mounting aperture such that the head portion 1136 of the lock screw 1108 exerts a clamping force onto the head 1126 of the bushing 1106 which retains it in the carriage 40. The body portion 1134 of the lock screw 1108 is disposed within the lock screw recess 1128 and prevents the bushing 1106 from rotating in the bushing aperture 1122. Those skilled in the art will understand that other types of commercially available bushings may be substituted for the bushing 1106 and lock screw 1108 illustrated, including a press-fit headed and headless bushings and press-fit serrated bushings.

The post 1110 is illustrated to have a D-shaped body 1140, which is sized to slip-fit in the bushing bore 1130, a post head 1142, which is coupled to a first end of the body 1140, a roller mounting flange 1144, which is coupled to the opposite end of the body 1140, and a threaded aperture 1146 is formed through the post head 1142 and into the body 1140. The post head 1142 is sized generally larger than the body 1140 to prevent the post 1110 from sliding downwardly out of the bushing bore 1130. The roller mounting flange 1144 is a "flat" that has been machined onto the end of the body 1140 such that when a face 1148 of the roller 1114 is abutted against the mounting surface 1150 of the roller mounting flange 1144, the vertical centerline 1152 of the roller 1114 is coincident with the centerline 1154 of the post 1110. The roller mounting flange 1144 includes a threaded aperture 1156 which is sized to threadably engage the threaded portion 1158 of the shoulder screw 1112.

The roller 1114 is generally cylindrically shaped, having a mounting aperture 1160 that is sized to receive the body 1162 of the shoulder screw 1112. The shoulder screw 1112 is placed through the roller 1114 and threadably engaged to the threaded aperture 1156 of the roller mounting flange 1144 to thereby journally support the roller 1114 for rotation about an axis that is generally perpendicular to the axis of the post 1110.

The adjustment rod 1116 is a cylindrically shaped post, having a contact tip 1164, which is configured to contact a portion of the pointer assembly 1102, and a threaded body 1166 that is sized to threadably engage the nut 1118 and the threaded aperture 1146 that is formed into the end of the post 1110. Calibration of the material removal gauge 24 is accomplished by rotating the adjustment rod 1116 within the threaded aperture 1146 and fixing the relationship of the adjustment rod 1116 and post 1110 by tightening the nut 1118 against the post head 1142. The process through which the material removal gauge 24 is calibrated will be discussed in more detail, below.

The pointer assembly 1102 is illustrated to include a unitarily formed pointer 1170 and a shaft 1172 that supports the pointer 1170 for rotation in the pointer housing 1104. The pointer 1170 includes a scale structure 1174 and a lever 1176. The scale structure 1174 includes a mounting aperture 1178 through which the shaft 1172 is disposed, and a scale surface 1180 which conforms to a predetermined radius that is centered at the center of the mounting aperture 1178. The scale surface 1180 includes a plurality of height indications 1182 that may be engraved, printed, silk screened, hot-stamped, embossed, molded onto or otherwise permanently marked or attached thereto. The lever 1176 is fixedly coupled to the scale structure 1174 and includes a contact member 1184 that is configured to contact the upper surface 1186 of a workpiece 300 (FIG. 1) that is being pushed into the planer mechanism 10. The contact member 1184 is preferably disposed radially outwardly from the center of the mounting aperture 1178 by a distance which is relatively smaller than the distance between the center of the mounting aperture 1178 and the scale surface 1180 so as to provide the material removal gauge 24 with a desired degree of magnification in a manner that is similar to the magnification that is achieved by the height scale mechanism 22.

Figure 28:
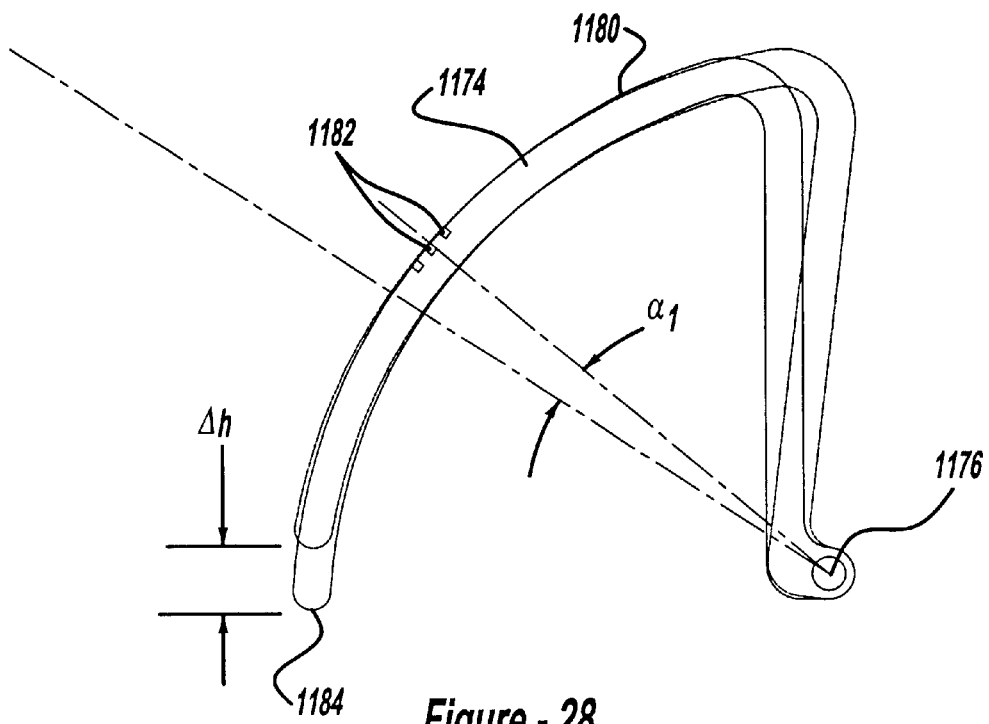
FIG. 28 is a sectional view illustrating an exemplary pointer that does not provide a magnification effect.
Figure 29:
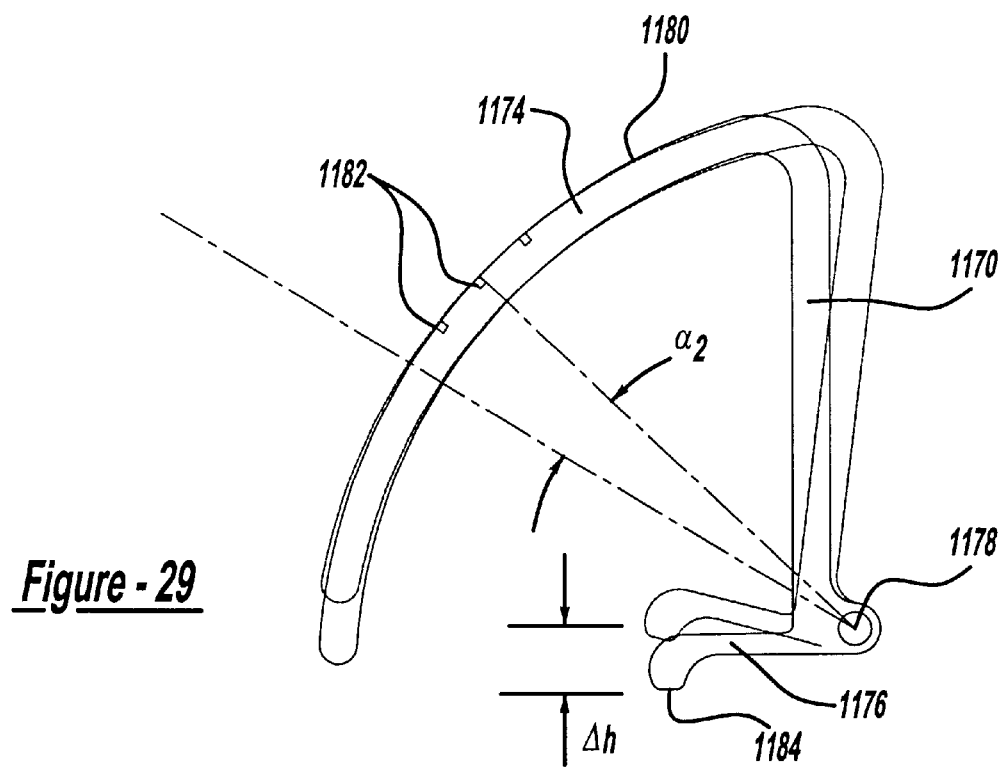
FIG. 29 is a sectional view illustrating an exemplary pointer that provides a magnification effect.

The magnification effect is illustrated in FIGS. 28 and 29. In FIG. 28, the contact member 1184 and the scale surface 1180 are disposed radially outwardly from the center of the mounting aperture 1178 by a common distance. A vertical displacement of the contact member 1184 by a distance $\Delta h$ causes the scale surface 1180 to rotate through an angle having a magnitude of $\alpha 1$. In contrast, when the scale surface 1180 is disposed radially outwardly of the contact member 1184 as illustrated in FIG. 29, the vertical displacement of the contact member 1184 by the distance $\Delta h$ causes the scale surface 1180 to rotate through an angle having a magnitude of $\alpha 2$, which is illustrated to be substantially larger than $\alpha 1$. As such, the height indications 1182 on the scale surface 1180 of the pointer 1170 that is illustrated in FIG. 29 are spaced relatively further apart as compared to the height indications 1182 on the pointer 1170 that is illustrated in FIG. 28. As such, the embodiment illustrated in FIG. 29 may be read with a higher degree of accuracy.

Figure 30:
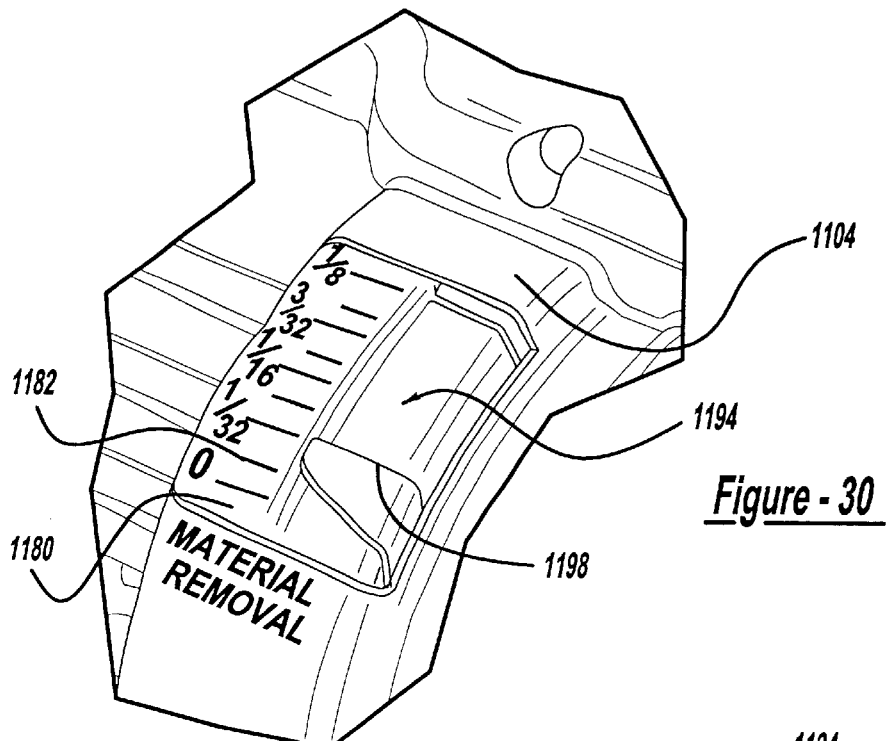
FIG. 30 is a front view of the pointer housing.

Referring back to FIGS. 2, 26 and 27, and with additional reference to FIG. 30, the pointer housing 1104 includes a shaft aperture 1190, which is sized to receive the shaft 1172, a pointer aperture 1192, which is sized to permit the pointer 1170 to rotate therein through a predetermined included angle, a scale window 1194 and a plurality of mounting lugs 1196 that permit the pointer housing 1104 to be fixedly coupled to the carriage 40. The scale window 1194 is disposed in close proximity with the scale surface 1180 to minimize parallax and includes a reference datum 1198, such as a thin red horizontal line, which permits the operator of the planer mechanism 10 to accurately read the scale surface 1180.

As mentioned above, calibration of the pointer 1170 is necessary prior to the use of the material removal gauge 24. This is accomplished by adjusting the effective height of the follower assembly 1100 until the amount of material that is removed from a workpiece 300 during the planing operation is consistent with the reading of the scale surface 1180 of the pointer 1170. As discussed above, the effective height of the follower assembly 1100 is adjusted by rotating the adjustment rod 1116 within the threaded aperture 1146. Once the height indication 1182 on the scale surface 1180 of the pointer 1170 is consistent with the amount of material that is being remove, the material removal gauge 24 has been calibrated.

Figure 31:
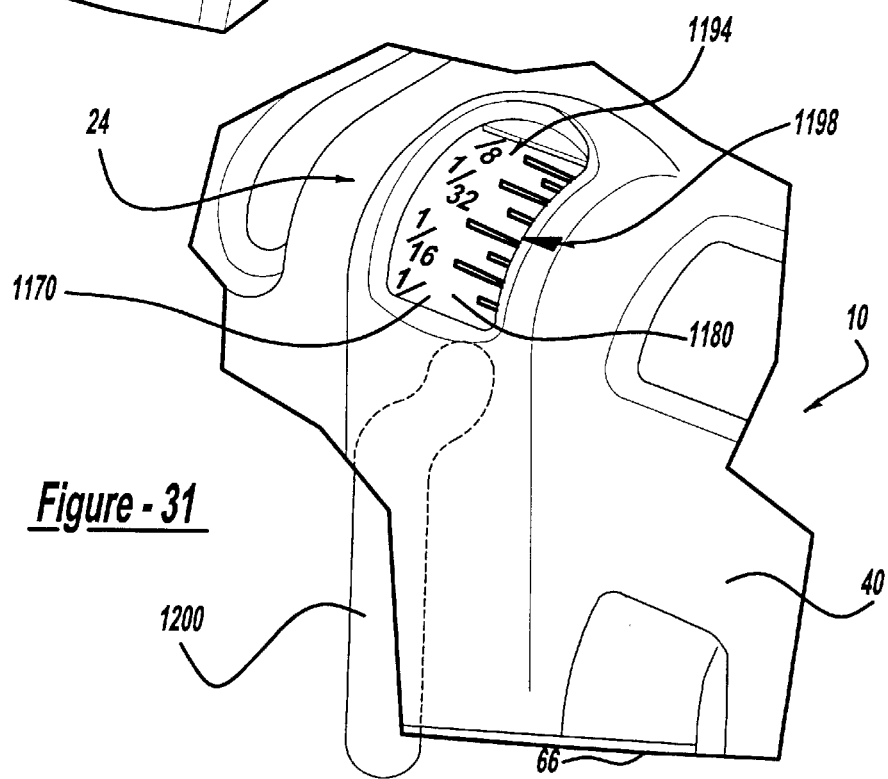
FIG. 31 is a partially broken-away perspective view of a material removal gauge constructed in accordance with an alternate embodiment of the present invention.
Figure 32:
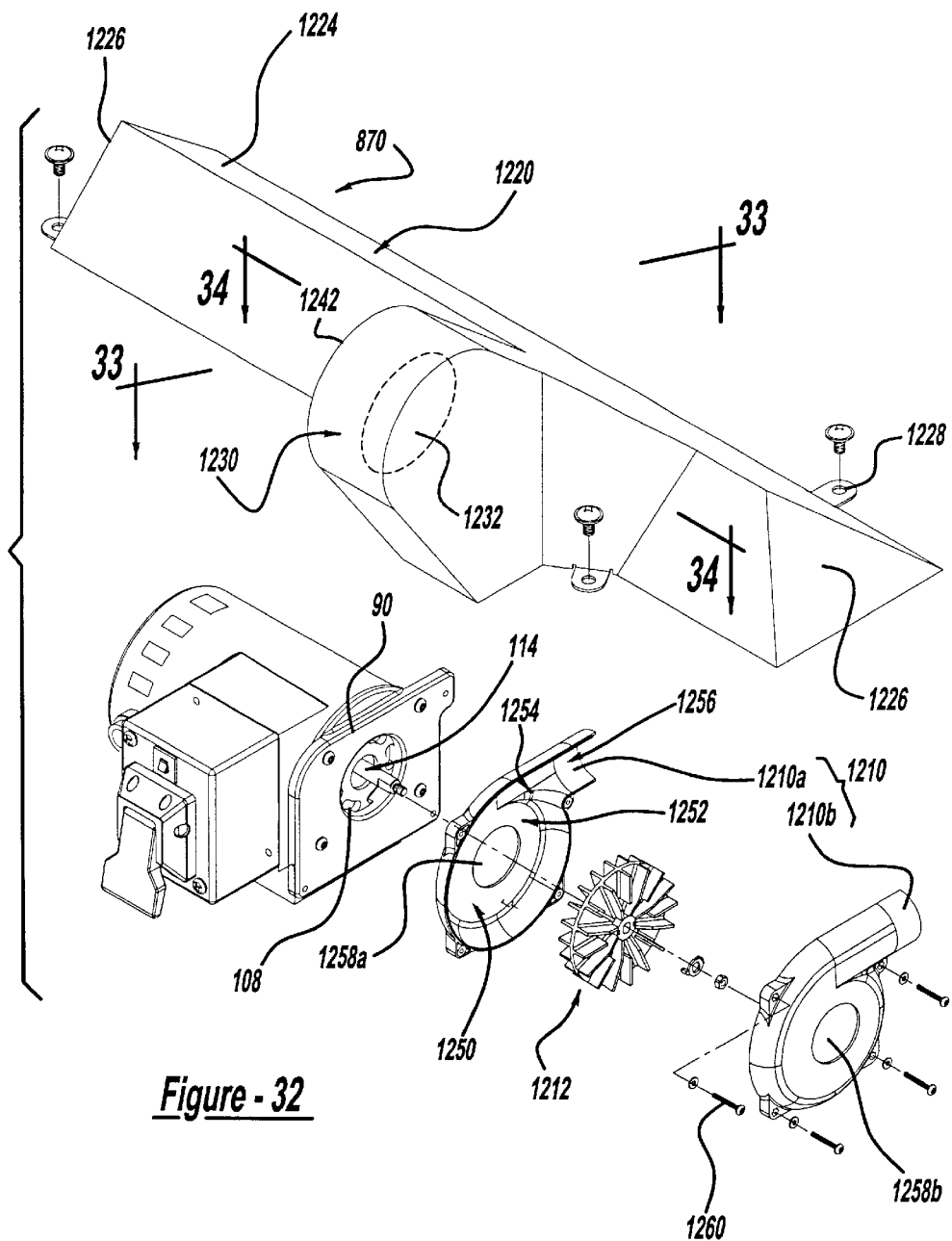
FIG. 32 is an exploded perspective view of a portion of the portable planer mechanism of FIG. 1, illustrating the dust collection system in greater detail.
Figure 33:
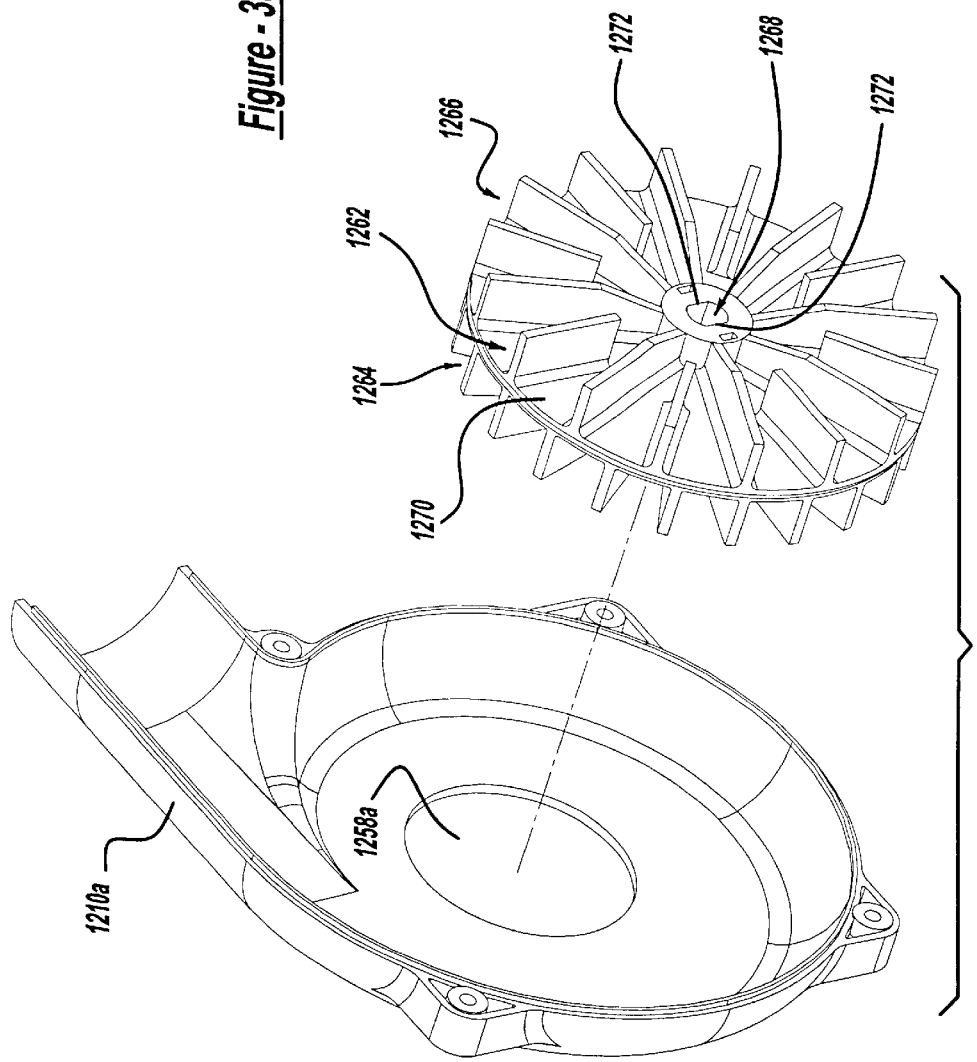
FIG. 33 is a sectional view taken along the line 33—33 of FIG. 1.
Figure 34:
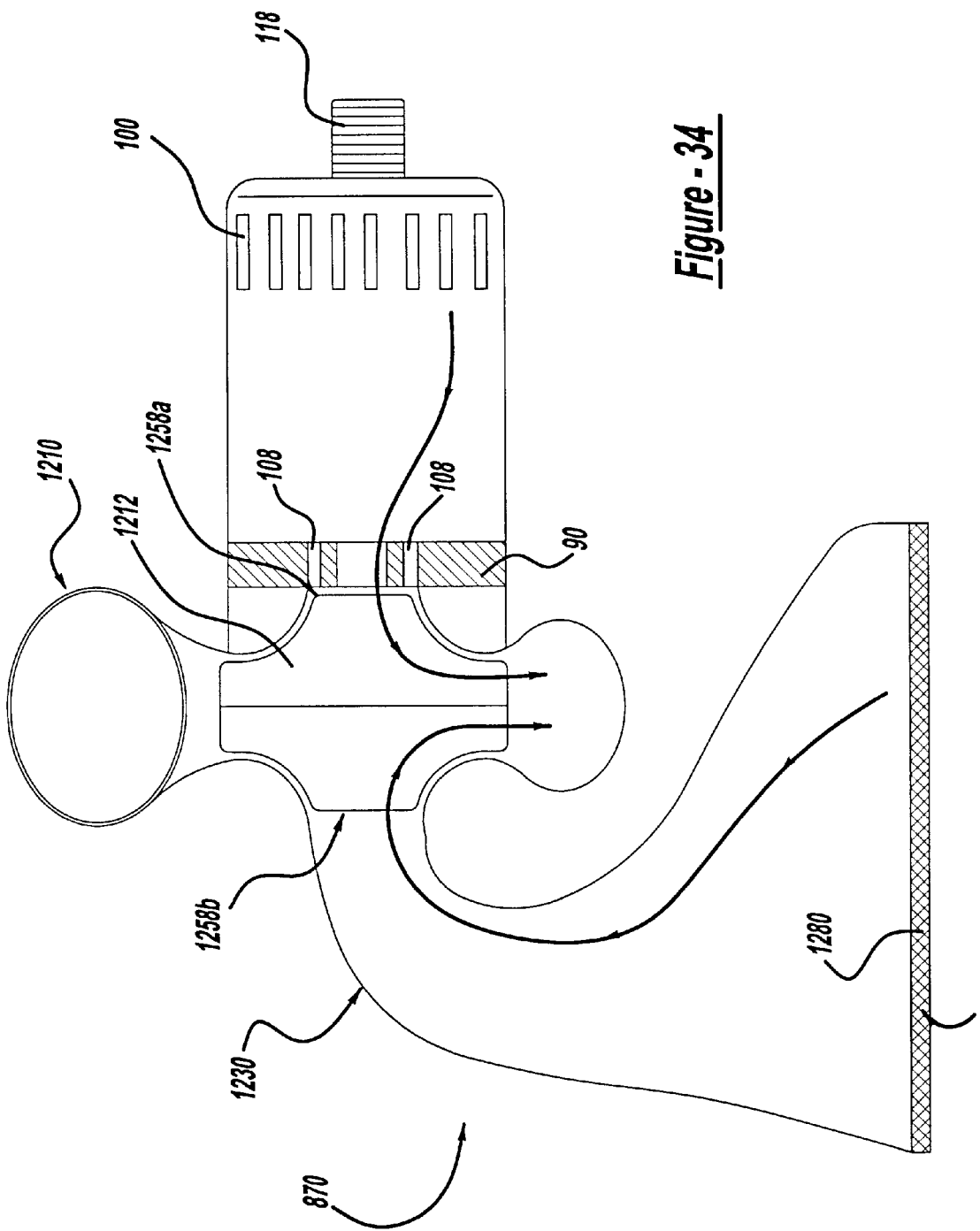
FIG. 34 is a sectional view taken along the line 34—34 of FIG. 1.

While the material removal gauge 24 has been illustrated with a unitarily formed pointer 1170 having a lever 1176 with a contact member 1184 that directly contacts a workpiece 300, those skilled in the art will appreciate, however, that the pointer may be constructed somewhat differently. For example, a spacing rod 1200 may be used in conjunction with the pointer 1170 as illustrated in FIG. 31 to permit the location of the scale window 1194 and scale surface 1180 to be raised relative to the carriage 40 so that the operator may identify the particular height indication 1182 that is aligned to the reference datum 1198 without bending over. In addition to improving the ergonomics of the planer mechanism 10, the elevating of the scale window 1194 and scale surface 1180 enables the scale surface 1180 to be read more easily, thereby improving the accuracy of the material removal gauge 24.

Dust Collection System Having Dual-Sided Fan

In FIGS. 2, 3, 3a, 32 and 33, the dust collection system 26 is illustrated to include a dust hood 870, a volute housing 1210 and a impeller structure 1212. In the example illustrated, the dust hood 870 includes a body portion 1220 and a ducting portion 1222 and is preferably unitarily formed in a plastic injection molding process. The body portion 1220 is defined by a pair of angled side wall members 1224 and a pair of end wall members 1226 that collectively cooperate to provide the body portion 1220 with a shape that is similar to that of a right triangular prism. The size the body portion 1220 is such that it completely covers the cutter pocket 54 that is formed in the carriage 40. Mounting lugs 1228 extend outwardly from the side and end wall members 1224 and 1226 and permit the body portion 1220 to be fixedly coupled to the carriage 40. Optionally, a gasket (not shown) may be placed between the carriage 40 and the body portion 1220 to seal the joint that is formed therebetween.

The ducting portion 1222 is fixedly coupled to the forward side wall member 1224 of the body portion 1220, extending forwardly therefrom and terminating at a coupling portion 1230 that is configured to mate to the volute housing 1210. The coupling portion 1230 includes a circular duct aperture 1232 but is otherwise completely enclosed. Optionally, a collar gasket (not shown), which is formed from a resilient material, such as rubber or neoprene, may be employed to seal the joint between the coupling portion 1230 and the volute housing 1210. The collar gasket may include a central aperture and a pair of spaced apart wall members that cooperate to define a U-shaped annular recess that is concentric to the central aperture. The U-shaped annular recess is configured such that each wall member sealingly engages an opposite side of the wall 1242 of the coupling portion 1230 into which the duct aperture 1232 is formed and the base of the annular recess sealingly engages the perimeter of the duct aperture 1232.

The volute housing 1210 is illustrated to be formed from a pair of mating volute halves 1210a and 1210b which cooperate to define a scroll-shaped central cavity 1250 having a tongue portion 1252, a throat portion 1254, an outlet port 1256 and a pair of inlet apertures 1258a and 1258b. The central cavity 1250 gradually increases in its cross-sectional area from the tongue portion 1252 to the throat portion 1254 in a manner that is known in the art and beyond the scope of the present disclosure. The volute housing 1210 is fixedly but removably coupled to the housing end cap 90 of the motor assembly 42 via a plurality of threaded fasteners 1260.

The impeller structure 1212 is illustrated to include a central flange portion 1262, a first set of impeller blades 1264 and a second set of impeller blades 1266. The central flange portion 1262 includes a mounting aperture 1268, which is sized to fit over the second end portion 114 of the shaft 110 of the rotor 88, and a dividing flange 1270 that separates the first and second sets of impeller blades 1264 and 1266. The mounting aperture 1268 includes a pair of parallel sidewalls 1272 that are configured to engage the parallel flats 124 to inhibit relative rotation between the shaft 110 and the impeller structure 1212. A washer (not shown) and a nut (not shown), which is sized to threadably engage the threaded end portion 126 of the second end portion 114 of the shaft 110, are employed to fixedly but removably couple the impeller structure 1212 to the shaft 110. Each of the first and second sets of impeller blades 1264 and 1266 are arranged generally perpendicular to the dividing flange 1270 and extend radially outwardly from the central flange portion 1262.

The first set of impeller blades 1264 are configured to draw air through the housing shell 84 to cool the motor assembly 42 during the operation of the planer mechanism 10. More specifically, rotation of the impeller structure 1212 in the volute housing 1210 generates a negative pressure differential that causes air to enter into the plurality of air inlet apertures 100 in the housing shell 84, travel through housing shell 84 drawing heat away from the components of the motor assembly 42 and exit the housing end cap 90 via the plurality of cooling vents 108. Thereafter, the heated air exiting the motor assembly 42 is directed into the inlet aperture 1258a in the volute housing 1210 where the rotating blades of the first set of impeller blades 1264 transfer additional energy into the air before it is expelled from the outlet port 1256 of the volute housing 1210.

The second set of impeller blades 1266 are configured to draw the dust chips 1280 that are generated during the operation of the planer mechanism 10 through the volute housing 1210. More specifically, rotation of the impeller structure 1212 in the volute housing 1210 generates a negative pressure differential that causes air to be drawn from around the workpiece 300 (FIG. 1), through the cutter pocket 54 of the carriage 40, through the dust hood 870 and into the inlet aperture 1258b of the volute housing 1210. The air-borne chips 1280 in the cutter pocket 54 are carried away by the air that is being drawn into the inlet aperture 1258b of the volute housing 1210, thereby facilitating the collection of the chips 1280. Those skilled in the art will appreciate that a suitable chip collection mechanism, such as a bag that is constructed from fine mesh, may be coupled to the outlet port 1256 to capture the chips 1280 that are blown out of the volute housing 1210. The dividing flange 1270 that is disposed between the first and second sets of impeller blades 1264 and 1266 ensures that the chips 1280 that are entering the volute housing 1210 will not be discharged in an axial direction against the housing end cap 90, thus ensuring that the chips 1280 do not inhibit the cooling or operation of the motor assembly 42.

Construction of the dust collection system 26 in this manner is highly advantageous in that a single motor can be used for operating both the cutterhead assembly 50 and the fan that facilitates the removal and collection of the wood chips 1280 that are generated during the operation of the planer mechanism 10. While the dust collection system 26 has been illustrated in conjunction with a planing apparatus, those skilled in the art will appreciate, however, that the dust collection apparatus may also be employed in conjunction with various other electric power tools, including for example, saws with a rotating blade, saws with a reciprocating blade, band saws, jointers, routers, laythes, drill presses, shapers, sanders and mortisers.

Power Take-Off Mechanism

With reference to FIGS. 2, 4, 4b and 34, the power take-off mechanism 28 is illustrated to include a power input portion 1300, which receives a rotational input from the gearbox 44, and a power output portion 1302, which transmits a power output to the planer carriage elevation mechanism 16 for selectively moving the carriage assembly 12 in a vertical direction under a source of power.

The power input portion 1300 is illustrated to include a support plate 1310, a shaft bushing 1312, a first gear 1314, a second gear 1316, a third gear 1318, a selector lever 1320, a support plate biasing spring 1322 and a hand wheel biasing spring 1324. The support plate 1310 is illustrated to be generally T-shaped, having a first arm portion 1326, a second arm portion 1328 and a third arm portion 1330. The first arm portion 1326 terminates at its distal end at a mounting flange 1332 that includes a bushing aperture 1334 and a pair of threaded apertures (not specifically shown). The bushing aperture 1334 is sized to engage the outer diameter of the shaft bushing 1312 in a press-fit manner. The shaft bushing 1312 includes a shaft bore 1340 having an inside diameter that is configured to rotatably fit onto the shaft portion 250 of the first reducing gear 204. Each of the threaded apertures is sized to receive a shoulder bolt 1342 having a cylindrically-shaped body portion 1344. The second arm portion 1328 terminates at its distal end at an aperture 1346 which is configured to receive the screw 1348 that fixedly coupled the selector lever 1320 to the support plate 1310. The third arm portion 1330 extends downwardly from the second arm portion 1328 and curves inwardly toward the first arm portion 1326. The third arm portion 1330 includes an arcuate slot 1350 having a concentric side walls 1352 and 1354 and a countersunk portion 1356 that is disposed in the center of the arcuate slot 1350.

The first gear 1314 is includes a plurality of first gear teeth 1360 and is coupled for rotation with the shaft portion 250 of the first reducing gear 204. A first one of the shoulder bolts 1342 is threadably engaged to a threaded aperture in the mounting flange 1332 and rotatably supports the second gear 1316. The second gear 1316 includes a plurality of second gear teeth 1362 that are meshingly engaged with the first gear teeth 1360. The second one of the shoulder bolts 1342 is threadably engaged to another one of the threaded apertures in the mounting flange 1332 and rotatably supports the third gear 1318. The third gear 1318 includes a plurality of third gear teeth 1364 that are meshingly engaged with the second gear teeth 1362.

With additional reference to FIG. 8, the front axle 500 is shown to extend through the arcuate slot 1350 in the third arm portion 1330 and terminate at an axle end 1370 having a drive portion 1372 having a non-circular cross-section, an idler portion 1374 having a circular cross-section and a threaded end 1376. The hand wheel 510 includes a coupling aperture 1378, having a geometry that mates to the geometry of the drive portion 1372 and a cam portion 1380, having a frusto-conical shape. The hand wheel 510 is slidable on the axle end 1370 between an engaged portion, wherein the drive portion 1372 is matingly engaged to and coupled for rotation with the hand wheel 510, and a disengaged portion, wherein the idler portion 1374 is aligned to the coupling aperture 1378 to thereby permit the front axle 500 and hand wheel 510 to rotate independently of one another. The hand wheel biasing spring 1324 is employed to generate a spring force that biases the hand wheel 510 toward the drive portion 1372 to thereby engage the frusto-conical shape of cam portion 1380 to the countersunk portion 1356 in the arcuate slot 1350. Engagement of the cam portion 1380 to the countersunk portion 1356 operates to fix the support plate 1310 relative to the rotational axis of the hand wheel 510. The support plate biasing spring 1322 is a torsion spring that is employed to exert a biasing force onto the first arm portion 1326 of the support plate 1310 when the front axle 500 is located in the proximal portion 1382 of the arcuate slot 1350.

The power output portion 1302 is illustrated to have a shaft 1400, a gear 1402, first and second pulleys 1404 and 1406, respectively, and a belt 1408. The shaft 1400 extends through an auxiliary output aperture 1410 formed into the gearbox housing 200 and is journally supported for rotation by a shaft support boss 240, which is formed into one of the gearbox housing halves 230, and a bushing 1412 that is fixed to the other gearbox housing half 230. The gear 1402 and the first pulley 1404 are coupled for rotation with the shaft 1400. The second pulley 1406 is coupled for rotation with the rear axle 502. The belt 1408 rotatably couples the first and second pulleys 1404 and 1406.

Figure 35:
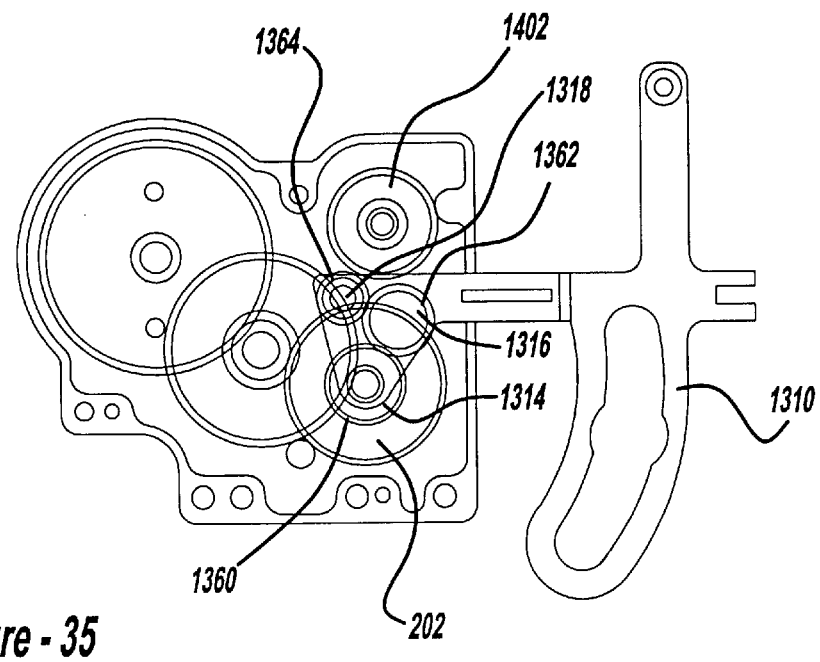
FIG. 35 is a side view of a portion of the power take-off mechanism illustrating the support plate as positioned in the neutral position.

During the operation of the planer mechanism 10, the support plate biasing spring 1322 and the hand wheel biasing spring 1324 cooperate to bias the support plate 1310 into a neutral position that is illustrated in FIG. 35, wherein the cam portion 1380 of the hand wheel 510 is engaged to the countersunk portion 1356 of the arcuate slot 1350. As the first gear 1314 is coupled for rotation with the shaft portion 250 of the first reducing gear 204, the first gear 1314 will rotate (whenever the cutter head 702 is rotating) and cause the second and third gears 1316 and 1318 to rotate. However, when the support plate 1310 is positioned in the neutral position, neither the second nor third gears 1316 and 1318 meshingly engage the gear 1402 and as such, the first pulley 1404 does not rotate.

Figure 36:
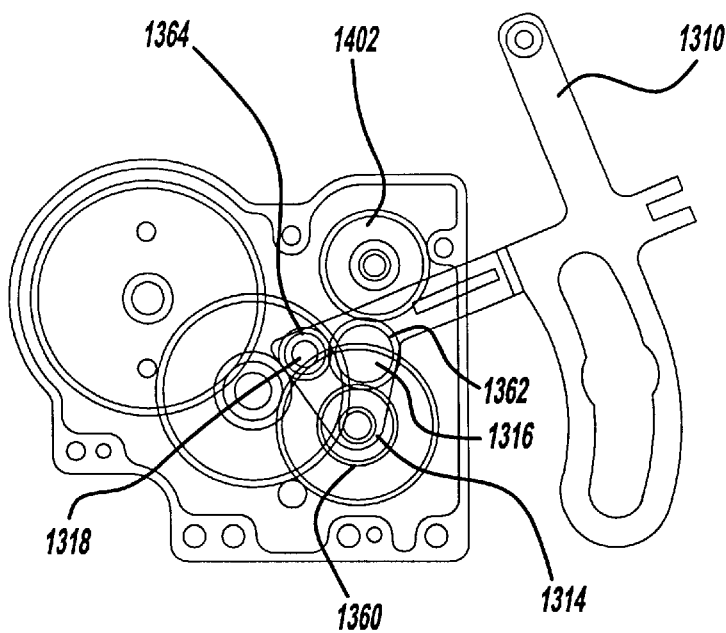
FIG. 36 is a side view similar to that of FIG. 35 but illustrating the support plate rotated upwardly to employ the power input portion of the power take-off mechanism to rotate the output portion of the power take-off mechanism in a first rotational direction.

When it is necessary to move the carriage assembly 12 in a vertical direction by a significant distance, the power take-off mechanism 28 may be employed to move the carriage assembly 12 under a source of power. If the carriage assembly 12 is to be moved upward relative to the planing surface 370, the selector lever 1320 is rotated upwardly as illustrated in FIG. 36. With the upward rotation of the selector lever 1320, the cam portion 1380 of the hand wheel 510 is forced out of the countersunk portion 1356 of the arcuate slot 1350, moving the hand wheel 510 in axially on the front axle 500 from the engaged position to the disengaged position, so that the cam portion 1380 abuts the outside surface 1414 of the third arm portion 1330.

As the selector lever 1320 is fixedly coupled to the support plate 1310, upward motion of the selector lever 1320 also causes the support plate to rotate about the shaft portion 250 and permit the second gear 1316 to meshingly engage the gear 1402 of the power output portion 1302. Rotational power received by the gear 1402 is transmitted through the shaft 1400 to the first pulley 1404 and thereafter through the belt 1408 to the second pulley 1406. As the rear axle 502 is coupled to the front axle 500 via the pulleys 506 and the belt 508, rotation of the second pulley 1406 will cause the front and rear axles 500 and 502 to rotate to thereby rotate the lower lock nuts 432 on the adjustment portion 412 of the guide posts 400 to cause the carriage assembly 12 to travel upwardly on the guide posts 400. However, as the idler portion 1374 and coupling aperture 1378 are aligned to one another, the hand wheel 510 is rotationally disconnected from the front axle 500, permitting the front axle 500 to rotate freely without causing similar rotation of the hand wheel 510.

When the carriage assembly 12 is positioned in a desired manner, the selector lever 1320 is released to permit the support plate biasing spring 1322 to rotate the support plate 1310 downwardly. Thereafter, the hand wheel biasing spring 1324 forces the hand wheel 510 inwardly toward the support plate 1310 to engage the cam portion 1380 to the countersunk portion 1356 of the arcuate slot 1350. The axial movement of the hand wheel 510 toward the support plate 1310 also serves to re-couple the coupling aperture 1378 to the drive portion 1372 to thereby rotatably couple the hand wheel 510 and the front axle 500.

Figure 37:
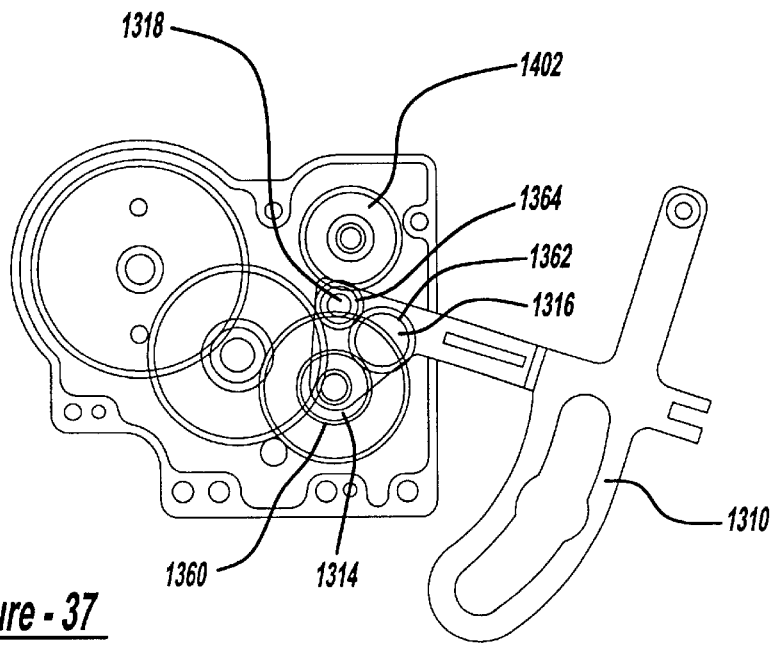
FIG. 37 is a side view similar to that of FIG. 35 but illustrating the support plate rotated downwardly to employ the power input portion of the power takeoff mechanism to rotate the output portion of the power take-off mechanism in a second rotational direction.

Similarly, if the carriage assembly 12 is to be moved downward relative to the planing surface 370, the selector lever 1320 is rotated downwardly as illustrated in FIG. 37.

With the downward rotation of the selector lever 1320, the cam portion 1380 of the hand wheel 510 is forced out of the countersunk portion 1356 of the arcuate slot 1350, moving the hand wheel 510 in axially on the front axle 500 from the engaged position to the disengaged position so as to disconnect the hand wheel 510 from the front axle 500 as described above.

As the selector lever 1320 is fixedly coupled to the support plate 1310, upward motion of the selector lever 1320 also causes the support plate to rotate about the shaft portion 250 and permit the third gear 1318 to meshingly engage the gear 1402 of the power output portion 1302. As those skilled in the art will readily understand, the selective engagement of the second and third gears 1316 and 1318 is employed to change the rotational direction of the input to the gear 1402. As mentioned above, rotational power received by the gear 1402 is transmitted through the shaft 1400 to the first pulley 1404 and thereafter through the belt 1408 to the second pulley 1406 to thereby provide the adjustment mechanism 404 with a source of power for rotating the lower lock nuts 432. When the carriage assembly 12 is positioned in a desired manner, the selector lever 1320 is lifted to disengage the third gear 1318 from the gear 1402 and permit the hand wheel biasing spring 1324 to force the hand wheel 510 inwardly toward the support plate 1310 to engage the cam portion 1380 to the countersunk portion 1356 of the arcuate slot 1350. As mentioned above, the axial movement of the hand wheel 510 toward the support plate 1310 also serves to re-couple the coupling aperture 1378 to the drive portion 1372 to thereby rotatably couple the hand wheel 510 and the front axle 500.

Figure 38:
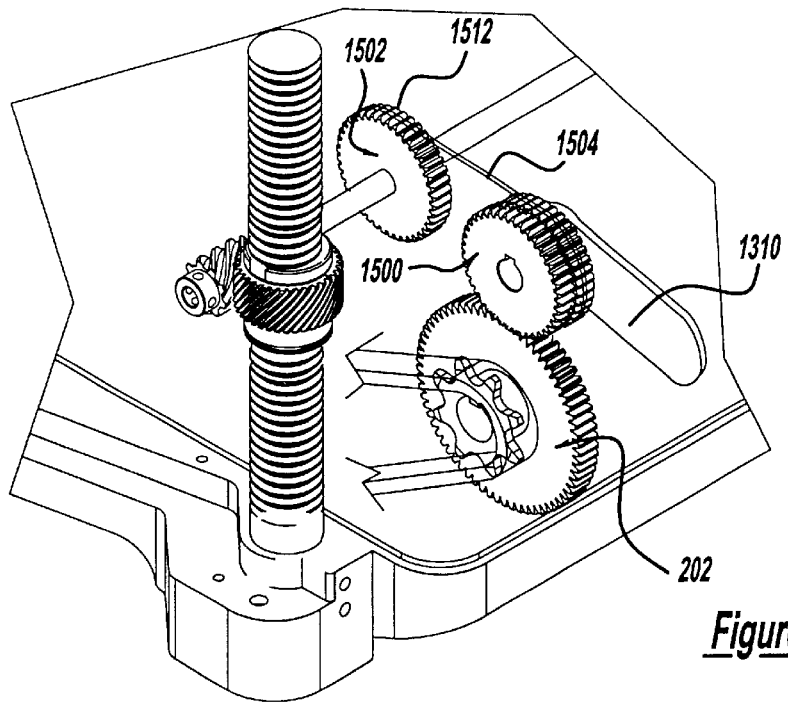
FIG. 38 is a perspective view illustrating a power take-off mechanism constructed in accordance with an alternate embodiment of the present invention.
Figure 39:
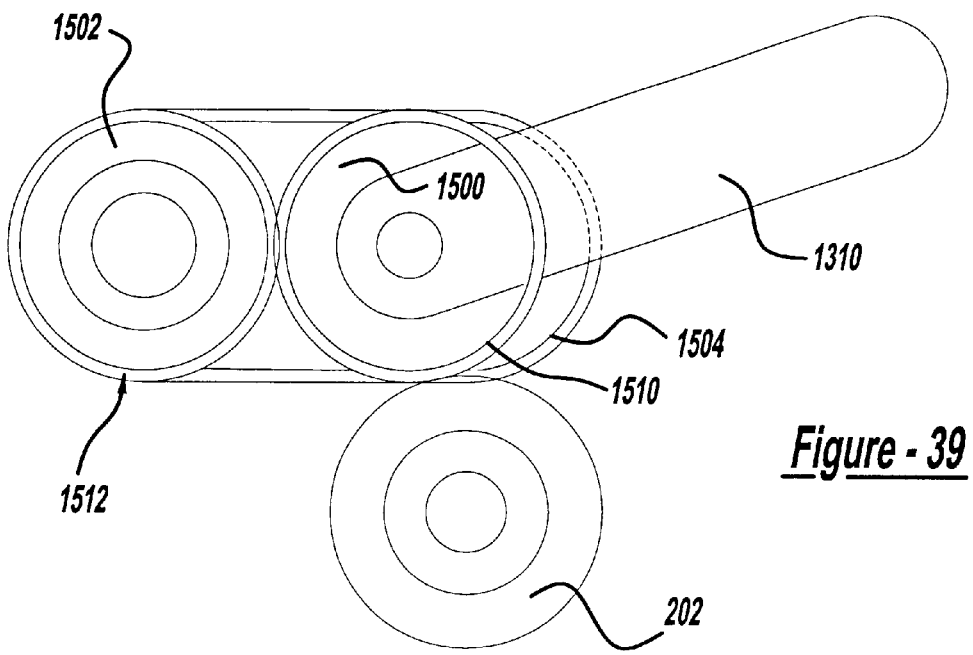
FIG. 39 is a side view of the power take-off mechanism of FIG. 38 illustrating the support plate rotated upwardly to employ the power input portion of the power take-off mechanism to rotate the output portion of the power take-off mechanism in a first rotational direction.
Figure 40:
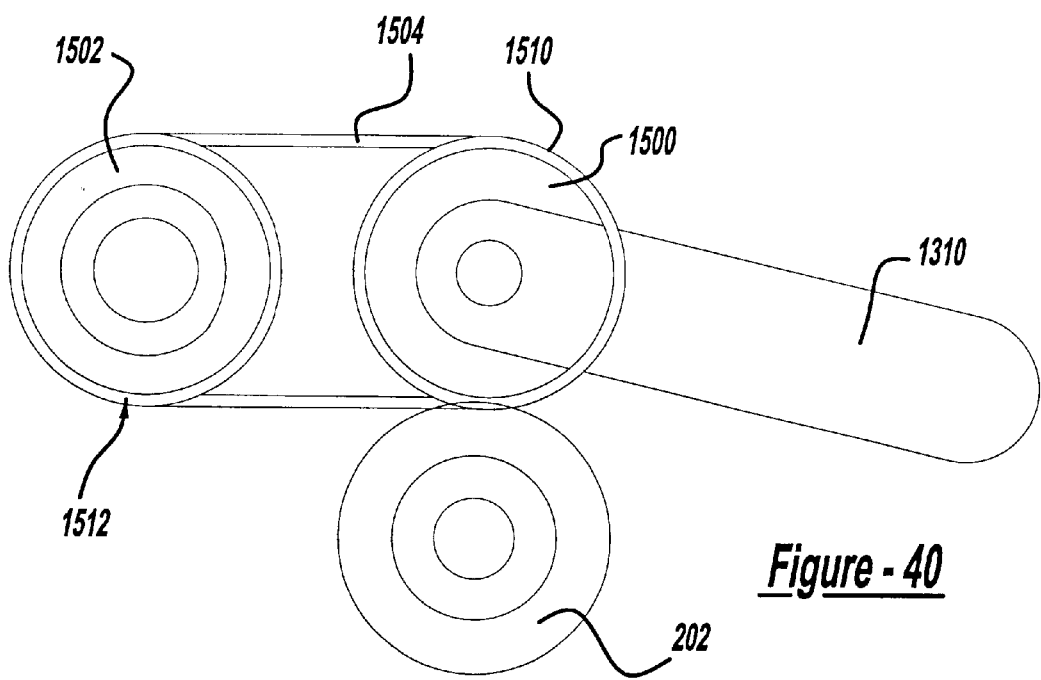
FIG. 40 is a side view similar to that of FIG. 39 but illustrating the support plate rotated downwardly to employ the power input portion of the power takeoff mechanism to rotate the output portion of the power take-off mechanism in a second rotational direction.

While the power take-off mechanism 28 has been illustrated as including a pair of meshing gears, each of which being selectively engagable with a gear on the power output portion 1302, those skilled in the art will understand that the power take-off mechanism may be constructed somewhat differently. For example, a first combination gear and pulley 1500, a second combination gear and pulley 1502 and a belt 1504 may be substituted for the second and third gears 1316 and 1318 and the gear 1402 as illustrated in FIGS. 38 through 40. In this example, rotation of the support plate 1310 in the upward direction (FIG. 39) engages the gear teeth 1510 of the first combination gear and pulley 1500 to the gear teeth 1512 of the second combination gear and pulley 1502 in a manner that is substantially identical to that described above. In this condition, as well as when the support plate 1310 is positioned in the neutral position, the belt 1504 is disposed around a pulley portion 1514 of both of the first and second combination gear and pulley 1500 and 1502 and as such, the belt 1504 does not rotate, let alone transmit any rotational power.

Rotation of the support plate 1310 in the downward direction (FIG. 40), however, causes the pulley portions 1514 of the first and second combination gear and pulley 1500 and 1502 to apply tension to the belt 1504, permitting the belt 1504 to transmit rotational power from the first combination gear and pulley 1500 to the second combination gear and pulley 1502. When the first and second combination gear and pulley 1500 and 1502 are coupled via the belt 1504, they rotate in the same rotational direction, whereas when the first and second combination gear and pulley 1500 and 1502 are coupled via the gear teeth 1510 and 1512, they rotate in opposite rotational directions.

While the invention has been described in the specification and illustrated in the drawings with reference to a preferred embodiment, it will be understood by those skilled in the art that various changes may be made and equivalents may be substituted for elements thereof without departing from the scope of the invention as defined in the claims. In addition, many modifications may be made to adapt a particular situation or material to the teachings of the invention without departing from the essential scope thereof. Therefore, it is intended that the invention not be limited to the particular embodiment illustrated by the drawings and described in the specification as the best mode presently contemplated for carrying out this invention, but that the invention will include any embodiments falling within the foregoing description and the appended claims.

What is claimed is:

1. A power planer comprising:

a base having a reference surface;

a carriage assembly;

a carriage elevation mechanism including a plurality of guide posts and an elevation mechanism, the plurality of guide posts being fixedly coupled to one of the base and the carriage assembly, each of the guide posts having a threaded adjustment portion, the elevation mechanism having a plurality of threaded structures, each threaded structure being threadably engaged to the threaded adjustment portion of an associated guide post, each threaded structure being coupled to the other one of the base and the carriage assembly such that rotation of the threaded structures relative to the guide posts affects an elevation of the carriage assembly relative to the reference; and a lock coupled to the other one of the base and the carriage assembly, the lock being selectively employed to engage the threaded adjustment portion of at least one of the guide posts to lock the elevation of the carriage assembly at a desired dimension.

2. The power planer of claim 1, wherein the elevation mechanism includes a flexible drive member for engaging a sprocket that is coupled to each of the threaded structures and wherein rotation of the flexible drive member operably rotates the threaded structures in unison.

3. The power planer of claim 2, wherein the flexible drive member is a chain.

4. The power planer of claim 1, wherein the elevation mechanism further includes a plurality of input gears that rotate in response to a rotary input transmitted to the elevation mechanism, each input gear having a plurality of gear teeth that meshingly engage a plurality of gear teeth formed on an associated one of the threaded structures.

5. The power planer of claim 4, wherein the input gears are worm gears.

6. The power planer of claim 5, wherein the worm gears are segregated into a first pair and a second pair, the first pair being coupled for rotation with a first axle, the second pair being coupled for rotation with a second axle, the second axle being coupled for rotation with the first axle.

7. The power planer of claim 6, wherein rotary power is transmitted from the first axle to the second axle via a belt and a pair of pulleys, each of the pulleys being coupled for rotation with one of the first and second axles.

8. The power planer of claim 6, further comprising a power take-off mechanism that is coupled to one of the first and second axles and operable for selectively transmitting rotary power to the one of the first and second axles to cause the threaded structures to rotate in a corresponding manner under a source of power to selectively position the carriage assembly.

9. A power planer comprising:
a base having a reference surface;
a carriage assembly;
a carriage elevation mechanism including a plurality of guide posts and an elevation mechanism, the guide posts being fixedly coupled to one of the base and the carriage assembly, each of the guide posts having a threaded adjustment portion, the elevation mechanism having a plurality of threaded structures, each threaded structure being threadably engaged to the threaded adjustment portion of an associated guide post, each threaded structure being coupled to the other one of the base and the carriage assembly such that rotation of the threaded structures relative to the guide posts affects an elevation of the carriage assembly relative to the reference surface, the elevation mechanism further including a plurality of input gears that rotate in response to a rotary input transmitted to the elevation mechanism, each input gear being a worm gear and having a plurality of gear teeth that meshingly engage a plurality of gear teeth formed on an associated one of the threaded structures, the worm gears being segregated into a first pair and a second pair, the first pair being coupled for rotation with a first axle, the second pair being coupled for rotation with a second axle, the second axle being coupled for rotation with the first axle; and
a power take-off mechanism that is coupled to one of the first and second axles and operable for selectively transmitting rotary power to the one of the first and second axles to cause the threaded structures to rotate in a corresponding manner under a source of power to selectively position the carriage assembly;
wherein the power take-off mechanism includes a gear train with an input idler gear, a first intermediate idler gear, a second intermediate idler gear and an output gear, the input idler gear receiving a rotary input, the first intermediate idler gear meshingly engaging the input idler gear and the second intermediate idler gear and the second gear, the output gear being configured to transmit rotary power to the one of the first and second axles, the gear train being at least partially rotatable about an axis between a neutral position, wherein rotary power is not transmitted through either of the first and second intermediate idler gears to the output gear, a first engaged condition, wherein one of the first and second intermediate idler gears is meshingly engaged to the output gear, and a second engaged condition, wherein the other one of the first and second intermediate idler gears is meshingly engaged to the output gear.

10. The power planer of claim 9, wherein the first and second intermediate idler gears are mounted for rotation on a pivoting support plate.

11. The power planer of claim 8, wherein the power take-off includes an input idler gear, an intermediate idler gear, a drive belt and an output gear, the output gear being rotatably coupled to the one of the first and second axles, the input idler gear receiving a source of rotary power and rotating in response thereto, the intermediate idler gear being meshingly engaged to the input idler gear, the drive belt being coupled to the intermediate idler gear and the output gear, the intermediate idler gear being movable between a first condition, wherein rotary power is transmitted through the drive belt to the output gear, and a second condition, wherein rotary power is transmitted directly from the intermediate idler gear to the output gear.

12. The power planer of claim 11, wherein the intermediate idler gear meshingly engages the output gear when the intermediate idler gear is positioned in the second condition.

13. The power planer of claim 11, wherein the intermediate idler gear includes a reduced diameter portion which is configured to engage the drive belt when the intermediate idler gear is positioned in the first condition.

14. A power planer comprising:
a base having a reference surface;
a carriage assembly; and
a carriage elevation mechanism including:
a plurality of guide posts fixedly coupled to one of the base and the carriage assembly, each of the guide posts having a threaded adjustment portion; and
an elevation mechanism with a plurality of threaded structures, each threaded structure being threadably engaged to the threaded adjustment portion of an associated guide post, each threaded structure being coupled to the other one of the base and the carriage assembly such that rotation of the threaded structures relative to the guide posts affects an elevation of the carriage assembly relative to the reference surface;
wherein each threaded structure includes a first threaded structure and a second threaded structure, the first and second threaded structures being coupled for rotation with one another but movable in an axial direction relative to one another and wherein the power planer further comprises a locking mechanism that is operable in a disengaged condition, which does not inhibit in unison rotation of the first and second threaded structures, and an engaged condition, wherein the first threaded structure is moved axially relative to the second threaded structure to lock the threaded structure against the threaded adjustment portion of the associated guide post and thereby inhibit in unison rotation of the first and second threaded structures.

15. The power planer of claim 14, wherein relative axial movement is caused by rotation of at least one rotary cam mechanism.

16. The power planer of claim 15, wherein each rotary cam mechanism includes an upper cam and a lower cam that abuts the upper cam, each of the upper and lower cams extending around the perimeter of an associated one of the threaded structures, the upper cam including a plurality of circumferentially extending tapered ramp members that are configured to matingly engage a plurality of circumferentially extending mating tapered ramp members, the upper and lower cams being movable between a neutral condition, wherein the tapered ramp members completely confront the mating tapered ramp members, and a locked position, wherein the tapered ramp members partially confront the mating tapered ramp members.

17. The power planer of claim 16, further comprising a biasing spring for biasing the rotary cam mechanism into the neutral condition.

18. The power planer of claim 16, further comprising at least one link, each link rotatably coupling an adjacent pair of the rotary cam mechanisms such that all of the rotary cam mechanisms are movable in unison between the disengaged condition and the engaged condition.

19. The power planer of claim 14, wherein one of the first and second threaded structures includes a slotted aperture and the other one of the first and second threaded structures includes a coupling tab that is sized to engage the slotted aperture such that relative axial sliding movement between the first and second threaded structures is permitted while relative rotation between the first and second threaded structures is inhibited.

20. The power planer of claim 1, further comprising a power take-off mechanism that is coupled to elevation mechanism and operable for selectively rotating the threaded structures under a source of power to selectively position the carriage assembly.

21. A power planer comprising:

a base;

a carriage assembly; and a carriage elevation mechanism having a plurality of guide posts and a plurality of nut assemblies, each of the guide posts being fixed to the base and having a threaded adjustment portion, each of the nut assemblies being coupled to the carriage assembly and threadably engaged to the threaded adjustment portion of an associated one of the guide posts, each nut assembly including a first threaded structure and a second threaded structure, the first and second threaded structures being coupled for rotation with one another but movable in an axial direction relative to one another; and a locking mechanism that is operable in a disengaged condition, which does not inhibit in unison rotation of the first and second threaded structures, and an engaged condition, wherein the first threaded structure is moved axially relative to the second threaded structure to lock the nut assemblies against the threaded adjustment portion of the associated guide post and thereby inhibit in unison rotation of the first and second threaded structures.

22. The power planer of claim 21, wherein relative axial movement is caused by rotation of at least one rotary cam mechanism.

23. The power planer of claim 22, wherein each rotary cam mechanism includes an upper cam and a lower cam that abuts the upper cam, each of the upper and lower cams extending around the perimeter of an associated one of the threaded structures, the upper cam including a plurality of circumferentially extending tapered ramp members that are configured to matingly engage a plurality of circumferentially extending mating tapered ramp members, the upper and lower cams being movable between a neutral condition, wherein the tapered ramp members completely confront the mating tapered ramp members, and a locked position, wherein the tapered ramp members partially confront the mating tapered ramp members.

24. The power planer of claim 23, further comprising a biasing spring for biasing the rotary cam mechanism into the neutral condition.

25. The power planer of claim 23, further comprising at least one link, each link rotatably coupling an adjacent pair of the rotary cam mechanisms such that all of the rotary cam mechanisms are movable in unison between the disengaged condition and the engaged condition.

26. The power planer of claim 21, wherein one of the first and second threaded structures includes a slotted aperture and the other one of the first and second threaded structures includes a coupling tab that is sized to engage the slotted aperture such that relative axial sliding movement between the first and second threaded structures is permitted while relative rotation between the first and second threaded structures is inhibited.

* * * * *

UNITED STATES PATENT AND TRADEMARK OFFICE
CERTIFICATE OF CORRECTION

PATENT NO. : 6,708,744 B2
DATED : March 23, 2004
INVENTOR(S) : Barry Wixey et al It is certified that error appears in the above-identified patent and that said Letters Patent is hereby corrected as shown below:

Column 30,
Line 30, after "reference" insert -- surface --.

Signed and Sealed this

Thirty-first Day of August, 2004

JON W. DUDAS
*Director of the United States Patent and Trademark Office*